(12) United States Patent
Hashimoto et al.

(10) Patent No.: US 7,658,421 B2
(45) Date of Patent: Feb. 9, 2010

(54) AXIAL MEMBER WITH FLANGE, CONNECTION MEMBER AND PRODUCTION METHODS THEREOF

(75) Inventors: Narikazu Hashimoto, Shimonoseki (JP); Masatoshi Yoshida, Kobe (JP); Hiroyuki Yamashita, Shimonoseki (JP); Satoshi Nimura, Shimonoseki (JP); Toru Hashimura, Kobe (JP); Yoshihaya Imamura, Fujisawa (JP); Kazumori Horiguchi, Tokyo (JP)

(73) Assignee: Kabushiki Kaisha Kobe Seiko Sho, Kobe-shi (JP)

( * ) Notice: Subject to any disclaimer, the term of this patent is extended or adjusted under 35 U.S.C. 154(b) by 448 days.

(21) Appl. No.: 11/115,353

(22) Filed: Apr. 27, 2005

(65) Prior Publication Data

US 2006/0284432 A1    Dec. 21, 2006

(30) Foreign Application Priority Data

| | | |
|---|---|---|
| Apr. 27, 2004 | (JP) | ............................. 2004-131529 |
| Jun. 25, 2004 | (JP) | ............................. 2004-188338 |
| Sep. 29, 2004 | (JP) | ............................. 2004-284110 |
| Oct. 18, 2004 | (JP) | ............................. 2004-302574 |

(51) Int. Cl.
  *B60R 19/24* (2006.01)
(52) U.S. Cl. ............................. 293/154; 293/155; 296/29
(58) Field of Classification Search ............ 296/187.09, 296/29, 30; 293/133, 154, 155; 72/56, 54
  See application file for complete search history.

(56) References Cited

U.S. PATENT DOCUMENTS

| | | | | |
|---|---|---|---|---|
| 4,830,418 A | * | 5/1989 | Gest ............................ | 293/134 |
| 6,255,631 B1 | * | 7/2001 | Kichline et al. ............. | 219/617 |

(Continued)

FOREIGN PATENT DOCUMENTS

JP    51-149163    12/1976

(Continued)

OTHER PUBLICATIONS

Machine Translation of Japanese Publication 2002-160032.*

*Primary Examiner*—Jason S Morrow
(74) *Attorney, Agent, or Firm*—Oblon, Spivak, McClelland, Maier & Neustadt, L.L.P.

(57) ABSTRACT

A target tubular member with flange, such as a bumper stay, has a flange having an outer diameter larger than the diameter of an axial section and is formed by electromagnetic forming without excessive expansion. The tubular member with flange includes an axial member made of a tubular aluminum alloy extrudate and a flange member joined to an end of the axial member. The axial member has an end flange being integrated at its end and having an area smaller than that of the flange member. The flange member has a hole, and a cylindrical hole flange at the edge of the hole. The axial member fits in the hole of the flange member, the end flange is in intimate contact with the flange member, and the outer periphery of a small-diameter portion of the axial member is in intimate contact with the inner periphery of the hole flange. The hole flange is held between the end flange and a protrusion. The tubular member with flange may be produced by inserting an untreated pipe into the hole of the flange member and expanding the untreated pipe by electromagnetic forming.

8 Claims, 56 Drawing Sheets

U.S. PATENT DOCUMENTS

| | | | |
|---|---|---|---|
| 6,481,690 B2 | 11/2002 | Kariatsumari et al. | |
| 6,968,718 B2 * | 11/2005 | Imamura | 72/56 |
| 7,000,975 B2 * | 2/2006 | Haneda et al. | 296/132 |
| 7,127,816 B2 * | 10/2006 | Kiehl | 29/897.2 |
| 7,144,040 B2 * | 12/2006 | Kiehl et al. | 280/785 |
| 7,192,067 B2 * | 3/2007 | Hansen | 293/133 |
| 2004/0007038 A1 | 1/2004 | Imamura | |

FOREIGN PATENT DOCUMENTS

| | | |
|---|---|---|
| JP | 58-4601 | 1/1983 |
| JP | 2-075424 | 3/1990 |
| JP | 4-125031 | 11/1992 |
| JP | 05-212468 A | 8/1993 |
| JP | 6-312226 | 11/1994 |
| JP | 7-116751 | 5/1995 |
| JP | 8-91154 | 4/1996 |
| JP | 8-247127 | 9/1996 |
| JP | 9-166111 | 6/1997 |
| JP | 9-192760 | 7/1997 |
| JP | 2000-318552 | 11/2000 |
| JP | 2001-294106 | 10/2001 |
| JP | 2002-12107 | 1/2002 |
| JP | 2002-67840 A | 3/2002 |
| JP | 2002-86228 | 3/2002 |
| JP | 2002-160032 A | 6/2002 |
| JP | 2004-42066 | 2/2004 |
| JP | 2004-237348 A | 8/2004 |

* cited by examiner

US 7,658,421 B2

AXIAL MEMBER WITH FLANGE, CONNECTION MEMBER AND PRODUCTION METHODS THEREOF

BACKGROUND OF THE INVENTION

1. Field of the Invention

The present invention relates to axial members with flange having an axial section made of an aluminum alloy material and a mounting flange arranged at the end of the axial section, to connection members and to production methods of these members.

2. Description of the Related Art

Bumpers arranged at the front end (front) and the rear end (rear) of bodies of automobiles such as passenger cars and trucks have bumper reinforcements as reinforcing members inside thereof. Such a bumper reinforcement is generally a member which is hollow in cross section and includes a front wall and a rear wall pointing substantially perpendicular to a loading direction, and a horizontal wall connecting these walls. The bumper reinforcement is supported by a pair of bumper stays from the rear, and the respective bumper stays are fixed at their rear end to the front end of the side member (front or rear).

Aluminum bumper stays are roughly classified as bumper stays to be vertically crushed, and those to be horizontally crushed. With reference to FIG. 79(a), such a bumper stay to be vertically crushed includes an axial section 1 and sheet mounting flanges 2 and 3. The sheet mounting flanges 2 and 3 serve to mount a bumper reinforcement 4 and a side member 5 and are weld to the front and rear ends of a hollow extrudate constituting the axial section 1. This type of bumper stay has an extrusion axial direction pointing to a cross direction of a car body in a direction substantially perpendicular to the longitudinal direction of the bumper reinforcement 4. With reference to FIG. 79(b), a bumper stay to be horizontally crushed includes an extrudate 6 and has an extrusion axial direction pointing to the vertical direction of a car body in a direction perpendicular to the longitudinal direction of the bumper reinforcement 4. The extrudate 6 integrally has mounting flanges 7 and 8 at the front and rear ends thereof. Examples of bumper stays to be horizontally crushed can be seen typically in Japanese Patent Application Laid-Open (JP-A) No. 08-91154, JP-A No. 2000-318552 and JP-A No. 2001-294106.

Bumper stays to be vertically crushed generally have a high production cost, since the constitutional three parts are integrated by welding. In addition, if a mounting section at the end of such bumper stays is inclined rearward with respect to a width direction of a car as shown in FIG. 79(a), the axial extrudate must be cut obliquely. This invites a decreased yield, an increased cutting cost and an increased welding cost. Bumper stays to be horizontally crushed are low in their production cost and can be easily produced even if the mounting section at the end of the bumper reinforcement is inclined or curved with respect to a width direction of a car. However, these bumper stays have a lower energy absorption per unit weight and lower effects in weight reduction than the bumper stays to be vertically crushed.

Japanese Patent Application Laid-Open (JP-A) No. 2004-42066 describes a technique for forming mounting flanges 12 and 13 at both ends of an axial section 11 by electromagnetic forming, which axial section 11 is made of an aluminum alloy extrudate (tube), as shown in FIG. 79(c).

This article is produced in the following manner as shown in FIG. 80. Initially, an aluminum extrudate is cut to a predetermined length to form an untreated pipe 14, a mould 15 including plural mould parts is allowed to surround the untreated pipe 14 while the ends of the untreated pipe 14 are protruded from end faces (molding faces) 16 and 17 of the mould 15. An electromagnetic forming coil 18 is inserted into the untreated pipe 14, and an electric energy (charge) accumulated at a high voltage in the coil is instantaneously discharged to thereby produce the article. In the electromagnetic forming process, the electromagnetic forming coil 18 generates a strong magnetic field in a very short time as a result of application of electric energy, a work (article to be processed) placed in the magnetic field receives strong expansive force and/or contractive force by the action of a repulsive force of the magnetic field (the Lorentz force in accordance with the Fleming's left-hand rule) and is plastically deformed at high speed to thereby mold the work to a predetermined shape. In the illustrated example, the untreated pipe 14 in a region inside the end faces 16 and 17 expands outward in a radial direction by the action of the strong expansive force, is pressed to the inner face of a through hole 19. The untreated pipe 14 in a region outside the end faces 16 and 17 spreads and strikes against the end faces 16 and 17.

The electromagnetic forming can be applied even to the case where the work must be processed into a complicated shape, since the work is deformed at high speed. In addition, this technique enables a shape with good precision, since the work is pressed to the molding face of the mould to form a predetermined shape. Accordingly, flanges having various shapes corresponding to the shapes of the mounting faces can be obtained by allowing end faces (molding faces) 16 and 17 of the mould 15 to have appropriate corresponding shapes. Examples of possible flanges are a flange having a plane perpendicular to the axial direction (flange 13), as well as a flange having a plane oblique to the vertical plane to the axial direction (flange 12), and a flange having a curved face.

The electromagnetic forming itself has been known, as described typically in JP-A No. 58-4601, JP-A No. 06-312226, JP-A No. 07-116751, JP-A No. 2002-86228, and Search Report of Mechanical Engineering Laboratory, No. 150, "Plastic Working Using Magnetoelectric Force" (March 1990, published by the Mechanical Engineering Laboratory, MITI, Japan)

In the conventional bumper stays to be vertically crushed, the three constitutional parts are weld at an intersection of the axial section and the flanges at which a load upon collision is most applied. Thus, they exhibit decreased properties of the materials, which may invite unexpectable decrease in energy absorption, in addition to the above-mentioned disadvantages.

This problem is solved by allowing both ends of a tubular aluminum alloy extrudate to expand typically by electromagnetic forming and thereby forming flanges integrally with the axial section. In this case, however, deformation of the flanges due to tensile force to a circumferential direction increases with approaching to the outside, which invites reduction in thickness and, in turn, invites cracking. This problem becomes more serious when the flanges have larger diameters as compared with the diameter of the axial section made of an aluminum alloy extrudate.

The cracking problem is specifically serious in the case of an aluminum alloy extrudate having a fiber structure. Such a fiber structure mainly includes grain boundaries in parallel with the extrusion direction, and molding force for expansion applied typically by electromagnetic forming acts in such a direction to break or tear the grain boundaries. In addition, an article having a fiber structure less elongates in a direction perpendicular to the extrusion direction. As is well known, an aluminum alloy extrudate having a fiber structure exhibits excellent crush properties in an axial direction and is highly useful as a bumper stay. However, such an aluminum alloy extrudate exhibits lower moldability in an expansion direction than an article including an equiaxial crystal, invites cracking specifically in the case where flanges are formed at ends thereof and thereby the flanges cannot significantly have sufficient sizes to be connected with a bumper reinforcement and a side member.

FIG. 81 illustrates the state where a flange 12 (and also a flange 13) formed by electromagnetic forming has a decreasing thickness toward the outside. As is illustrated in FIG. 81, the flange 12 has a varying thickness in a radial direction and a front 12a of the flange 12 is not flat even if an end face (molding face) 16 of a mould 15 is a flat plane. When the resulting flange 12 is fixed, for example, to a rear wall 4a of a bumper reinforcement 4, there is a gap G between the flange 12 and the rear wall 4a of the bumper reinforcement 4, as illustrated in FIG. 82. The gap G invites distortion of the flange 12 upon fixation with bolt and nut or by riveting, and invites a space between the fixed flange 12 and the rear wall 4a of the bumper reinforcement 7. This is also true for the case where the flange 13 is fixed to the tip of a side member. This problem becomes more serious when the flanges have larger outer diameters as compared with the diameter of the axial section made of an aluminum alloy extrudate.

SUMMARY OF THE INVENTION

The present invention has been accomplished in view of these disadvantages of conventional techniques, and an object of the present invention is to provide a tubular member with flange that has an axial section free from welding spots, has a flange having an outer diameter larger than the diameter of the axial section without excessive expansion and is usable typically as a bumper stay.

U.S. Pat. No. 6,255,631 discloses a technique for joining across member and a channel side-rail of automobile by electromagnetic expansion (FIG. 83). The channel side-rail 19 and the cross member 20 however may become loose when, for example, an intensive rotative force is applied on the channel side-rail 19, since they have no engaging part around the axis. If the channel side-rail 19 and the cross member 20 become loose or rotate relatively, the inner periphery of a through hole of the channel side-rail 19 slides with respect to the cross member 20, and at least one of the two members is worn at the contact portion, which further increases the looseness.

Thus, looseness of a structure, such as a channel side-rail with a cross member or a bumper reinforcement with a bumper stay, invites deterioration in rigidity of the structure and causes vibration.

Accordingly, a second object of the present invention is to prevent relative rotation between an axial member and a flange member around the axis of the axial member, which axial member has been formed by electromagnetic expansion and which flange member has a mounting face to be in contact with a mating face of another member.

When an axial member instantaneously spreads and comes into intimate contact with a flange member, the axial member intensively hits against a flange face around a hole. The hit portion bends and deforms by the action of the striking force. In this case, the flange member may be joined to the axial member while the hit portion is deformed. In addition, when the flange member is mounted to a mating face of a counter member, a load applied by the counter member on the flange member may cause distortion. This problem becomes serious specifically when the mounting face has different levels.

Thus, a third object of the present invention is to carry out joining of a flange member while preventing deformation thereof.

A fourth object of the present invention is to prevent a flared portion arranged on a tip of an axial member from obstructing the mounting of the flange to another member in the case where the flange to be in contact with a mating section of another member such as a bumper reinforcement or a side member is fixed to one or two ends of the axial member by electromagnetic forming.

A certain bumper stay includes a hollow main body of a bumper stay to be horizontally crushed as illustrated in FIG. 79(b) and a hollow axial member arranged inside the hollow main body. In this bumper stay, the axial member is positioned typically by deforming and crimping a pair of ridges integrally formed inside the hollow main body or by screwing a screw or pin into a hollow portion of the axial member from outside the front and rear walls. The resulting bumper stay has an extra increase in weight, and the axial member is positioned with insufficient reliability.

Accordingly, a fifth object of the present invention is to reliably fix a bumper stay main body to be horizontally crushed to a tubular axial member for reinforcement without extra increase in weight and to prevent the axial member typically from misregistration.

Specifically, the present invention provides a tubular axial member with flange, including: a flange member having a mounting face to be in contact with a mating face of another member; and an axial member being made of a tubular aluminum alloy material and having an end joined to the flange member, wherein the flange member has a hole, and the axial member is placed in the hole, wherein the axial member has a flared portion at an end thereof, the flared portion spreading in a radial direction as a result of electromagnetic forming and being in intimate contact with the flange member, and wherein the axial member has a protrusion formed by electromagnetic forming, and the flange member on the periphery of the hole is held between the flared portion and the protrusion.

The above configuration according to the present invention enables an axial member with flange, such as a bumper stay, which has an axial section free from welding spots and has a flange having an outer diameter larger than the diameter of the axial section without excessive expansion. In addition, such a tubular member with flange can be produced by joining an axial member and a flange member by means of a kind of crimping by one procedure of electromagnetic forming without using welding or mechanical joining according to necessity. The technique does not require excessive or forced expansion and can use an aluminum alloy extrudate having a fiber structure as the axial member. When the resulting article is used typically as a bumper stay, it exhibits excellent properties upon crush.

The tubular aluminum alloy material can be an extrudate as well as a tubular molded article formed by winding a sheet material.

In the axial member with flange, the outer periphery of the axial member is preferably in intimate contact with the inside of a hole flange of the flange member. This stabilizes the flange member joined to the axial member and enables easy positioning of the two members during production.

The present invention is applicable not only to bumper stays but also to general connection members (connection structures).

In the axial member with flange having the above configuration, it is preferred that the hole is arranged to the rear of the mounting face of the flange member, and the tip of the axial member is flush with or to the rear of the mounting face of the flange member.

It is also preferred that the hole is a burring hole being burred from the front, the axial member has an end spreading outward in a radial direction and in intimate contact with the inner periphery of the burring hole, and the tip of the axial member does not protrude frontward from the burring hole and is flush with or to the rear of the mounting face of the flange member.

This prevents a flared portion formed on the tip of an axial member from obstructing the mounting of the flange member to another member in the case where the flange to be in contact with a mating section of another member is fixed to one or two ends of the axial member by electromagnetic forming.

In the axial member with flange having the above configuration, the flange member can have a device for preventing the axial member from rotating. This prevents relative rotation between the flange member and the axial member after electromagnetic forming, since they engage with each other by forming the front or rear of the flange member or the inner periphery of the hole to a specific shape.

The "axis" of the axial member herein means a straight line being in parallel with a longitudinal direction of the axial member and passing through the center of the hole.

In the present invention, when viewed from a hole of a sheet member, the side toward the flared portion (axial flange) is defined as "front (forward)", and an opposite side is defined as "rear (backward)". So, a plane facing forward is defined as "front face (front)" and a plane facing backward is defined as "rear face (rear)".

The flange member can be non-axisymmetric with respect to the axis of the axial member on the front or on the rear thereof. This configuration is typically applied to a region of the flange member around the hole with which the axial flange is in contact. The configuration means that the front face of the flange member has a geometric shape varying around the axis. The use of the flange member having such a shape makes the axial flange and the flange member after electromagnetic forming engage with each other and thereby prevents relative rotation between the flange member and the axial member. In contrast, if the front or rear of flange member in the region is axisymmetric with respect to the axis of the axial member, the axial flange and the flange member do not engage with each other at any point, and relative rotation between them is not prevented upon application of an intensive rotative force.

In the axial member with flange having the above configuration, a portion of the flange member against which a protrusion of the axial member formed as a result of electromagnetic forming hits, namely, a region of the flange member around the hole may be thickened. This configuration prevents distortion and deformation of the portion during electromagnetic forming and avoids the necessity of a mould to be in contact with the flange member for backup during electromagnetic forming. In addition, the configuration more effectively contributes to weight reduction than the case where the entire flange is thickened.

In the axial member with flange having the above configuration, it is possible that the flange member is made of an aluminum alloy extrudate, the flange member comprises an outer portion, an inner portion, and a riser or ramp, the outer portion has a step height with respect to the inner portion, and the riser or ramp connects the outer portion and the inner portion, the outer portion is located to the front of the inner portion, the front face of the outer portion serves as a mounting face to be in contact with a mating face of a counter member, the inner portion has a ridge on the front face, the hole is arranged in the inner portion, the hole penetrates the ridge in part of a circumferential direction, the axial member is made of an aluminum alloy and has a front end protruding frontward from the hole, the protruding portion spreads outward in a radial direction to form a flared portion, the rear face of the flared portion is in contact with the flange member on the periphery of the hole, a portion of the axial member to the rear of the hole expands outward in a radial direction to form a protrusion, and the flange member is held between the flared portion and the protrusion.

When an inner portion of the flange member partially has a ridge, the flange member has a higher rigidity and thereby reduce or avoid distortion in the inner portion during electromagnetic forming. This enables the mounting face of the outer portion to agree with the shape of the mating face of a counter member satisfactorily. In addition, the ridge serves to reduce or avoid distortion of the flange member due to load when the axial member with flange is attached to a counter member. Even when the ridge is formed by thickening part of the inner portion, the configuration does not substantially deteriorate the advantages of weight reduction by using an aluminum alloy. This is because the entire flange member is not thickened.

Furthermore, an axial member with flange having low cost and a light weight can be obtained by forming the flange member and the axial member from an aluminum alloy extrudate.

In the above configurations, when viewed from the hole of the flange member, the side toward the axial flange is defined as "front (forward)", and an opposite side is defined as "rear (backward)". So, a plane facing forward is defined as "front (front face)" and a plane facing backward is defined as "rear (rear face)".

The front of the ridge together with the mounting face is preferably in accordance with the shape of the mating face of the counter member. In this case, if the mating face is a plane, the mounting face is so arranged to be in the same plane with the front of the ridge.

In the axial member with flange, an inner portion of the flange member can be thickened in a region where the ridge is arranged, i.e., the ridge protruding frontward can be formed as a result of thickening. Alternatively, the entire inner portion can protrude frontward in its cross section, i.e., a ridge is arranged in the front and a groove is formed in the rear. The inner portion can have plural ridges.

The present invention further provides axial member with flange, including: a flange member having a through hole at a center part thereof and having a mounting face on the outer periphery of the hole, the mounting face being to be in contact with a mating face of another member; and an axial member being made of a tubular aluminum alloy, being inserted into the hole, being expanded by electromagnetic forming so as to be in intimate contact with the inner periphery of the hole, and being joined to the flange member, wherein the flange member comprises two sheet members each made of an aluminum alloy extrudate, the two sheet members are overlaid with each other so that their extrusion directions intersect with each other, and the hole is arranged at the intersection, and wherein the axial member has a protrusion protruding frontward from the hole, the protrusion spreads outward in a radial direction to form a flared portion, a portion of the axial member to the rear of the hole bulges outward in a radial direction to form a protrusion, and the flange member is held between the flared portion and the protrusion.

The axial member with flange having the above configuration can reduce or avoid distortion of the flange member during electromagnetic forming, since the flange member is made of two sheet members which are overlaid with each other so that their extrusion directions intersect with each other, and this increase the rigidity of the flange member, especially the rigidity of its cutting faces. This configuration prevents the mounting face of the flange member from having a shape not agreeing with the shape of the mating face of a counter member. In addition, the configuration can reduce or avoid distortion of the flange member due to load when the axial member with flange is mounted to a counter member. The sheet members can have a relatively small thickness at the overlaying portion. In this case, the total weight of the flange member does not increase so much even though two sheet members are used, and the advantages of weight reduction by using an aluminum alloy are not deteriorated.

The present invention further provides a connection member including: first and second flange members each having a mounting face to be in contact with a mating face of another member, the first and second flange members being arranged at a distance from each other; a hollow member comprising a pair of ribs connecting the first and second flange members; and an axial member comprising a tubular aluminum alloy material and having both ends fixed to the first and second flange members, respectively, wherein the first and second flanges each have a hole between the pair of ribs, the two ends of the axial member are inserted into the holes and are expanded by electromagnetic forming so as to be in intimate contact with the inner peripheries of the holes, respectively.

The connection member having the above configuration enables the axial member to be fixed to the flange members securely without inviting an extra increase in weight and prevents, for example, misregistration of the axial member. Forming holes for fixing the axial member in the first and second flange members also contributes to weight reduction. When the present invention is applied to a bumper stay, the axial member is reinforced. Thus, the rib is prevented from buckling (inclination) upon collision, and the axial member deforms in the form of bellows to thereby increase the energy absorption.

DETAILED DESCRIPTION OF THE PREFERRED EMBODIMENT

The axial members with flange according to the present invention will be illustrated with reference to FIGS. 1 to 10 by taking bumper stays as an example.

Figure 1:
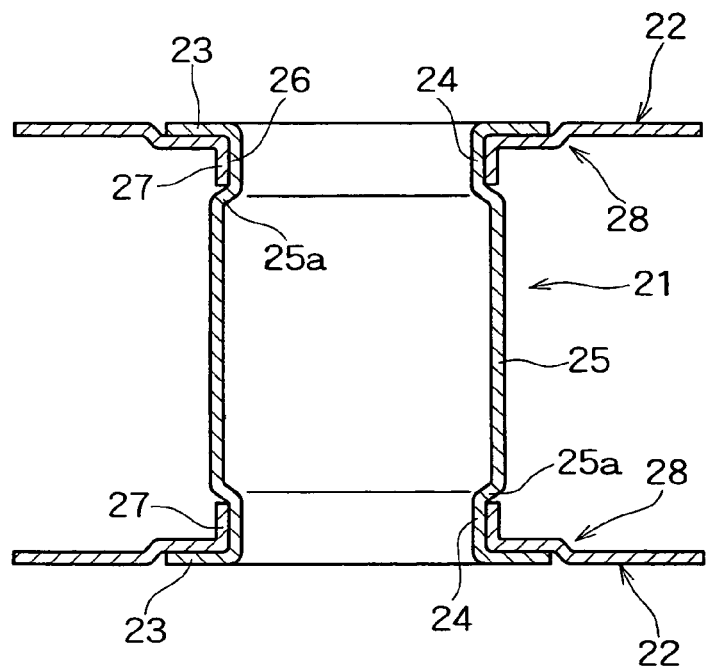
FIG. 1 is a cross sectional view of a bumper stay according to the present invention.

A bumper stay illustrated in FIG. 1 comprises an axial member 21 and a flange member 22. The axial member 21 is made of a tubular aluminum alloy extrudate. The flange member 22 is joined to the both ends of the axial member 21. The axial member 21 has end flanges (flared portions) 23 at its both ends. The end flanges 23 are integral with the axial member 21 and have an outer diameter less than that of the flange member 22. The axial member 21 has the minimum diameter in the vicinity of an end of an axial direction to constitute a small-diameter portion 24, and protrudes outward in a radial direction inside the small-diameter portion 24 to constitute a large-diameter portion (protrusion) 25. The flange member 22 has a hole 26 at its center part, into which the axial member 21 is to be inserted, and a cylindrical hole flange 27 at the rim of the hole 26. The axial member 21 is inserted into the hole 26 of the flange member 22, the end flange 23 is in intimate contact with and laid upon the outer face of the flange member 22, and the end 25a of the protruding large-diameter portion 25 is in contact with the end of the hole flange 27. Consequently, the hole flange 27 is held between the end flange 23 and the large-diameter portion 25. The outer periphery of the small-diameter portion 26 is in intimate contact with the inner periphery of the hole flange 27.

In addition, the flange member 22 has a riser or ramp 28 having a step height substantially equal to the thickness of the end flange 23 so that the end flange 23 properly fits in a depression in the inner radius. Consequently, the outer face of the end flange 23 of the axial member 21 is flush with (has the same height as) a portion of the outer face of the flange member 22 where not lying on the end flange 23.

A production method (electromagnetic forming method) of the bumper stay will be illustrated with reference to FIGS. 2 and 3.

A flange member 22 has the same shape as the flange member illustrated in FIG. 1 and can be produced by drilling a pilot hole at the center of a circular blank (sheet material) while forming an annular riser or ramp 28, and burring the pilot hole to thereby form a cylindrical hole flange 27.

An untreated pipe 31 for use in electromagnetic forming comprises an aluminum alloy extrudate having an outer diameter equal to or slightly smaller than the inner diameter of the hole flange 27.

A mould 32 for use in electromagnetic forming comprises plural divided moulds which are vertically divided. When they are integrated, a through hole 33 is formed at the center thereof, as illustrated in FIGS. 2 and 3. The through hole 33 has a smaller diameter in a region in the vicinity of both ends of the mould 32 in an axial direction corresponding to the length of the hole flange 27 (a small-diameter portions 33a). The inner diameter of the small-diameter portion 33a is set substantially equal to the outer diameter of the hole flange 27 so that the hole flange 27 properly fits. The through hole 33 has a larger diameter in a region (large-diameter portion 33b) inside in an axial direction of the small-diameter portions 33a. The mould 32 has risers or ramps 34a at both end faces 34 so that the flange member 22 properly fits into the end face 34.

Figure 2:
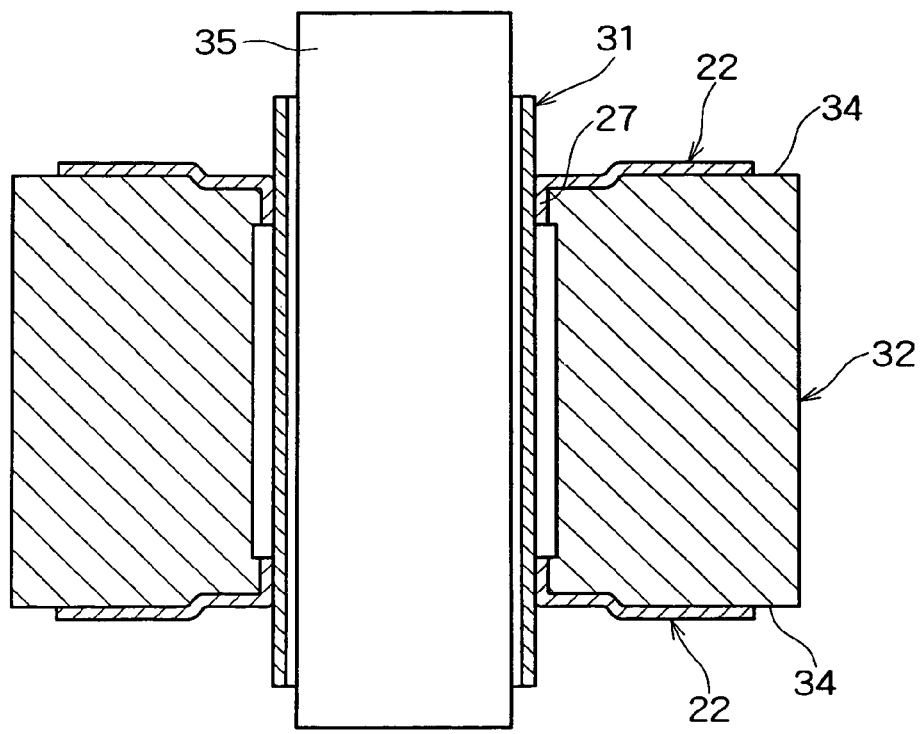
FIG. 2 is a cross sectional view illustrating a method for producing the bumper stay of FIG. 1 by electromagnetic forming.
Figure 3:
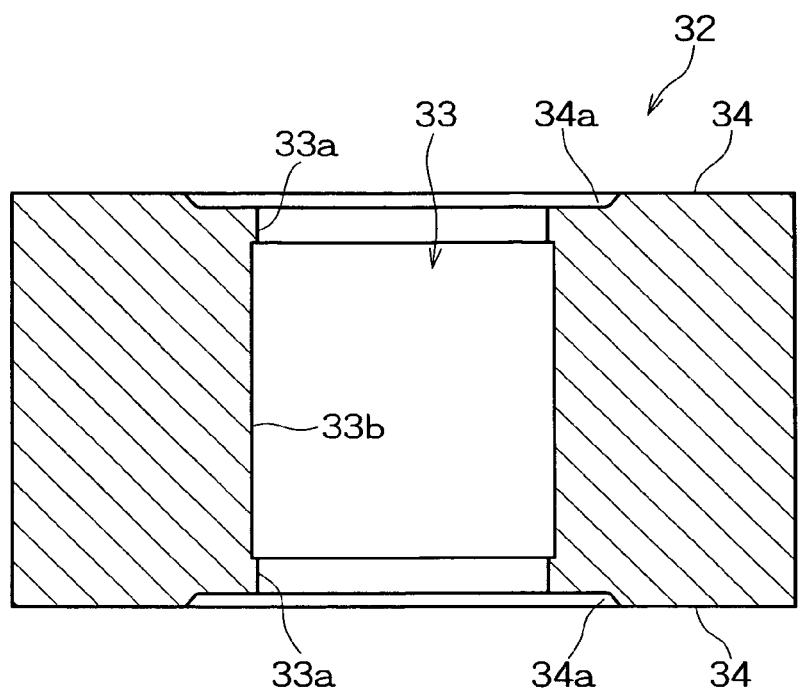
FIG. 3 is a cross sectional view of a mould for electromagnetic forming for use in the method just mentioned above.

With reference to FIG. 2, the flange member 22 is placed on the both end faces 34 of the mould 32 so that the hole flange 27 faces inward in an axial direction, and the untreated pipe 31 is inserted into the hole flange 27. In this procedure, both ends of the untreated pipe 31 are protruded to predetermined lengths from the flange member 22. The protruding length is controlled so that the outer periphery of the end flange 23 after electromagnetic forming is positioned on the inner periphery of the riser or ramp 28 of the flange member 27, as shown in FIG. 1. Namely, the untreated pipe 31 is cut so that the protruding length becomes the above-specified length.

A current-carrying coil 35 for electromagnetic forming is then inserted into the untreated pipe 31, and electric energy accumulated at high voltage in an impulse current generator (not shown) is applied thereto. As a result, the untreated pipe 31 yields magnetic repulsive force and thereby instantaneously expands. The end of the untreated pipe 31 protruding from the flange member 22 largely spreads and hits against the flange member 22. The untreated pipe 31 is pressed to the inner face of the hole flange 27 in a portion corresponding to the small-diameter portion 33a of the through hole 33, and hits against the inner face of the through hole 33 in a region corresponding to the large-diameter portion 33b of the through hole 33. The current-carrying coil 35 for electromagnetic forming comprises an electric insulator and a forming coil embedded in the electric insulator.

The bumper stay illustrated in FIG. 1 is thus molded. After molding, the mould 32 is divided and the bumper stay is taken out therefrom.

In this bumper stay, with expansion of the untreated pipe 31, the axial member 21 in the small-diameter portion 24 after molding is pressed to the hole flange 27, and simultaneously the hole flange 27 of the flange member 22 is held in an axial direction by the axial member 21 between the end flange 23 and the large-diameter portion 25 thereof. Consequently, the flange member 22 is securely joined to the both ends of the axial member 21. The flange member 22 is in contact with the axial member 21 in a large area due to the hole flange 27, and this also contributes to increase in bonding strength. The flange member 22 has a sufficient outer diameter as a bumper stay whereas the end flange 23 of the axial member 21 does not necessarily has an excessively large outer diameter as a result of expansion. Thus, cracking upon electromagnetic forming can be prevented, and an aluminum alloy extrudate having a fiber structure can be used.

In the above example, the hole 26 of the flange member 22 is a round hole. It can also has an elliptic shape or a non-centrosymmetric shape. Examples of such a non-centrosymmetric shape are a shape having an edge most of which is round but part of which is concave, and a shape having an edge most of which is round but part of which is linear. Such cross sectional shapes contribute to preventing the rotation between the axial member 21 and the flange member 22. In any case, the untreated pipe may have a round cross sectional shape. Even when an untreated pipe having a round cross sectional shape is used, the cross section of a portion of the pipe pressed to the inner face of the hole flange as a result of electromagnetic forming is in accordance with the shape of the hole.

The axial member 21 (untreated pipe 31) to be molded by electromagnetic forming comprises an aluminum alloy extrudate having a high electric conductivity and serving to yield high magnetic repulsive force. In contrast, the flange member 22 can comprise an aluminum alloy sheet or a steel sheet, since it is not substantially deformed. It preferably comprises a steel sheet for easier burring. When a steel sheet is used as the flange member 22, the steel sheet is preferably subjected to surface treatment for preventing electrolytic corrosion, such as aluminum plating, at least on a side to be in contact with the axial member 21. Thus, electrolytic corrosion caused as a result of contact of the steel sheet with an aluminum alloy, i.e. the axial member 21 will be prevented.

Such a steel sheet has high strength and yields substantially no expansive force upon electromagnetic forming due to its low electric conductivity. Thus, electromagnetic forming may be carried out without using the mould 32 if the flange member 22 made of a steel sheet has such a strength as to receive the expansive force upon expansion of the untreated pipe 31 and contributes to reliable positioning in moldings as to prevent the flange member 22 typically from misregistration.

Next, other bumper stays and tubular members with flange according to the present invention will be illustrated below.

Figure 4:
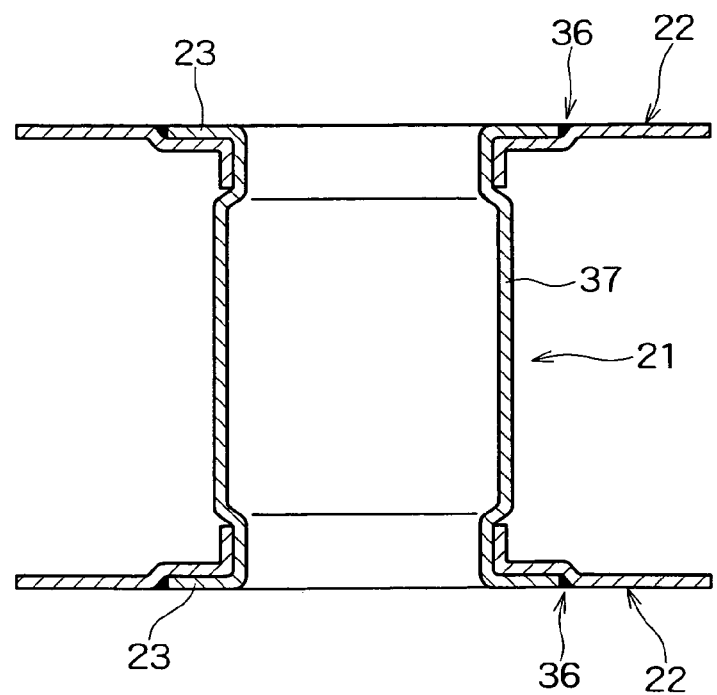
FIG. 4 is a cross sectional view of another bumper stay according to the present invention.

A bumper stay shown in FIG. 4 is substantially the same as the bumper stay shown in FIG. 1, except that an axial member 21 is welded with a flange member 22 so as to join the two members more securely. A welding spot 36 is located at an outer periphery of an end flange 23. The welding spot 36 is away in an outer diameter direction from an axial section 37 of the axial member 21, which axial section 37 corresponds to the small-diameter portions 24 and the large-diameter portion 25 in FIG. 1. Thus, the axial section 37 is prevented from decrease in material properties induced by heat and from unexpectable decrease in energy absorption.

Figure 5:
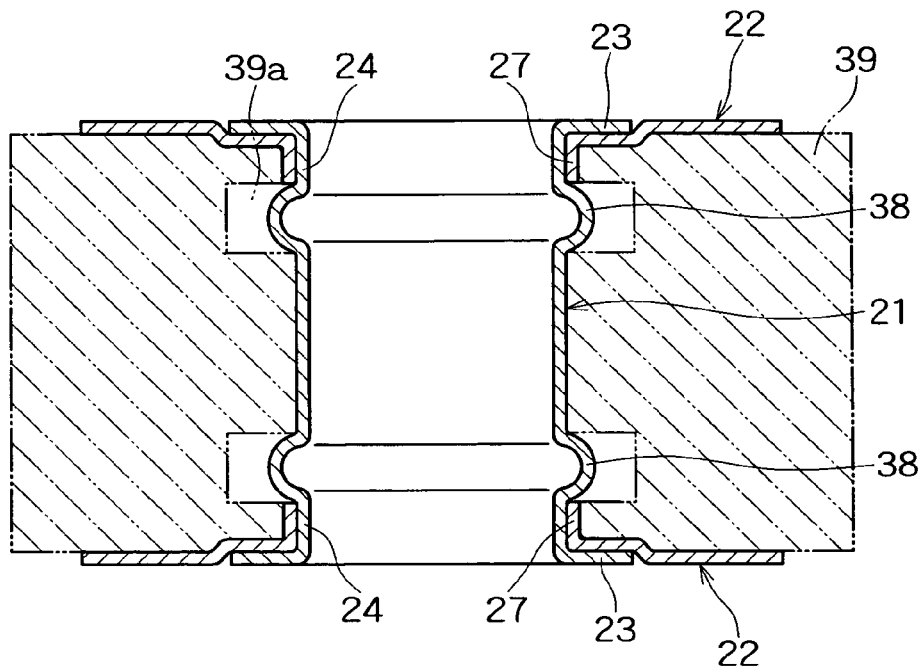
FIG. 5 is a cross sectional view of yet another bumper stay according to the present invention.

A bumper stay shown in FIG. 5 has substantially the same configuration as the bumper stay shown in FIG. 1, except that a large-diameter portion (bead-like protrusion) 38 of an axial member 21 is arranged only in the vicinity of a hole flange 27. A small-diameter portion 24 of an axial section 37 is pressed to a hole flange 27 while the hole flange 27 is held between an end flange 23 and a large-diameter portion 38, and thus the flange member 22 is securely joined to both ends of the axial member 21, as in the bumper stay shown in FIG. 1.

In the production of the bumper stay shown in FIG. 5, an electromagnetic forming mould 39 having a tubular depression 39a in a region corresponding the large-diameter portion 38, as indicated by virtual lines, maybe used. The untreated pipe freely expands (protrudes and deforms) at the depression 39a in accordance with the expansive force applied as a result of electromagnetic forming.

Figure 6:
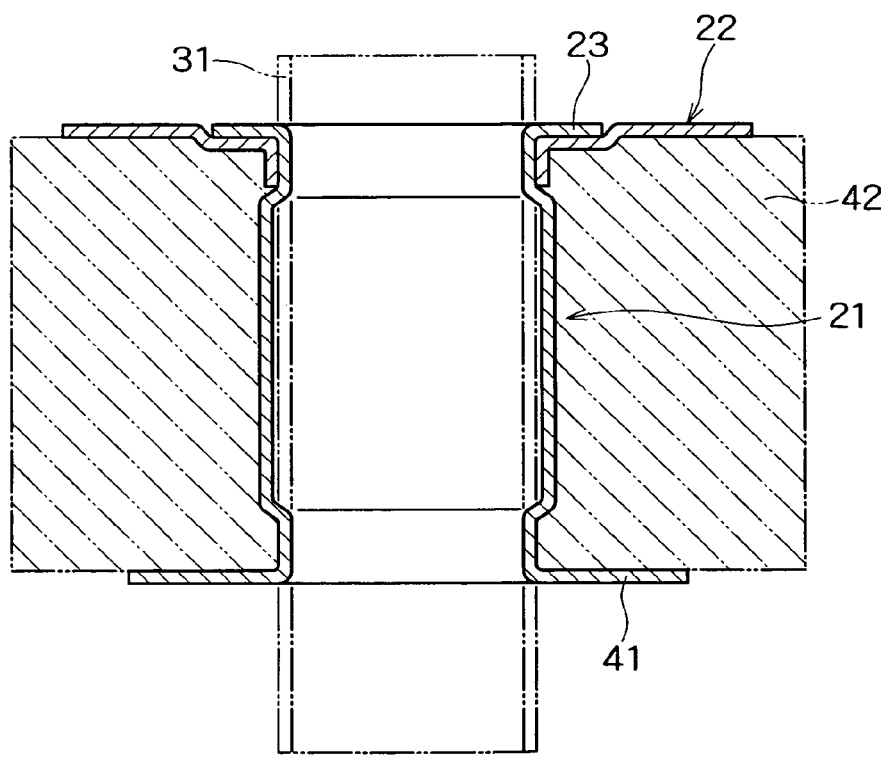
FIG. 6 is a cross sectional view of another bumper stay according to the present invention.

A bumper stay shown in FIG. 6 comprises an axial member 21 and a flange member 22, which flange member 22 is joined to only one end of the axial member 21. An end flange 41 integral with the axial member 21 is used as a mounting flange at the other end. Of mounting flanges of a bumper stay, one near to a side member must have a larger diameter and must be a flange member 22 as an independent component. However, the other one near to a bumper reinforcement may have a relatively small diameter and may be an end flange 41 formed by expanding an end of the axial member 21. In this case, a bumper stay of this type can be used.

FIG. 6 illustrates an electromagnetic forming mould 42 and an untreated pipe 31 indicated by virtual lines, which is used for the molding of the axial member 21.

Figure 7:
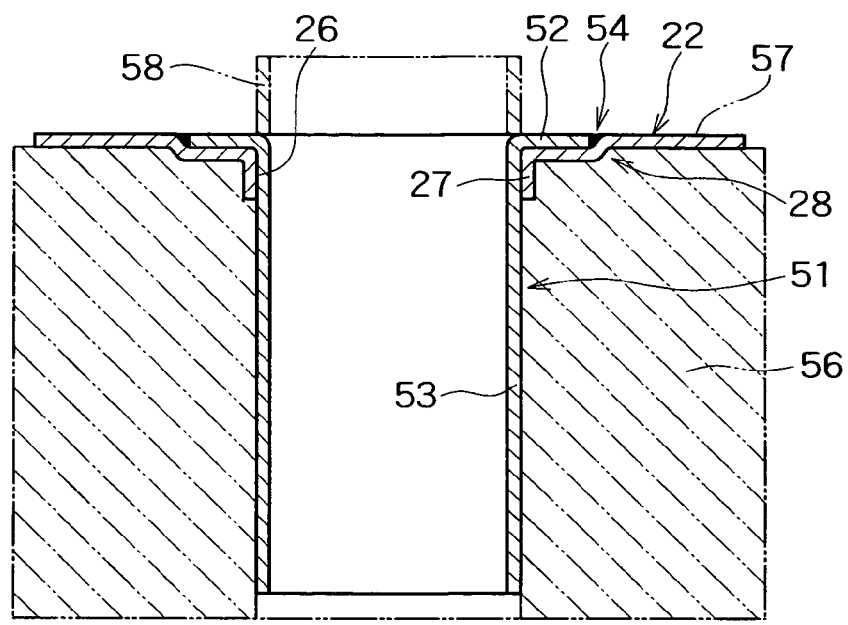
FIG. 7 is a cross sectional view of a tubular member with flange according to the present invention.

A tubular member with flange shown in FIG. 7 comprises an axial member 51 and a flange member 22 being joined to one end of the axial member 51. The flange member 22 has the same shape as the flange member 22 shown typically in FIG. 1, but the axial member 51 has an end flange 52 integrally arranged at one end thereof and has neither flange nor protrusion at the other end.

In the tubular member with flange, the axial member 51 is placed in a hole 26 of the flange member 22, the end flange 52 is in intimate contact with and matches with the outer face of the flange member 22, and the outer periphery of an axial section 53 is in intimate contact with the inner periphery of a hole flange 27. The flange member 22 has a riser or ramp 28 substantially corresponding to the thickness of the end flange 52. The end flange 52 fits in a depression inside in a radial direction. The axial member 51 and the flange member 22 are welded at a welding spot 54 on the outer periphery of the end flange 52. The outer face of the end flange 52 of the axial member 51 is substantially flush with a portion of the outer face of the flange member 22 where not lying over the end flange 52.

The tubular member with flange has an advantage that the axial section 53 is prevented from heat-induced decrease in material properties, since the welding spot 54 is away in an outer diameter direction from the axial section 53 of the axial member 51, as in the bumper stay shown in FIG. 4.

To mold the tubular member with flange by electromagnetic forming, a flange member 22 is placed on an end face 57 of an electromagnetic forming mould 56 (a virtual line in FIG. 7) so that a hole flange 27 faces inward in an axial direction. Then, an untreated pipe 58 (a virtual line in FIG. 7) made of a tubular aluminum alloy extrudate is inserted into the hole flange 27. In this procedure, an end of the untreated pipe 58 is protruded to a predetermined length from the flange member 22. The protruding length is controlled in the same manner as described with reference to FIG. 2. The end face 57 of the mould 56 has the same shape as the mould 32 shown in FIG. 3. The through hole of the mould 56 has a large diameter in a region in the vicinity of the end face 57 corresponding to the length of the hole flange 27, and the diameter of the through hole in this region is substantially the same as the outer diameter of the hole flange 27 so that the hole flange 27 properly fits therein. In the other region, the through hole has a diameter substantially equal to or slightly larger than the outer diameter of the untreated pipe 58.

Next, electromagnetic forming is carried out in the same manner as above, and the untreated pipe 58 instantaneously expands. Consequently, the end of the untreated pipe 58 protruding from the flange member 22 largely spreads and hits against the flange member 22. Inside the through hole of the mould 56, the untreated pipe 58 is pressed to the inner periphery of the hole flange 27 and to the through hole.

The end flange 52 may also be molded by pressing (pressing expansion). The axial member 51 maybe inserted into the flange member 22 after molding the end flange 52 or, alternatively, the end flange may be molded after inserting the untreated pipe 58 into the flange member 22.

Figure 8:
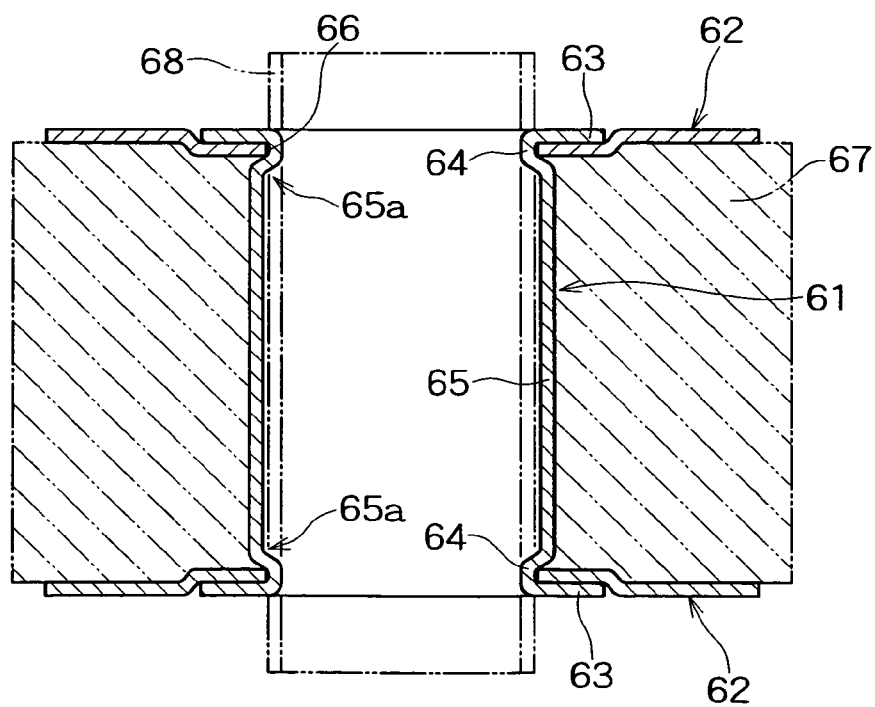
FIG. 8 is a cross sectional view of yet another bumper stay according to the present invention.

A bumper stay shown in FIG. 8 comprises an axial member 61 and flange members 62 being joined to both ends of the axial member 61. The axial member 61 has end flanges 63 integrally arranged at both ends. The end flange 63 has an outer diameter smaller than that of the flange member 62. The axial member 61 has a minimum diameter in the vicinity of an end in an axial direction to constitute a small-diameter portion 64, has a larger diameter and protrudes outward in an outer diameter direction inside in an axial direction of the small-diameter portion 64, to constitute a large-diameter portion 65. The flange member 62 has a hole 66 at its center part, to which hole the axial member 61 is to be inserted. The axial member 61 is placed in the hole 66 of the flange member 62. The end flange 63 is in intimate contact with the outer face of the flange member 62, and an end 65a of the protruding large-diameter portion 65 is in contact with the inside of the flange member 62. Consequently, the flange member 62 on the periphery of the hole 66 is held between the end flange 63 and the large-diameter portion 65. The outer periphery of the small-diameter portion 64 is in intimate contact with the inner rim of the hole 66. Specifically, the bumper stay shown in FIG. 8 differs from the bumper stay shown in FIG. 1 only in that the flange member 62 has no hole flange 27 in contrast to the flange member 22 shown in FIG. 1, and along with this, the shape of the axial member 61 differs from that of the axial member 21 shown in the FIG. 1. Also in this case, the axial member 61 and the flange member 62 can be welded in the same manner as in FIG. 4.

FIG. 8 also illustrates an electromagnetic forming mould 67 and an untreated pipe 68 by virtual lines.

Figure 9:
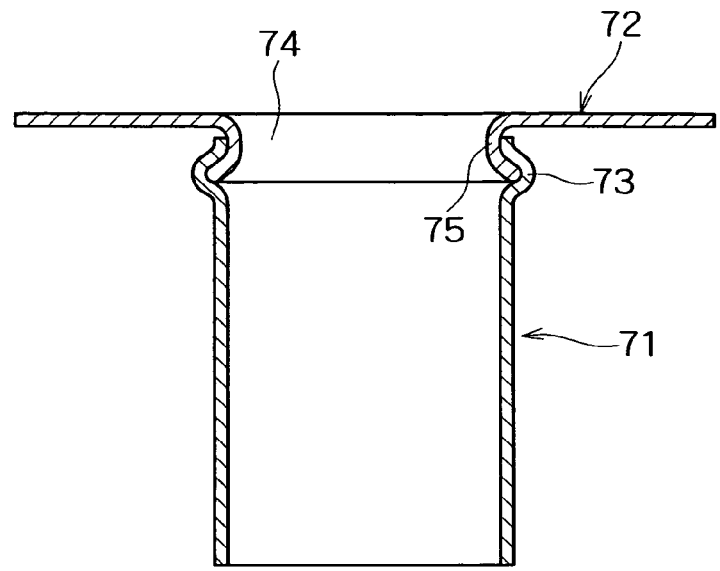
FIG. 9 is a cross sectional view of another tubular member with flange according to the present invention.

A tubular member with flange shown in FIG. 9 comprises an axial member 71 made of a tubular aluminum alloy extrudate, and a flange member 72 joined to an end of the axial member 71. The axial member 71 has an annular protrusion 73 in the vicinity of the end. The flange member 72 has a hole 74 at its center part, the entire edge of the hole 74 is curved toward the axial member 71. The tip of the curved portion 75 fits into the protrusion 73 from the inside and is in contact with the bottom, while the outer periphery of the curved portion 75 is in intimate contact with the inner periphery of the axial member 71 at the end thereof.

A production method (electromagnetic forming method) of the tubular member with flange will be illustrated with reference to FIG. 10.

An untreated pipe 76 is made of a cylindrical aluminum alloy extrudate. A flange material 77 comprises an aluminum alloy sheet with a hole 78 at its center part. The hole 78 has a diameter smaller than that of the hole 74. One face of the flange material 77 is in contact with an end face of the untreated pipe 76, and the hole 78 is located at the center of the untreated pipe 76 in cross section. The flange material 77 has a portion inclined toward the untreated pipe 76 in the vicinity of the edge of the hole 78.

A mould for use in electromagnetic forming comprises a main mould 81 and a presser mould 82. The main mould 81 comprises plural moulds divided vertically. When the divided moulds are integrated, a through hole 83 is formed at the center part, and an annular depression 83a is formed in the vicinity of an end of the through hole 83, as illustrated in FIG. 10. The through hole 83 has an inner diameter substantially equal to the outer diameter of the untreated pipe 76, except for the depression 83a. The presser mould 82 also has a through hole 84 at the center part.

Figure 10:
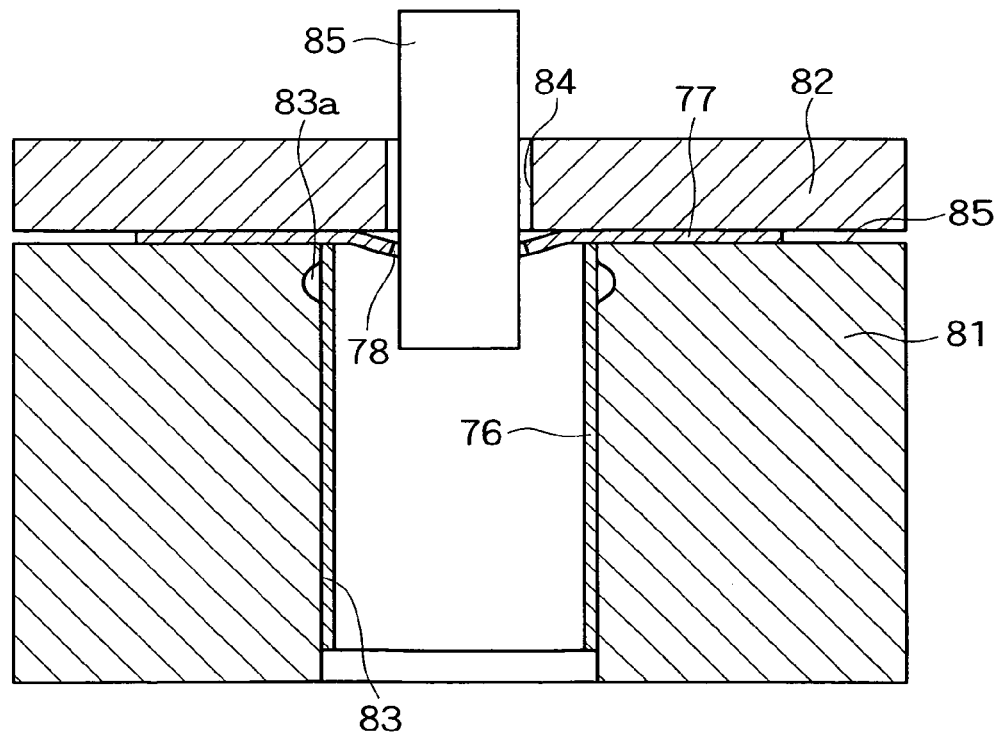
FIG. 10 is a cross sectional view illustrating a method for producing the tubular member with flange of FIG. 9 by electromagnetic forming.

With reference to FIG. 10, the untreated pipe 76 is inserted into the main mould 81 and is positioned so that an end face (upper end) thereof is substantially flush with an end face 85 of the main mould 81. The flange material 77 is placed on the end face 85 of the main mould 81 and is pressed at its top by the presser mould 82. A current-carrying coil 86 for electromagnetic forming is then inserted into the flange material 77 and the untreated pipe 76, and an electric energy is applied. Thus, the periphery (a portion inside the cross section of the untreated pipe 76) of the hole 78 of the flange material 77 and the untreated pipe 76 instantaneously expand, the flange material 77 largely spreads in the vicinity of the edge of the hole 78 and hits against the inner periphery of the untreated pipe 76 in the vicinity of the end. The vicinity of the end of the untreated pipe 76 protrudes into the depression 83a to form the protrusion 73. Consequently, a curved portion 75 is formed at the edge of a hole 74, the outer periphery of the curved portion 75 is brought into intimate contact with the end inner periphery of the axial member 71 while the curved tip of the curved portion 75 fits into the protrusion 73 of the axial member 71 from the inside. Thus, the axial member 71 and the flange member 72 are joined to each other.

The resulting tubular member with flange is free from cracking during the electromagnetic forming and may use an aluminum alloy extrudate having a fiber structure as the axial member 71. This is because there is no need of expanding the axial member 71 and the flange member 72 so much.

Other embodiments of the axial member with flange according to the present invention will be illustrated below, with reference to FIGS. 11 to 25.

FIGS. 11 to 16 illustrate embodiments of the axial members with flange, in which the front of a flange member, specifically in a region around the hole with which an axial flange is in contact with, is not axisymmetric with respect to the axis of the axial member.

Figure 11:
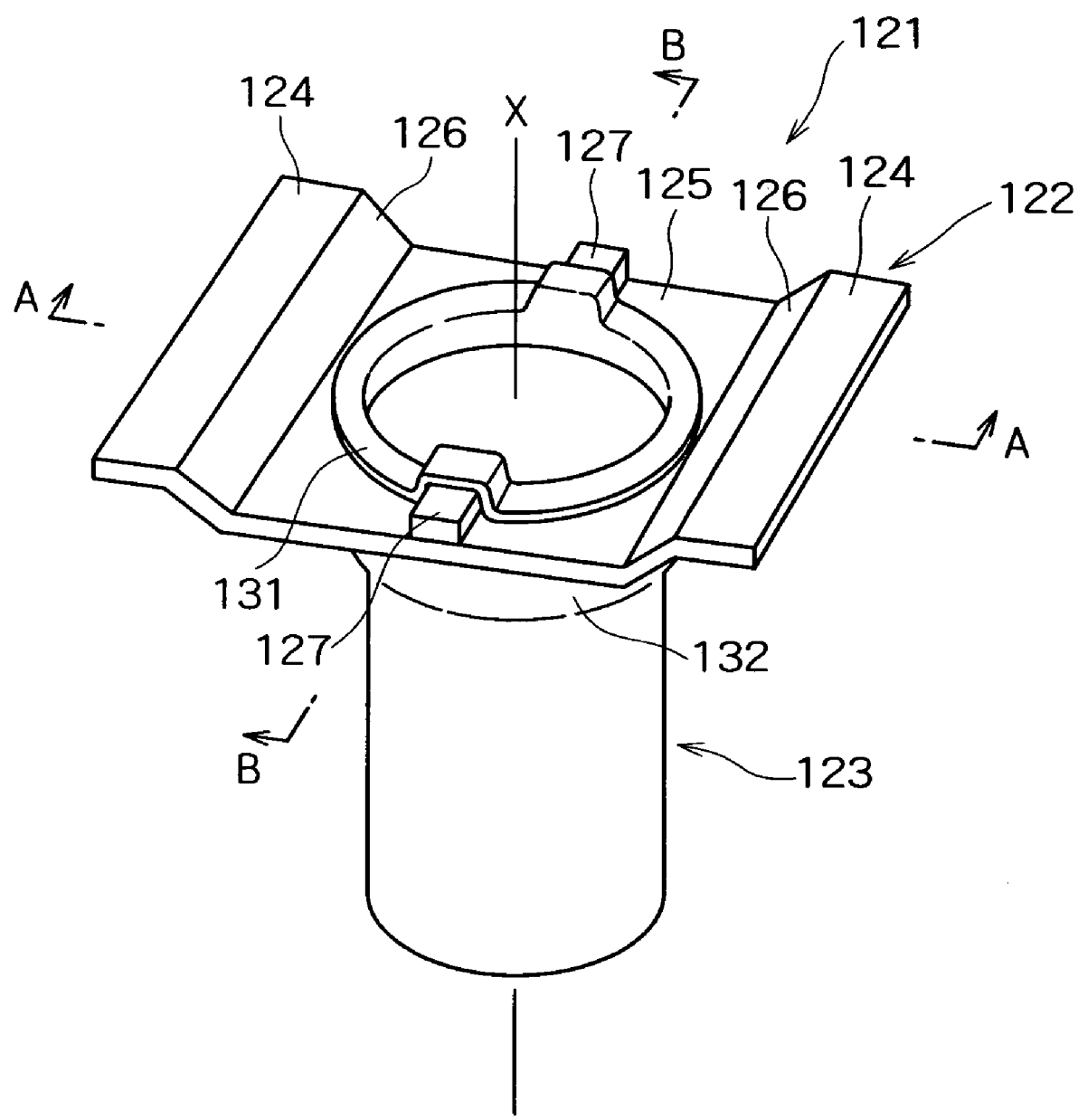
FIG. 11 is a perspective view of an axial member with flange according to the present invention.
Figure 14:
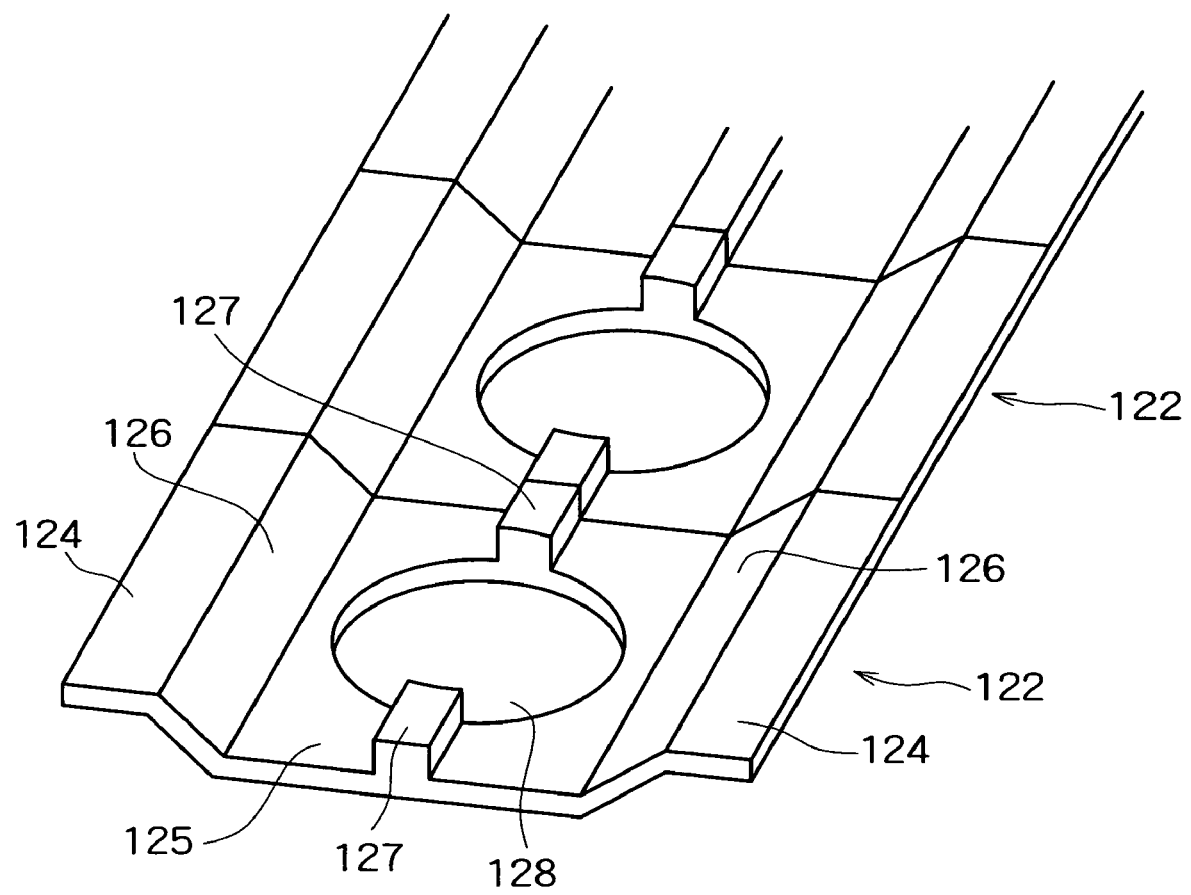
FIG. 14 is a perspective view of a flange member of the axial member with flange illustrated in FIG. 11.

An axial member with flange 121 shown in FIG. 11 comprises a sheet flange member 122 and a tubular axial member 123 being joined to the flange member 122 at one end thereof. The flange member 122 is made of an aluminum alloy extrudate and is formed by cutting the extrudate in a plane perpendicular to the extrusion direction to a predetermined length, as illustrated in FIG. 14 in which the line of cutting plane is indicated by a virtual line. The flange member 122 comprises right and left outer portions 124, an inner portion 125, and right and left ramps 126 connecting the inner portion 125 and the outer positions 124. The outer portions 124 and the inner portion 125 are sheets in parallel with one another. The front faces of the outer portions 124 are located frontward from the front face of the inner portion 125 and serve as a mounting face to be in contact with a mating face (plane) of a counter member (not shown). The axial member 123 is vertically joined to the inner portion 125.

The flange member 122 is a sheet member having, as a whole, a substantially uniform thickness but has a ridge 127 at the front center part of the inner portion 124. The ridge 127 has a rectangular cross sectional shape and a larger thickness than the other portions of the flange member 122. The flange member 122 also has a round hole 128 at the center part of the inner portion 125, and the hole 128 penetrates the ridge 127 in a thickness direction of the sheet partly in its circumferential direction. Consequently, the inner periphery of the hole 128 is high at the ridge 127 and is low in the other region.

The axial member 123 is made of an aluminum alloy extrudate having a round cross sectional shape, and the untreated pipe (extrudate) is cut in a plane perpendicular to the extrusion direction to a predetermined length.

Materials for the flange member 122 preferably have a high strength and a low electric conductivity. Preferred examples thereof are T5 tempered materials specified in Japanese Industrial Standards (JIS) 5000 series, JIS 6000 series or JIS 7000 series. Materials for the axial member preferably exhibit satisfactory moldability and have a high electric conductivity. Preferred examples thereof are materials specified in JIS 6000 series, such as one specified in JIS 6063. The axial member is preferably made of an aluminum alloy extrudate but may be made of an aluminum alloy sheet by bending.

Figure 12:
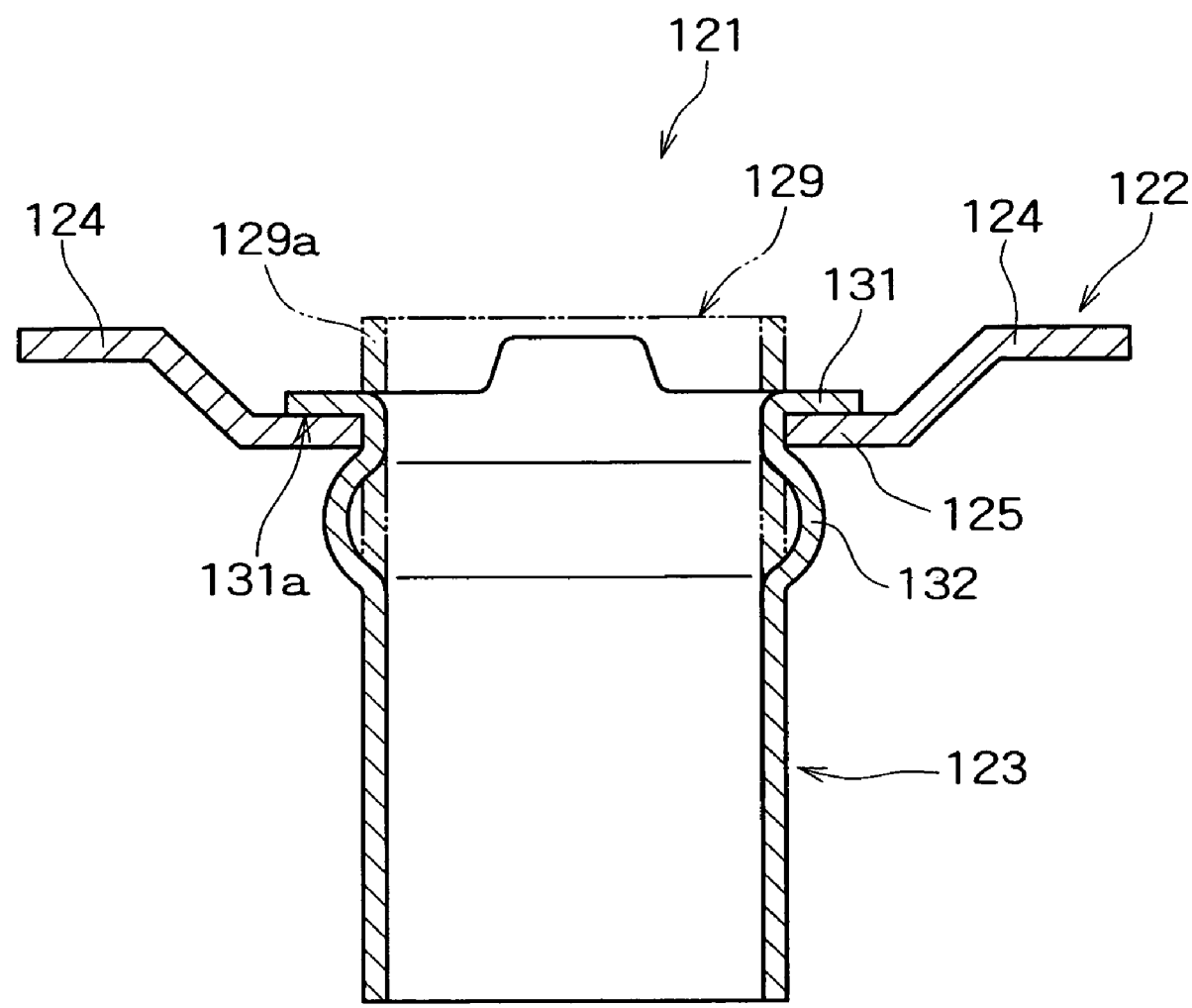
FIG. 12 is a cross sectional view taken along line A-A in FIG. 11.
Figure 13:
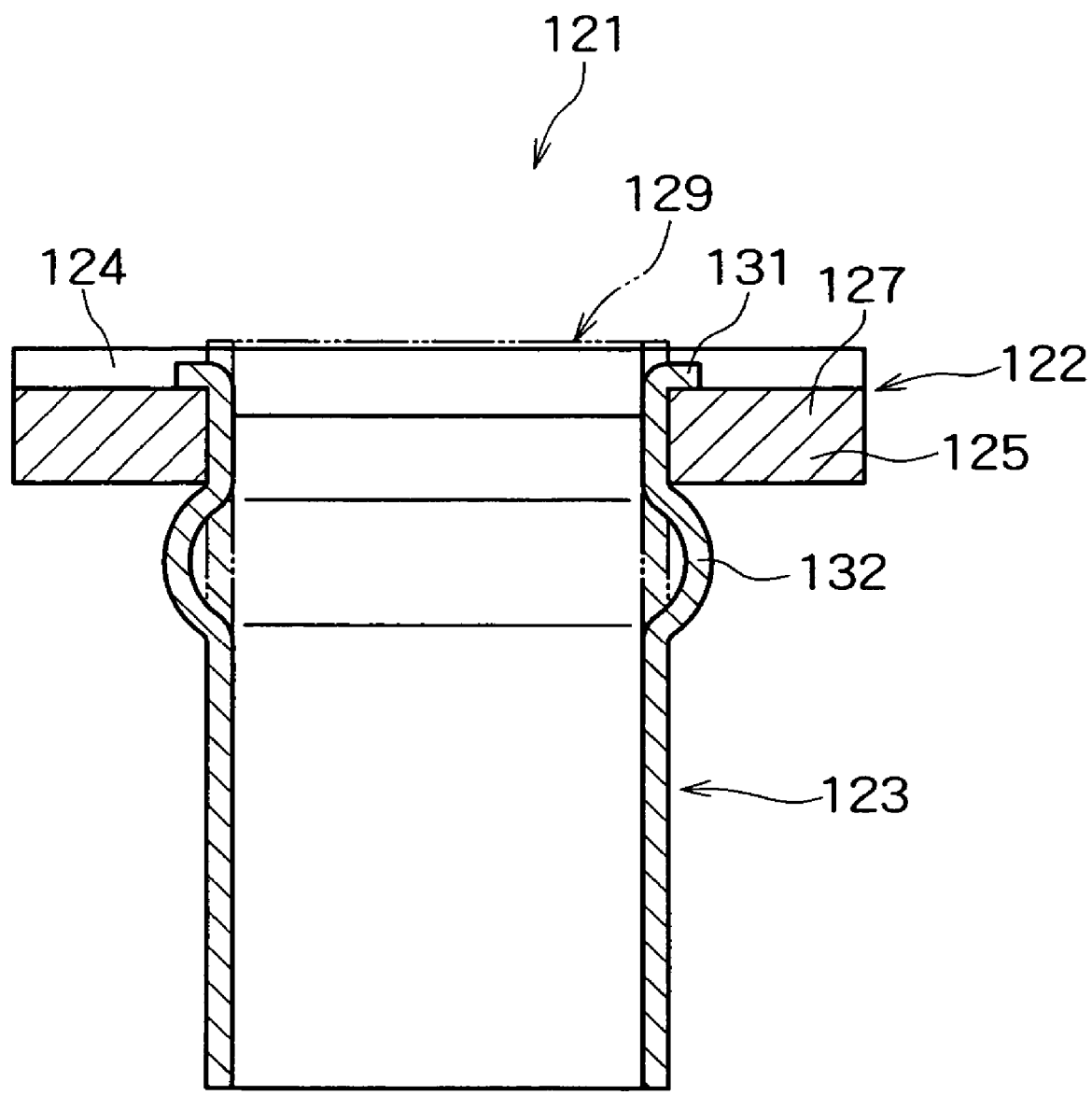
FIG. 13 is a cross sectional view taken along line B-B in FIG. 11.

The axial member with flange 121 is produced in the following manner. Initially, an untreated pipe 129 is inserted into a hole 128 of a flange member 122 so that the front end of the untreated pipe 129 protrudes from the hole 128. The flange member 122 and the untreated pipe 129 are positioned by a device (not shown), as illustrated in FIGS. 12 and 13.

Next, an electromagnetic forming coil (not shown) is inserted into the untreated pipe 29, and electromagnetic forming is carried out. Consequently, with reference to FIGS. 11 to 13, the untreated pipe 129 inside the hole 128 expands and comes into intimate contact with the inner periphery of the flange member 122 around the hole 128, the protruding portion 129a protruding frontward from the hole 122 spreads outward in a radial direction to form an axial flange (flared portion) 131, and a rear end 131a of the axial flange 131 hits against and comes into intimate contact with the front face (including the front face of the ridge 127) of the inner portion 125 around the hole 128. In addition, the untreated pipe 129 near to the rear of the hole 128 bulges outward in a radial direction in accordance with the intensity of the expansive force by the action of the repulsive force of the magnetic field to thereby form a protrusion 132.

In the resulting axial member with flange 121, an axial member 123 after expansion (the untreated pipe after molding is referred to as "axial member 123) is in intimate contact with the inner periphery of the flange member 122 around the hole 128, the flange member 122 is held from the front and the rear between the axial flange 131 and the protrusion 132 in a region around the hole 128, and the ridge 127 is crimped by the axial flange 131 in a horizontal direction (right and left direction). The ridge 127 and the axial flange 131 engage with each other and their relative rotation is prevented even if a force acts to rotate the flange member 122 around the axis X of the axial member 123.

The front shape of the flange member 122 in a region around the hole 128 with which the axial flange 131 is in contact will be explained in more detail. Specifically, the front face of the flange member 122 in this region is in one plane perpendicular to the axis X of the axial member 123, except for the ridge 127. The front face is not axisymmetric with respect to the axis X due to the ridge 127, and this yields the engagement between the axial flange 131 and the flange member 122 (in the ridge 127). As the flange member 122 is made of an extrudate, the ridge 127 is also present in the other region than the region around the hole 128 where the axial flange 131 is in contact. However, the flange member 122 (the ridge 127) does not engage with the axial flange 131 in the other region, and whether or not the ridge 127 is present in the other region is not an issue to achieve the objects of the present invention.

The same advantages as above can be obtained when the flange member 122 has a groove in its front instead of the ridge 127.

Figure 15:
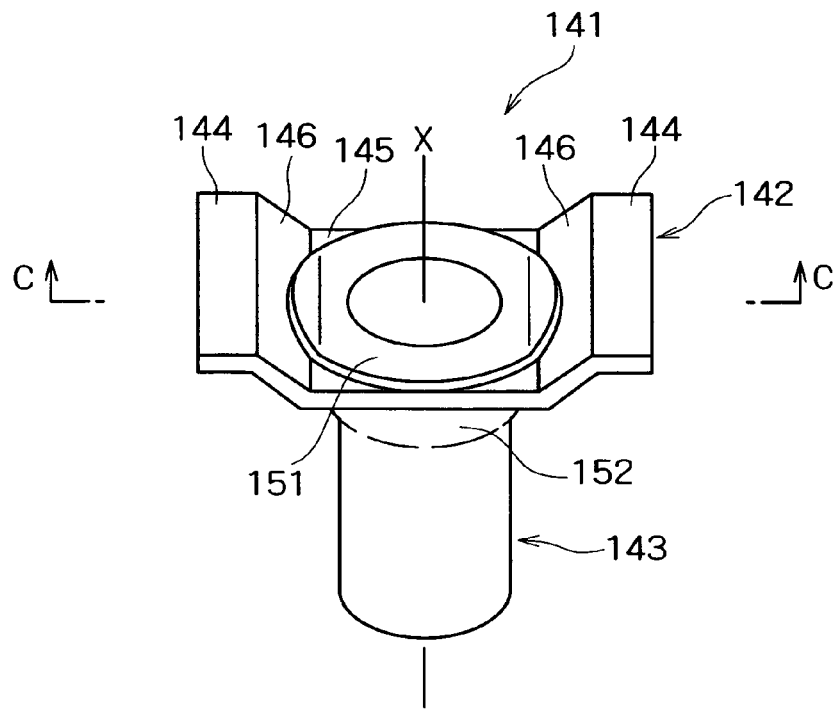
FIG. 15 is a perspective view of another embodiment of the axial member with flange according to the present invention.

An axial member with flange 141 shown in FIG. 15 comprises a sheet flange member 142 and a tubular axial member 143 joined at an end to the flange member 142. The flange member 142 is made of an aluminum alloy extrudate and is formed by cutting the extrudate in a plane perpendicular to the extrusion direction to a predetermined length. It comprises right and left outer portions 144, an inner portion 145, and right and left inclined ramps (risers) 146 connecting the inner portion 145 and the outer portions 144. The inner portion 145 has a round hole 148 in its thickness direction. This flange member 142 corresponds to the flange member 122 illustrated in FIG. 14, except for not having the ridge 127 and having a flat plane as the front of the inner portion 125. The flange member 142 is a sheet member having a substantially uniform thickness as a whole. The front faces of the outer portions 144 serve as a mounting face to be in contact with a mating face of another member (not shown), as in the flange member 122. The axial member 143 is vertically joined to the inner portion 145.

Figure 16:
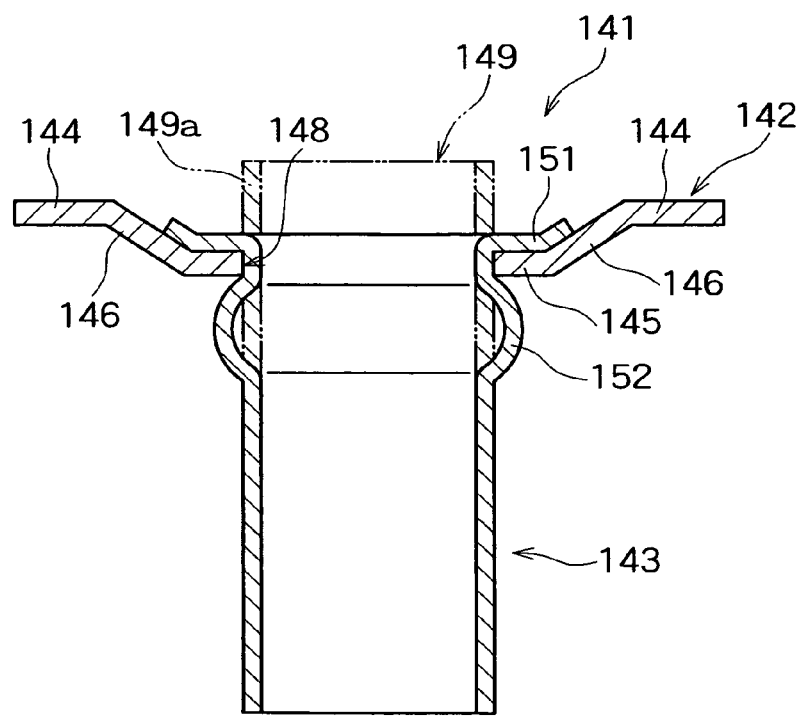
FIG. 16 is a cross sectional view taken along line C-C in FIG. 15.

The axial member 143 is made of an aluminum alloy extrudate and is formed by cutting an untreated pipe 149 in a plane perpendicular to the extrusion direction to a predetermined length, as shown in FIG. 16.

The axial member with flange 141 is produced in the same manner as the axial member with flange 121. With reference to FIGS. 15 and 16, the axial member with flange 141 is produced in the following manner. Inside the hole 148, the untreated pipe 149 expands and comes into intimate contact with the inner periphery of the flange member 142 around the hole 148. A protruding portion 149a of the untreated pipe 149 protruding frontward from the hole 148 spreads outward in a radial direction to form an axial flange 151. The rear face of the protruding portion 149a hits against and comes into intimate contact with the front of the inner portion 124 and partially to the inclined ramp 146 around the hole 148. The untreated pipe 149 to the rear of the hole 148 bulges outward in a radial direction in accordance with the intensity of the expansive force induced by the repulsive force of a magnetic field to form a protrusion 152.

In the axial member with flange 141, the expanded axial member 143 (the untreated pipe after molding is referred to as "axial member 143") is in intimate contact with the inner periphery of the flange member 142 around the hole 148, and the flange member 142 is held, from the front and the rear, between the axial flange 151 and the protrusion 152 around the hole 128. The axial flange 151 is in contact both with the inner portion 145 and the inclined ramp 146 of the flange member 142. The ramp 146 and the region of the axial flange 151 in contact with the riser or ramp 146 together serve to latch the relative rotation between the flange member 142 and the axial member 143. This prevents the relative rotation between the flange member 142 and the axial member 143 even if a force acts to rotate the flange member 142 around the axis X of the axial member 143.

The front of the flange member 142, particularly in a region around the hole 148 with which the axial flange 151 is in contact, is not axisymmetric with respect to the axis X of the axial member 143 due to the presence of the ramp 146 in the region, although the front face of inner portion 145 is a plane perpendicular to the axis X of the axial member 143. In addition, being not axisymmetric provides the engagement between the axial flange 151 and the flange member 142 (the ramp 146).

Figure 17:
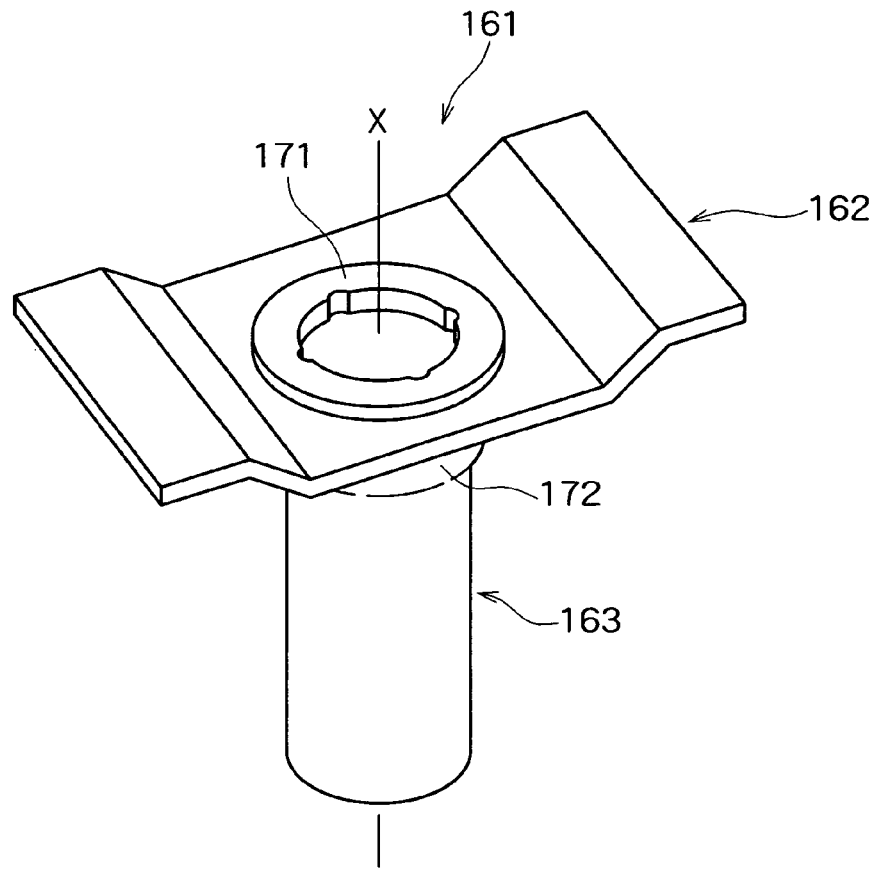
FIG. 17 is a perspective view of yet another embodiment of the axial member with flange according to the present invention.
Figure 18:
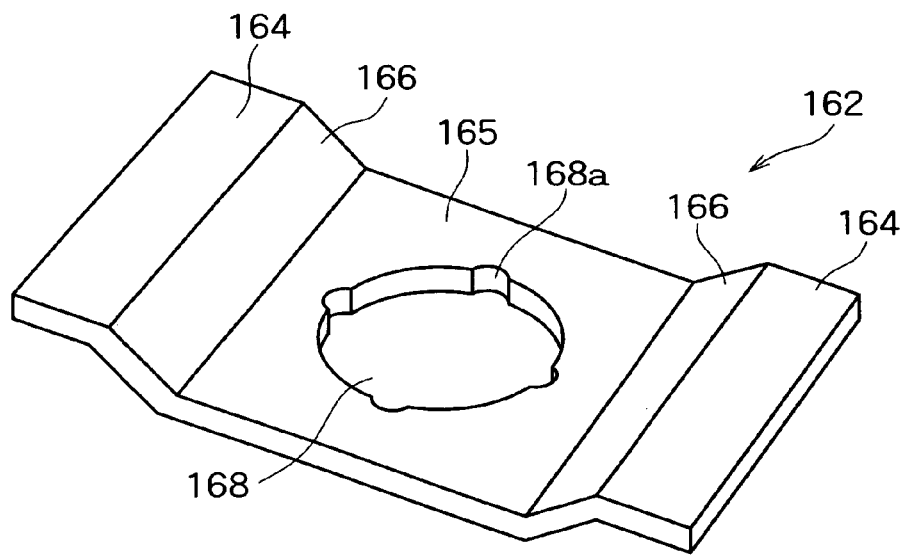
FIG. 18 is a perspective view of a flange member of the axial member with flange illustrated in FIG. 17.

FIGS. 17 and 18 illustrate a specific configuration of an axial member with flange in which a hole in a flange member has a non-circular shape in an axial direction of the axial member.

An axial member with flange 161 illustrated in FIG. 17 comprises a sheet flange member 162 and a tubular axial member 163 to which end the flange member 162 is joined. With reference to FIG. 18, the flange member 162 is made of an aluminum alloy extrudate having the same cross section as the flange member 142 and is formed by cutting the extrudate in a plane perpendicular to the extrusion direction to a predetermined length. The flange member 162 is a sheet member having a substantially uniform thickness and comprises right and left outer portions 164, an inner portion 165 and right and left ramps 166 connecting the inner portion 165 and the outer positions 164. The front faces of the outer portions 164 serve as a mounting face to be in contact with a mating face of another member (not shown). The inner portion 165 has a hole 168 in its thickness direction. Part of the round periphery of the hole 168 protrudes outward in a radial direction as an arc to form protrusions 168a. The axial member 163 is vertically joined to the inner portion 165.

The axial member with flange 161 is produced in the same manner as the axial member with flange 121. In the axial member with flange 161, the expanded axial member 163 comes into intimate contact with the inner periphery, including the inner periphery of the protrusion 168a, of the flange member 162 around the hole 168, and the flange member 162 is held between the axial flange 171 and the protrusion 172 from the front and the rear around the hole 168, as in the axial member with flange 121. Part of the axial member 162 bulges into the protrusion 168a of the hole 168, and this allows the flange member 162 and the axial member 163 to latch each other in the region. Thus, the relative rotation between the flange member 162 and the axial member 163 can be prevented even if a force acts to rotate the flange member 142 around the axis X of the axial member 143.

Examples of such holes having a non-circular shape include not only a hole having a circular periphery part of which protrudes outward in a radial direction as in the hole 168, but also a hole having a circular periphery part of which protrudes inward in a radial direction, a hole having a circular periphery part of which is linear, such as in a racetrack, a hole having an elliptic shape as a whole, and other holes having various shapes.

Figure 19:
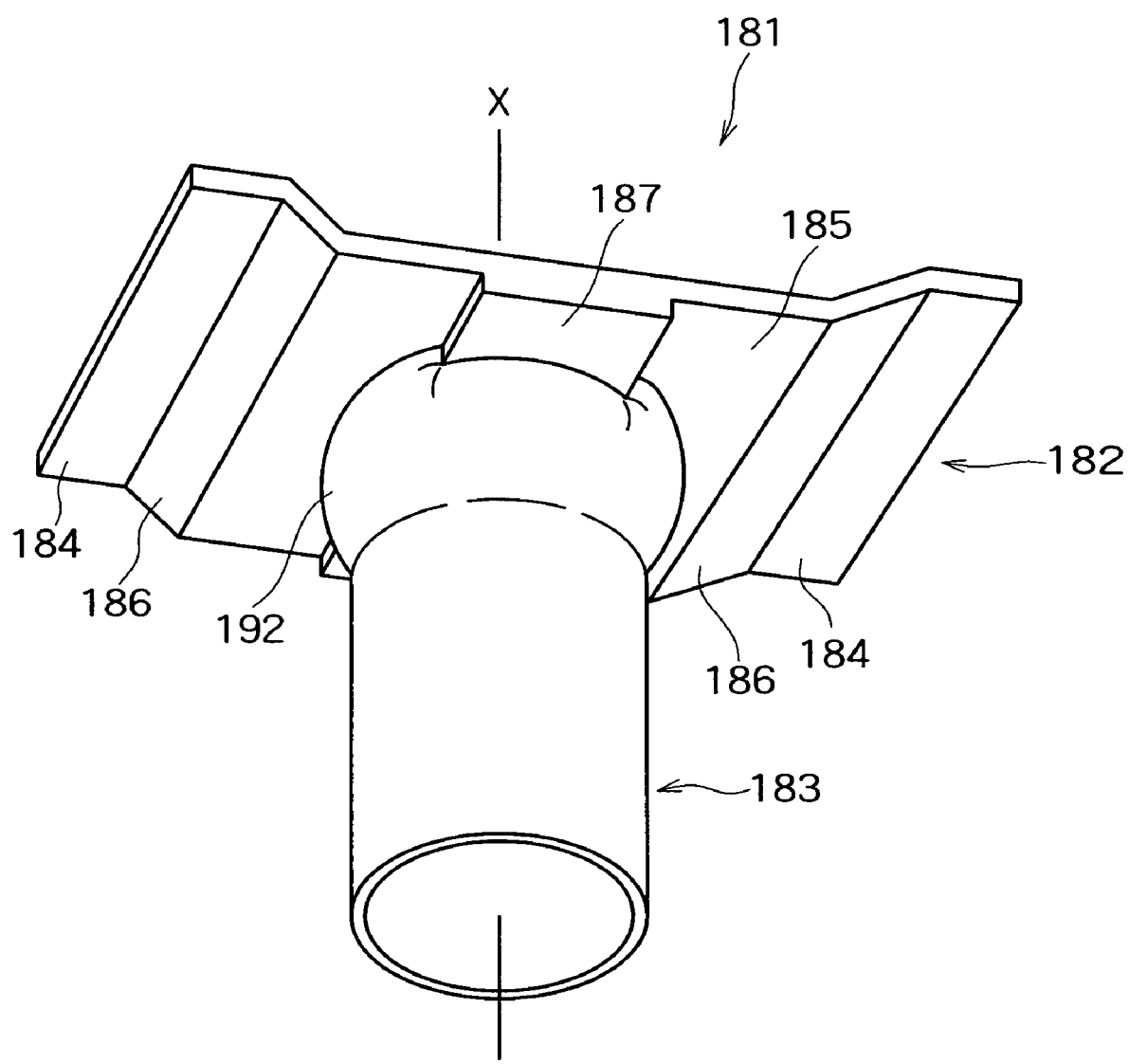
FIG. 19 is a perspective view (rear side) of an axial member with flange as yet another embodiment according to the present invention.
Figure 20:
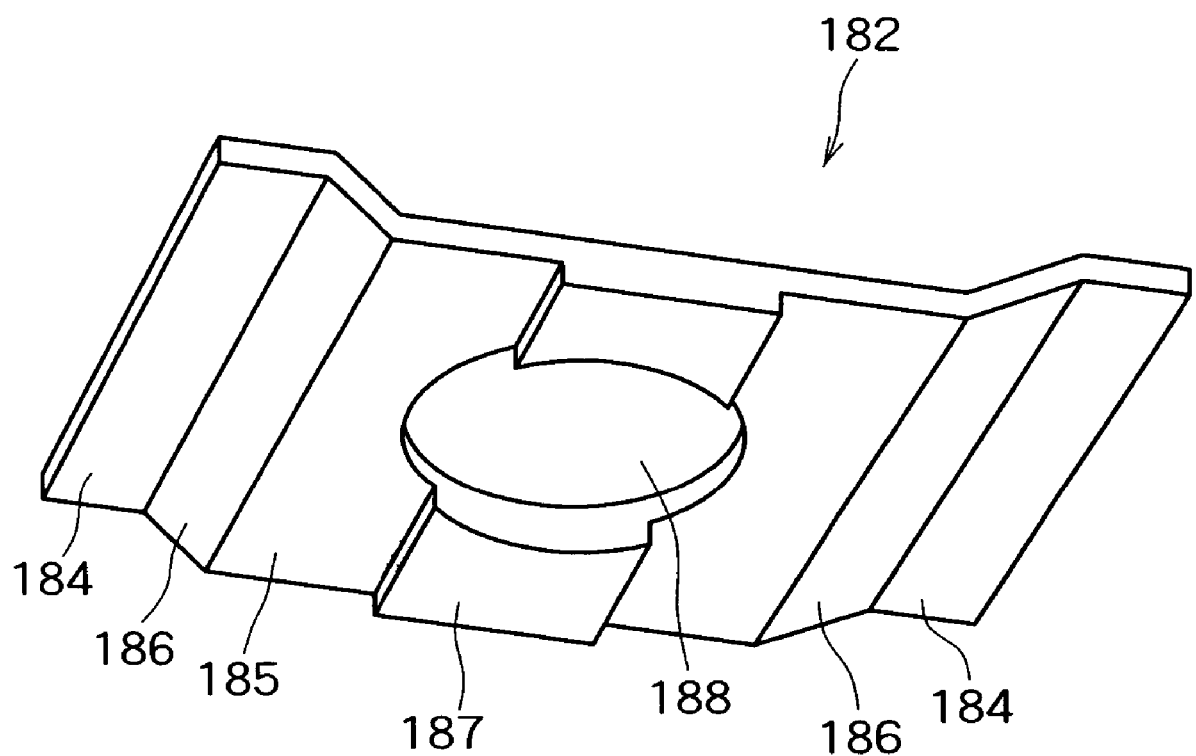
FIG. 20 is a perspective view (rear side) of the flange member of the axial member with flange illustrated in FIG. 19.

FIGS. 19 and 20 illustrate an axial member with flange in which the rear of a flange member, particularly in the periphery of a hole, is not axisymmetric with respect to the axis of an axial member.

An axial member with flange 181 illustrated in FIG. 19 comprises a sheet flange member 182 and a tubular axial member 183 to which end the flange member 182 is joined. The flange member 182 is made of an aluminum alloy extrudate and is formed by cutting the extrudate in a plane perpendicular to the extrusion direction to a predetermined length.

With reference to FIG. 20, the flange member 182 comprises right and left outer portions 184, an inner portion 185 and right and left ramps 186 connecting the inner portion 185 and the outer portions 184. The front faces of the outer portions 184 serve as a mounting face to be in contact with a mating face of another member (not shown). The inner portion 185 has a ridge 187 at the center part on the rear side thereof and has a larger thickness in the ridge 187. The ridge 187 has a rectangular cross sectional shape. The inner portion 185 also has a round hole 188 at the center part thereof. The hole 188 partly in its circumferential direction penetrates the ridge 187 in a thickness direction. The flange member 182 corresponds to the flange member 122 illustrated in FIG. 14, except for not arranging the ridge 127 in the front face but for arranging, instead of the ridge 127, the ridge 187 on the rear face. The axial member 183 is made of an aluminum alloy extrudate and is vertically joined to the inner portion 185.

The axial member with flange 181 is produced in the same manner as in the axial member with flange 121. In the axial member with flange 181 as in the axial member with flange 121, the expanded axial member 183 is in intimate contact with the inner periphery of the hole 188, and the flange member 182 is held from the front and the rear between an axial flange (not shown) and the protrusion 192 around the hole 188. In addition, the ridge 187 is crimped by the protrusion 192 in a horizontal direction, since the protrusion 192 has bulged at different starting points in a region corresponding to the ridge 187 and other regions, namely, the protrusion 192 bulges in the other regions at a starting point residing to the front of that of the region corresponding to the ridge 187. Thus, the ridge 187 and the protrusion 192 engage with and latch each other and are thereby prevented from relative rotation even if a force acts to rotate the flange member 182 around the axis X of the axial member 183.

The rear face of the flange member 182 particularly around the outer periphery of the hole 188 is in a plane perpendicular to the axis X of the axial member 183, except for the ridge 187. The rear face, however, is not axisymmetric with respect to the axis X of the axial member 183 due to the presence of the ridge 187, and being not axisymmetric provides the engagement between the protrusion 192 and the flange member 182 (ridge 187). As the flange member 182 is made of an extrudate, the ridge 187 is also present in the other region than the region around the periphery of the hole 188. However, the flange member 182 (the ridge 187) does not engage with the protrusion 192 in the other region, and whether or not the ridge 187 is present in the other region is not an issue to achieve the objects of the present invention.

Similar advantages as above can be obtained by arranging a groove or grooves instead of the ridge 187 in the rear face of the flange member 182.

FIGS. 21 to 25 illustrate axial members with flange, in which the front of a flange member, particularly in a region around a hole with which an axial flange is to be in contact, is not axisymmetric with respect to the axis of an axial member, and the rear of the flange member, in particular on the periphery of the hole, is not axisymmetric with respect to the axis of the axial member.

Figure 21:
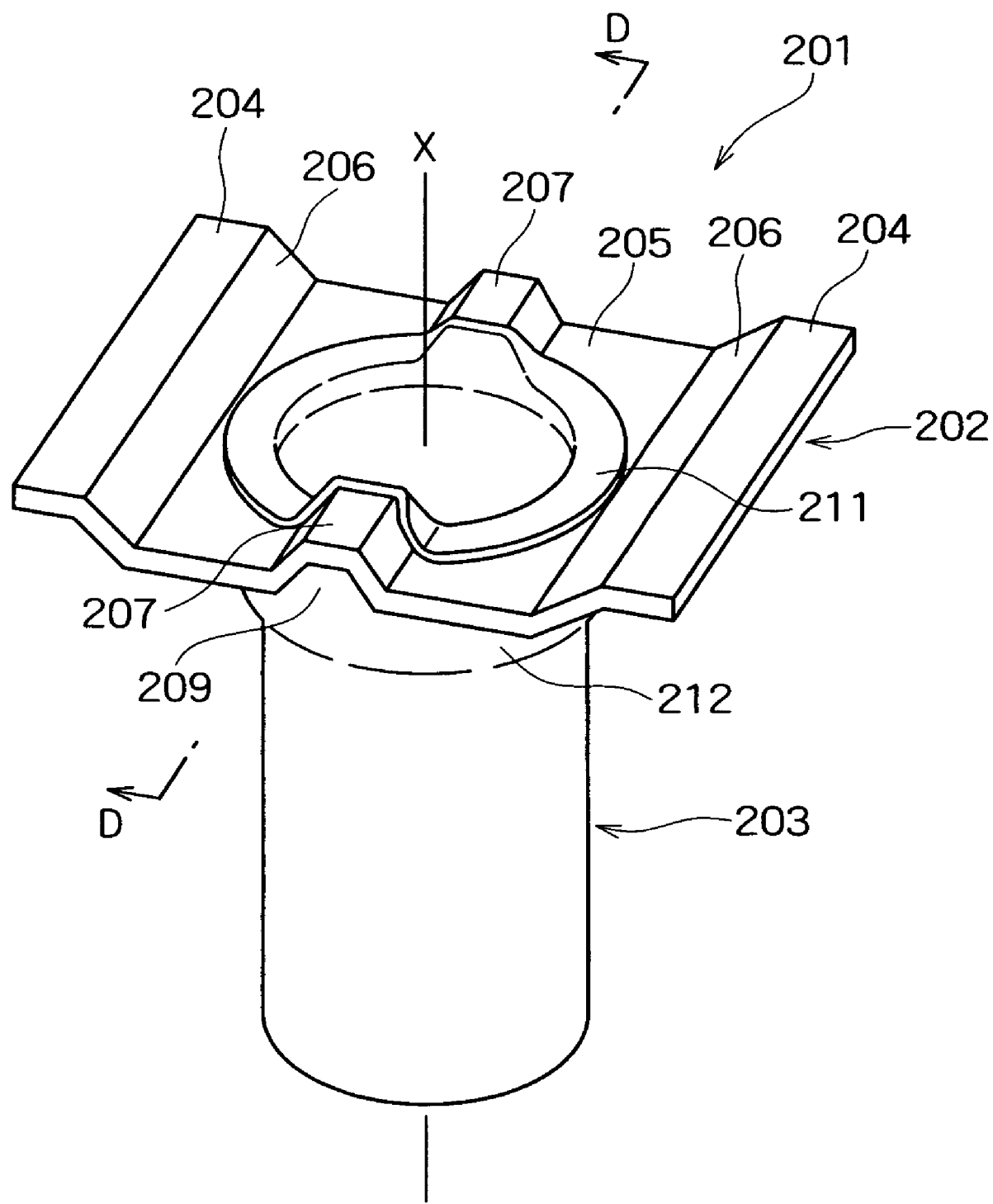
FIG. 21 is a perspective view of an axial member with flange as still another embodiment according to the present invention.
Figure 22:
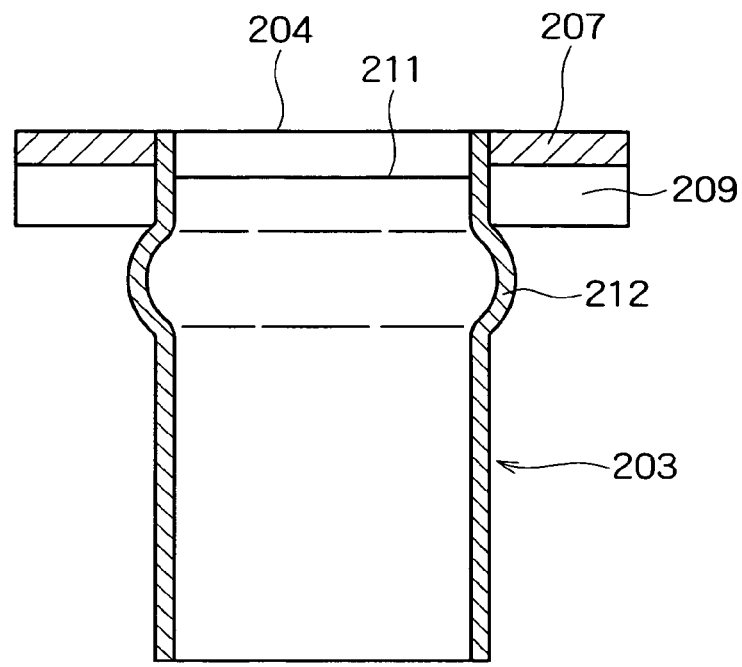
FIG. 22 is a cross sectional view taken along line D-D in FIG. 21.
Figure 23:
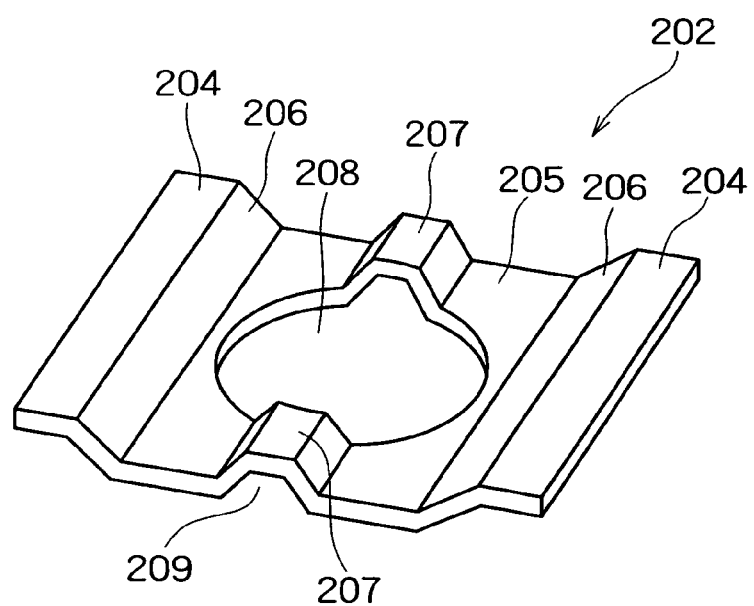
FIG. 23 is a perspective view of the flange member of the axial member with flange illustrated in FIG. 21.

An axial member with flange 201 illustrated in FIG. 21 comprises a sheet flange member 202 and a tubular axial member 203 to which end the flange member 202 is joined. The flange member 202 is made of an aluminum alloy extrudate and is formed by cutting the extrudate in a plane perpendicular to the extrusion direction to a predetermined length. With reference to FIG. 23, the flange member 202 comprises right and left outer portions 204, an inner portion 205, and right and left ramps 206 connecting the inner portion 205 and the outer portions 204. The front faces of the outer portions 204 serve as a mounting face to be in contact with a mating face of another member (not shown). The flange member 202 has a substantially uniform thickness as a whole but has a ridge 207 at a center part of the inner portion 205. The ridge 207 protrudes frontward and forms a groove 209 when viewed from the rear. The inner portion 205 has a round hole 208 at the center part thereof, and the hole 208 partly in a circumferential direction penetrates the ridge 207 in a thickness direction. In the illustrated example, the height of the front face of the ridge 207 is set to be equal to that of the outer portions 204. The axial member 203 is made of an aluminum alloy extrudate and is vertically joined to the inner portion 205.

The axial member with flange 201 is produced in the same manner as the axial member with flange 121, except that an untreated pipe (not shown) is positioned so that its front end agrees with the front face of the ridge 207. In the axial member with flange 201 as in the axial member with flange 121, the expanded axial member 203 is in intimate contact with the inner periphery of the hole 208, and the flange member 202 is pinched from the front and the rear between the axial flange 211 and the protrusion 212 around the hole 208. The ridge 207 is crimped and held by the flange 211 in a horizontal direction in the front side of the flange member 202. The protrusion 212 in the rear side of the flange member 202 bulges into the groove 209, since the protrusion 212 has bulged at different starting points in a region corresponding to the groove 209 and in the other region. Namely, the protrusion 212 has bulged at a starting point in the other region residing to the front of that of the region corresponding to the groove 209. On the front of the flange member 202, the ridge 207 and the axial flange 211 engage with and latch each other, and on the rear thereof, the groove 209 and the protrusion 212 engage with and latch each other. Thus, the relative rotation between these members is prevented even if a force acts to rotate flange member 202 around the axis X of the axial member 203.

The front of the flange member 202, particularly in a region around the hole 208 with which the axial flange 211 is to be in contact, is in a plane perpendicular to the axis X of the axial member 203, except for the ridge 207. The front is, however, not axisymmetric with respect to the axis X of the axial member 203 because of the presence of the ridge 207, and being not axisymmetric provides the engagement between the axial flange 211 and the flange member 202 in the ridge 207. The rear of the flange member 202, particularly in the periphery of the hole 208, is not axisymmetric with respect to the axis X of the axial member 203 due to the presence of the groove 209, and this yields the engagement between the protrusion 212 and the flange member 202 (the groove 209).

Figure 24:
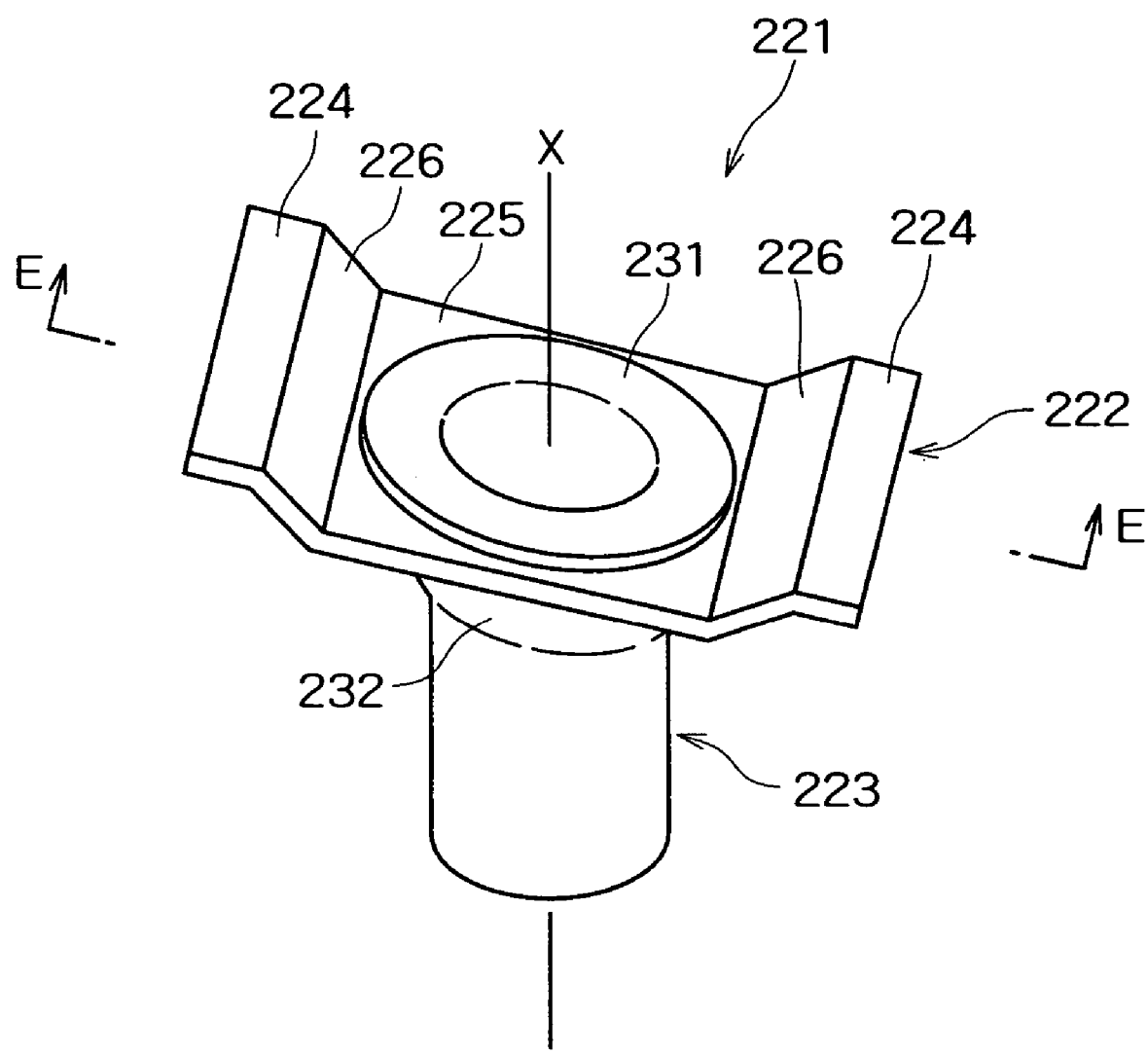
FIG. 24 is a perspective view of an axial member with flange as another embodiment according to the present invention.

An axial member with flange 221 illustrated in FIG. 24 comprises a sheet flange member 222 and a tubular axial member 223 to which end the flange member 222 is joined. The flange member 222 is made of an aluminum alloy extrudate having the same cross section as the flange member 142 and is formed by cutting the extrudate in a plane perpendicular to the extrusion direction to a predetermined length. The flange member 222 comprises right and left outer portions 224, an inner portion 225, and right and left ramps 226 connecting the inner portion 225 and the outer portions 224. The front faces of the outer portions 224 serve as a mounting face to be in contact with a mating face of another member (not shown). The axial member 223 is joined to the inner portion 225 in a slanting direction.

Figure 25:
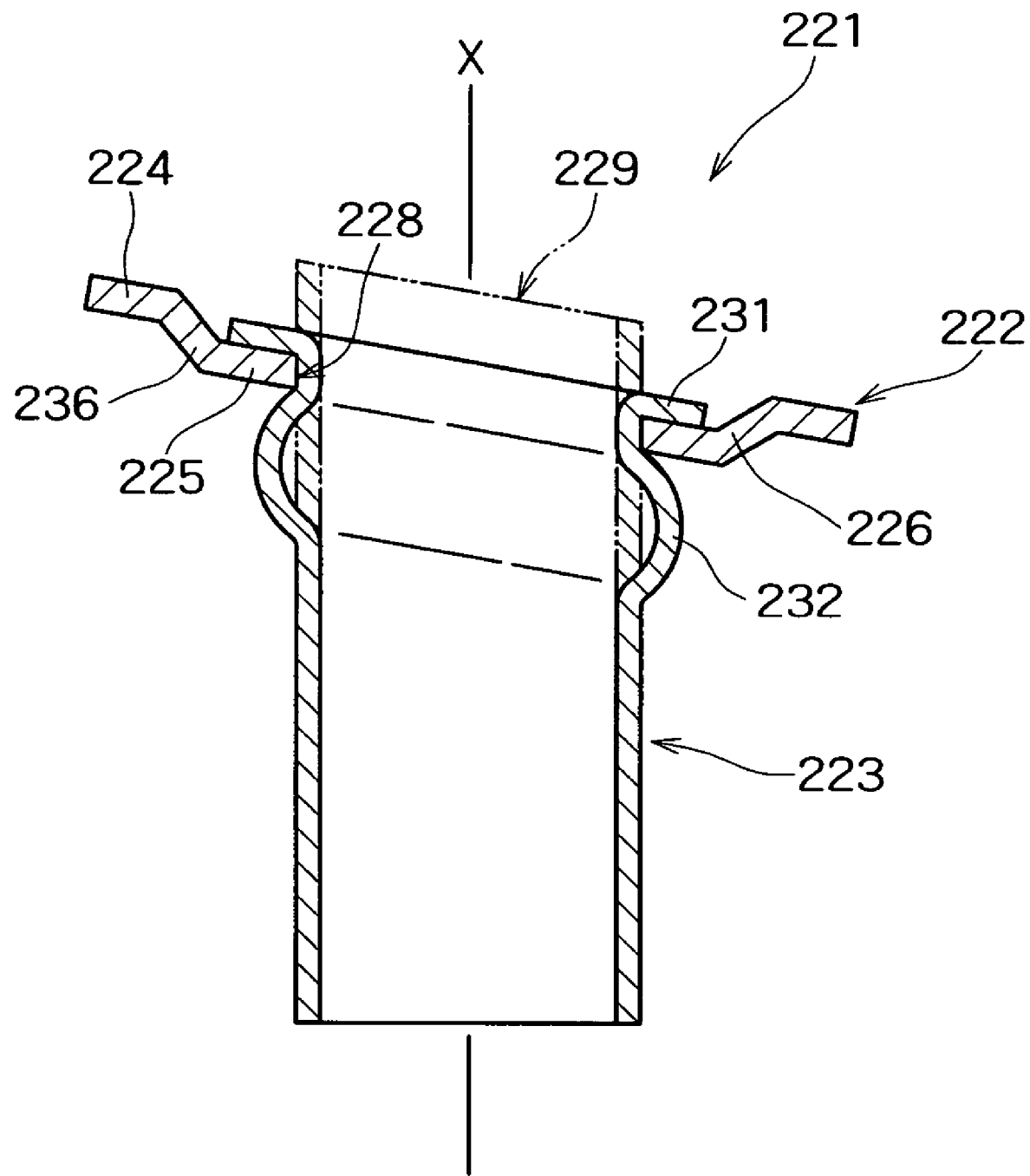
FIG. 25 is a cross sectional view taken along line E-E in FIG. 24.

The axial member 223 is made of an aluminum alloy extrudate having a circular cross section. With reference to FIG. 25, the front end of an untreated pipe 229 is cut in a plane inclined with respect to a plane perpendicular to the extrusion direction, and the rear end thereof is cut in a plane perpendicular to the extrusion direction.

The axial member with flange 221 is produced substantially in the same manner as the axial member with flange 121, except that flange member 222 is positioned as being inclined with respect to a plane perpendicular to the axis X of the untreated pipe 229 (or the axial member 223), as illustrated in FIG. 25. The inclination is set so that the front face of the inner portion 225 is in parallel with the front end of the protruding untreated pipe 229. The hole 228 formed in the inner portion 225 has a circular shape when viewed from a direction of the axis X.

The axial member with flange 221 is produced in the following manner as illustrated in FIGS. 24 and 25. The untreated pipe 229 inside the hole 228 expands and comes into intimate contact with the inner periphery of the flange member 222 around the hole 228. A protruding portion 228a of the untreated pipe 229 protruding frontward from the hole 228 spreads outward in a radial direction to thereby form an axial flange 231. The untreated pipe 229 to the rear of the hole 228 bulges outward in a radial direction in accordance with the intensity of expansive force induced by the repulsive force of a magnetic field, to thereby form a protrusion 232.

In the axial member with flange 221, the expanded axial member 223 (the untreated pipe after molding is referred to as "axial member 223") is in intimate contact with the inner periphery of the hole 228, and the flange member 222 is held from the front and the rear between the axial flange 231 and the protrusion 232 around the hole 228. In the axial member 221, the flange member 222 (inner portion 225) is inclined with respect to a plane perpendicular to the axis X of the axial member 223, and the flange member 222 and the axial member 223 latch each other so as to prevent the relative rotation between them. Accordingly, the relative rotation of the two members is prevented even if a force acts to rotate the flange member 222 around the axis X of the axial member 223.

The front of the flange member 222, particularly in a region around the hole 228 with which the axial flange 231 is to be in contact, constitutes a plane inclined with respect to the axis X of the axial member 223. Thus, the front of the flange member 222 is not axisymmetric with respect to the axis X of the axial member 223. This yields relative latching between the axial flange 231 and the flange member 222. The rear of the flange member 222, particularly in the periphery of the hole 228, is in a plane in parallel with the front thereof, but the plane is inclined with respect to the axis X of the axial member 223. Thus, the rear of the flange member 222 is not axisymmetric with respect to the axis X of the axial member 223, and this yields relative latching between the protrusion 232 and the flange member 222.

Connection members (axial members with flange) according to the present invention will be illustrated in detail with reference to FIGS. 26 to 41.

Figure 26:
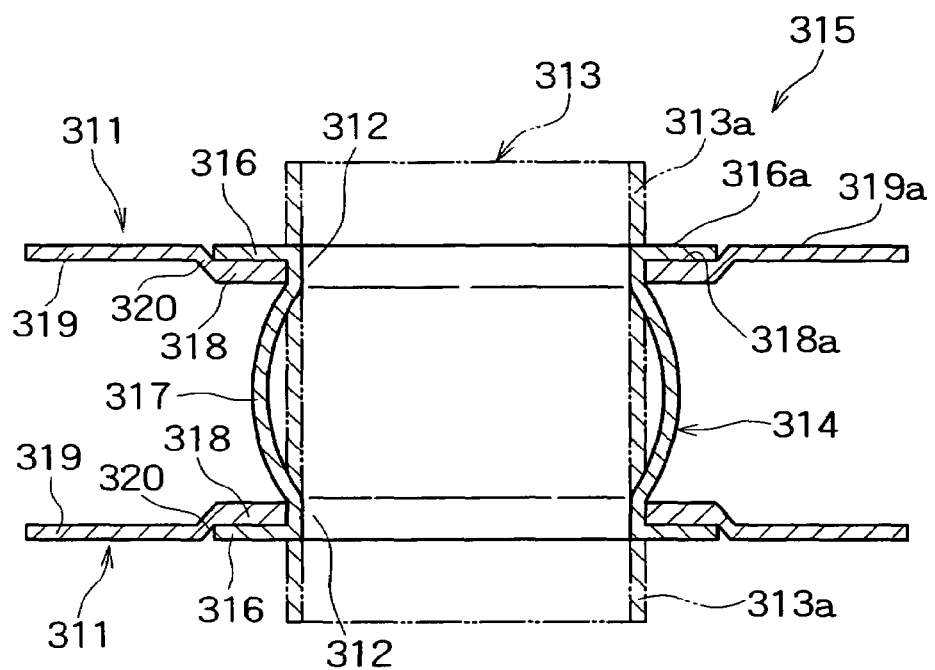
FIG. 26 is a cross sectional view of a connection member according to the present invention in a plane passing through the center of a through hole of a flange.
Figure 27:
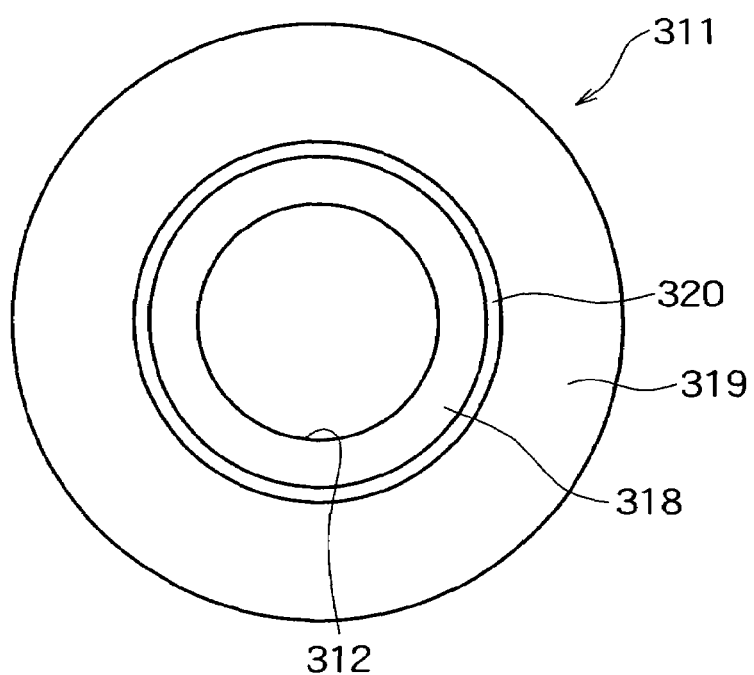
FIG. 27 is a plan view of the flange used in the above connection member.

A connection member 315 illustrated in FIG. 26 comprises two sheet flanges 311 and a tubular axial member 314 being joined to the flanges 311 at both ends. The flange 311 as illustrated in FIG. 27 comprises an inner radius 318 around a through hole 312, an intermediate portion 320, and an outer radius 319. The inner radius 318 has a thickness larger than that of the outer radius 319. The intermediate portion 320 constitutes a ramp for smoothly connecting steps formed between the inner radius 318 and the outer radius 319. The inner radius 318 and the outer radius 319 have a step height therebetween. Namely, the front face 318a of the inner radius 318 is positioned to the rear of the front face 319a of the outer radius 319. The axial member 314 is made of an aluminum alloy extrudate. Suitable example of the material therefor are JIS 6000 series materials such as JIS 6063 material. The material for the flanges 311 preferably has a high strength and a low electric conductivity. Among aluminum alloys, T5 tempered materials such as JIS 5000 series material, JIS 6000 series materials, and JIS 7000 series materials are preferred. Other materials such as steel materials can also be employed.

The connection member 315 is produced in the following manner. Initially, the flanges 311 are positioned at a predetermined distance by a device (not shown). An untreated pipe 313 having a circular cross section and being indicated by a virtual line is inserted through a through hole 312 so that both ends thereof protrude frontward. An electromagnetic forming coil (not shown) is placed into the untreated pipe 313, and electromagnetic forming is carried out. Thus, the untreated pipe 313 expands and comes into intimate contact with the inner surface of the flange 311 around the through hole 312 inside the plane of the flange 311. The protruding portion 313a of the untreated pipe 313 to the front of the flange 311 spreads outward in a radial direction, and the rear face of the protruding portion 313a hits against and comes into intimate contact with the front face 318a of the flange 311 in the inner radius. The untreated pipe 313 inside the flange 311 bulges outward in a radial direction and protrudes between the flanges 311 and 311 in accordance with the intensity of expansive force induced by the repulsive force of a magnetic field. This makes the flange 311 at the inner surface of the through hole 312 come into intimate contact with the axial member 314 and simultaneously be pinched firmly between the spread flared portion (axial flange) 316 and the inner protrusion 317 of the axial member 314. Thus, the flanges 311 are joined to the axial member 314. The step height between the inner radius 318 and the outer radius 319 of the flange 311 is set substantially equal to the wall thickness of the axial flange 316, which is in turn substantially equal to the wall thickness of the untreated pipe 313. Consequently, the front face 316a of the axial flange 316 is substantially flush with the front face 319a of the outer radius 319. This configuration is advantageous when the flange 311 is used for mounting to another member. The step height can also be set so that the front face 316a of the axial flange 316 is somewhat to the rear of front face 319a of the outer radius 319.

In the above example, the through hole 312 of the flange 311 has a circular shape, but it can also have another shape than a circular shape, such as an elliptic shape or a polygonal shape. Such a non-circular shape prevents the rotation of the axial member in the through hole. The untreated pipe 313 (axial member 314) may have not only a circular cross sectional shape but also a non-circular profile such as an elliptic shape or a polygonal shape.

Figure 28:
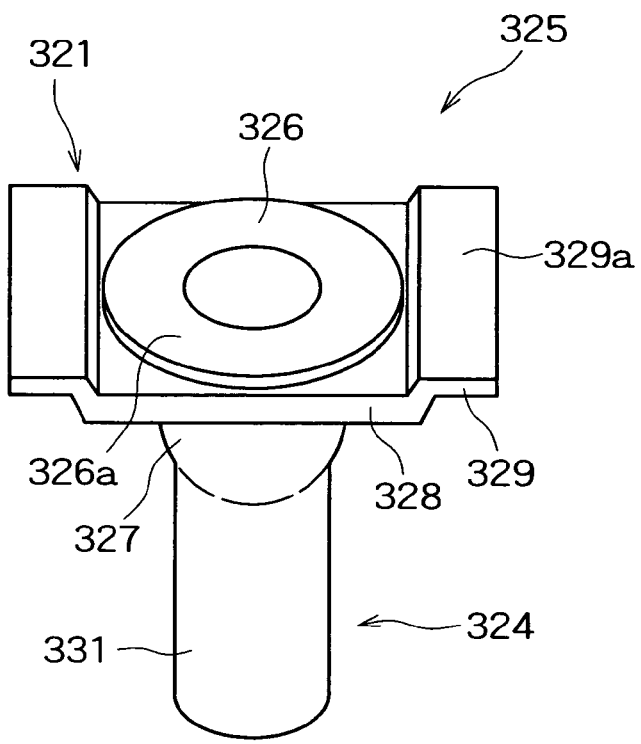
FIG. 28 is a perspective view of another connection member according to the present invention.
Figure 29:
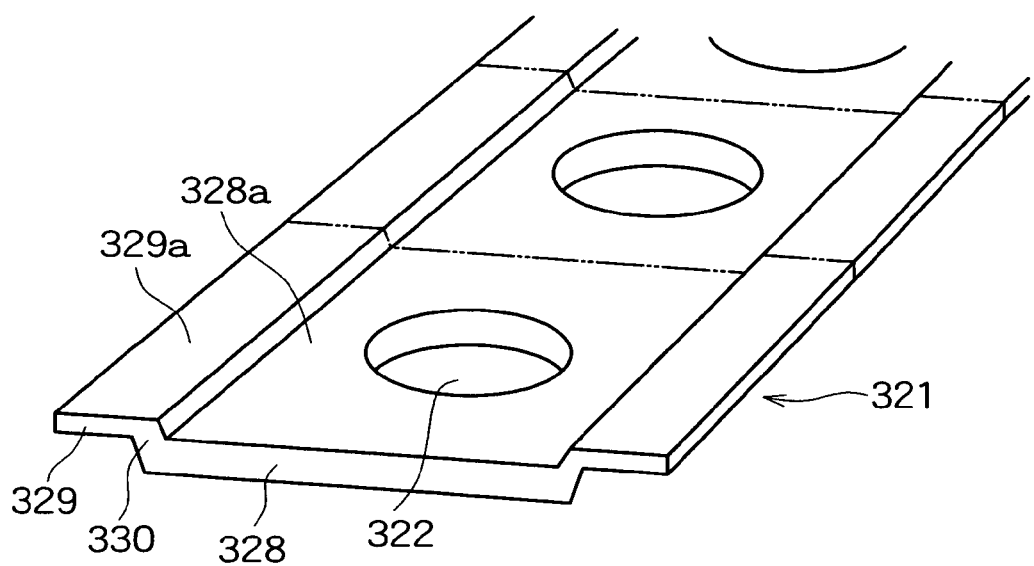
FIG. 29 is a plan view of a flange used in the above connection member.

A connection member 325 illustrated in FIG. 28 comprises a sheet flange 321 and a tubular axial member 324 to which end the flange 321 is joined. With reference to FIG. 29, the flange 321 is made of an aluminum alloy extrudate and is formed by cutting the extrudate in a plane perpendicular to the extrusion direction where the line of cutting plane is indicated by a virtual line. The flange 321 comprises a center part 328, intermediate portions 330, and two side portions 329. The center part 328 has a larger thickness than those of the two side portions 329 in a cross section perpendicular to the extrusion direction. The intermediate portions are inclined so as to smoothly connecting steps formed between the center part 328 and the side portions 329. The center part 328 has a step height with respect to the side portions 329. Namely, the front face 328a of the center part 328 is positioned to the rear of the front faces 329a of the side portions 329. The center part 328 has a round through hole 322 at its center.

The connection member 325 is produced in the same manner as in the connection member 315, except for expanding an untreated pipe having a circular cross section only in the vicinity of the flange 321 by electromagnetic forming instead of expanding the untreated pipe throughout its length. Consequently, the axial member 324 has an axial flange 326 to the front of the flange 321 and has a protrusion 327 to the rear of the flange 321, but it has a diameter equal to that of the untreated pipe in a region 331 to the rear of the protrusion 327 of the axial member 324. In this connection, the axial flange 326 is to be in contact with the front face 328a of the center part 328 of the flange 321, as illustrated in FIG. 28. In the connection member 325, the front face 326a of the axial flange 326 is substantially flush with the front faces 329a of the side portions 329, since the step height between the center part 328 and the side portions 329 of the flange 321 is set to be substantially equal to the wall thickness of the axial flange 326, which is in turn substantially equal to the wall thickness of the untreated pipe. The step height may be set so that the front face 326a of the axial flange 326 is positioned somewhat to the rear of the front face 329a of the outer radius 329.

Figure 30:
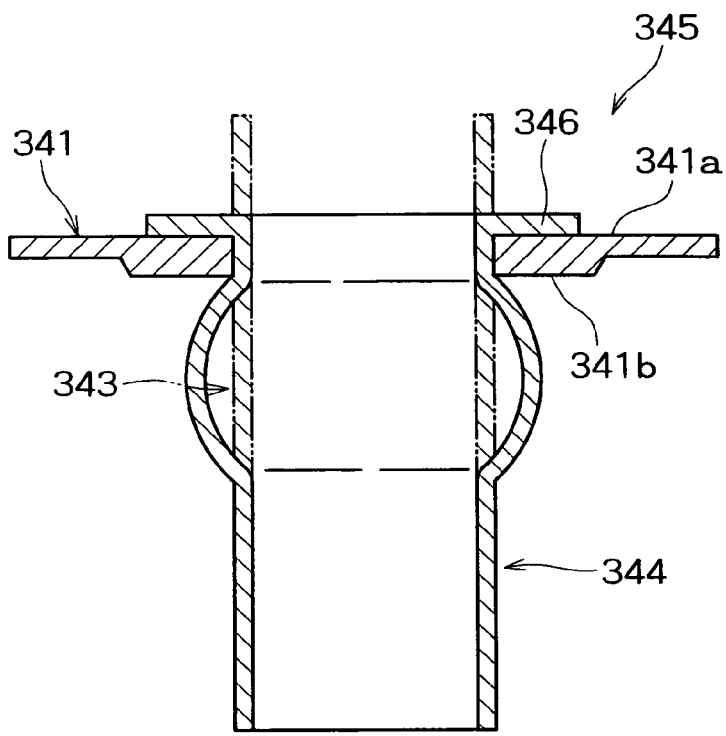
FIG. 30 is a cross sectional view of another connection member according to the present invention in a plane perpendicular to the extrusion direction and passing through the center of a through hole of a flange.

A connection member 345 illustrated in FIG. 30 has the same configuration as the connection member 325, except that a rear face 341b of a flange 341 has a ramp (slope) so that a front face 341a is formed as a plane as a whole. In this case, a spread axial flange 346 of the axial member 344 protrudes frontward from the front face 341a of the flange 341. A connection member of this type may be produced according to necessity. The connection member 345 is the same as the connection member 325 in that the flange 341 is made of an aluminum alloy extrudate. In addition, it is produced in the same manner. The virtual line in FIG. 30 represents an untreated pipe 43 having a circular cross section.

Figure 31:
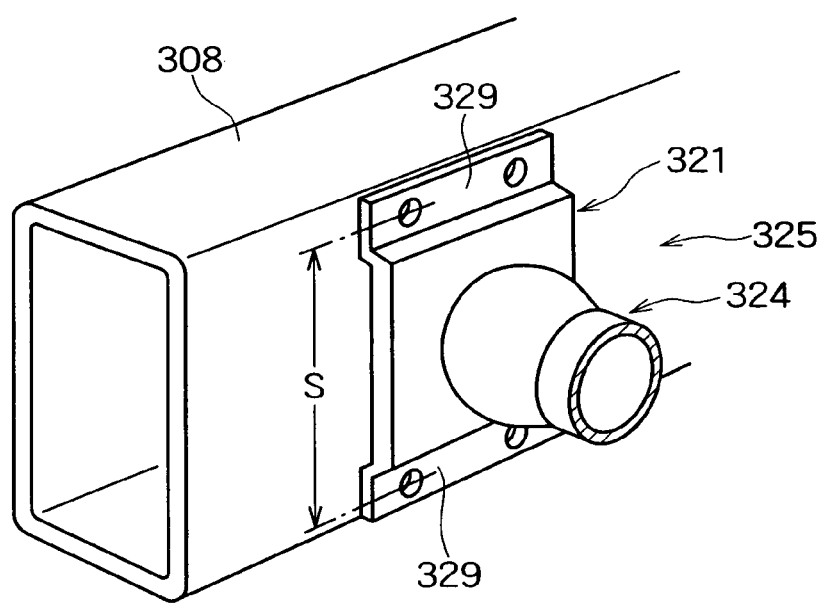
FIG. 31 is a partially sectional perspective view of a connection member according to the present invention when used as a bumper stay.

FIG. 31 is an illustration of the connection member 325 used as a bumper stay. The side portions 329 of the flange 321 each have openings and are fixed to a bumper reinforcement 308 by means of bolts (not shown) to thereby constitute a bumper structure. The openings are preferably formed before joining. Where necessary, a flange may be joined to side members at the rear end (not shown) of the axial member 324 in the same way as in the flange 321.

Figure 32:
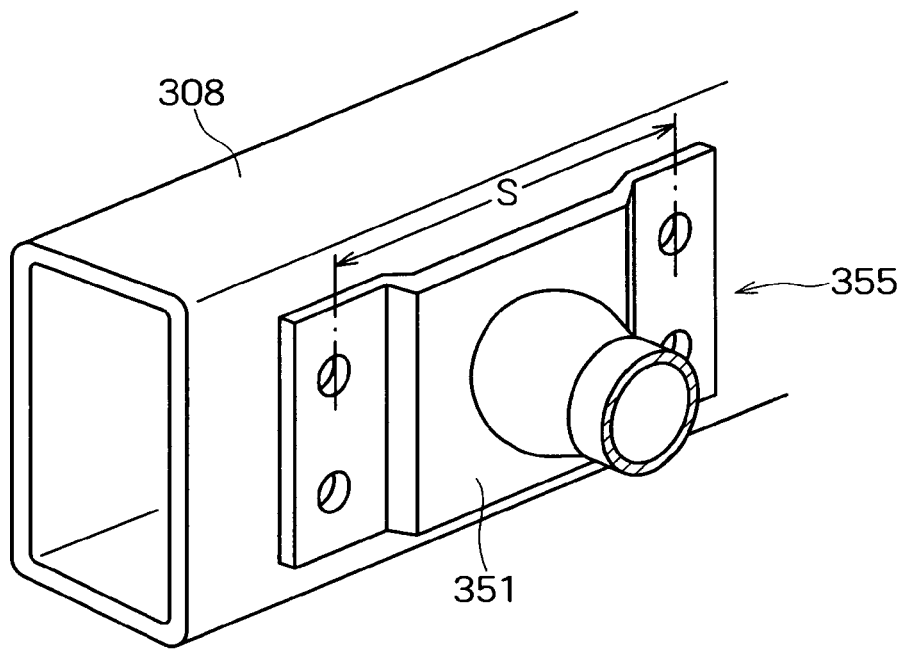
FIG. 32 is a partially sectional perspective view of another connection member according to the present invention when used as a bumper stay.

A connection member 355 illustrated in FIG. 32 differs from the connection member 325 in that a flange 351 has a larger width in a cross section perpendicular to the extrusion direction. When the connection member 325 is fixed to the bumper reinforcement 38 so that the extrusion direction of the flange 321 lies in a horizontal direction as shown in FIG. 31, the flange 321 is limited in width, and the interval S between bolt openings is inevitably narrow. In contrast, when the connection member 355 is fixed to a bumper reinforcement 38 so that the extrusion direction of the flange 351 lies in a vertical direction, the flange 351 can have a large width, and thereby the interval S between bolt openings is wide. This is advantageous for higher mounting strength.

Figure 33:
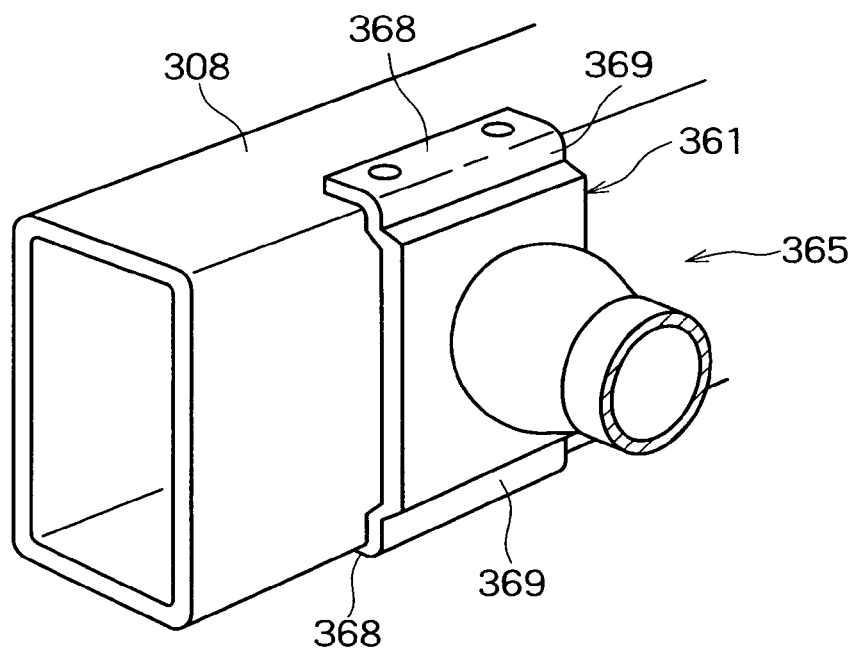
FIG. 33 is a partially sectional perspective view of yet another connection member according to the present invention when used as a bumper stay.

A connection member 365 illustrated in FIG. 33 differs from the connection member 325 in that a flange 361 has curved ends 368 ranging to side portions 369. In the connection member 365 as illustrated in FIG. 33, the front faces of the side portions 369 are brought into contact with the rear face of a bumper reinforcement 38, the inner surfaces of the curved ends 368 are brought into contact with the upper and lower faces of the bumper reinforcement 38, and the curved ends 368 are fixed to the bumper reinforcement 38 by means of bolts (not shown).

Figure 34:
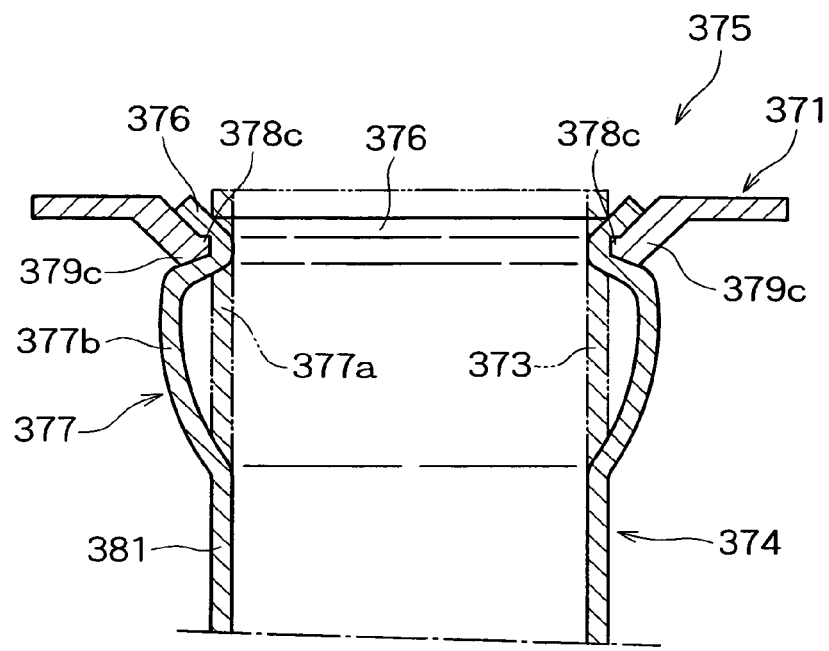
FIG. 34 is a cross sectional view of another connection member according to the present invention in a plane perpendicular to the extrusion direction and passing through the center of a through hole of a flange.
Figure 35:
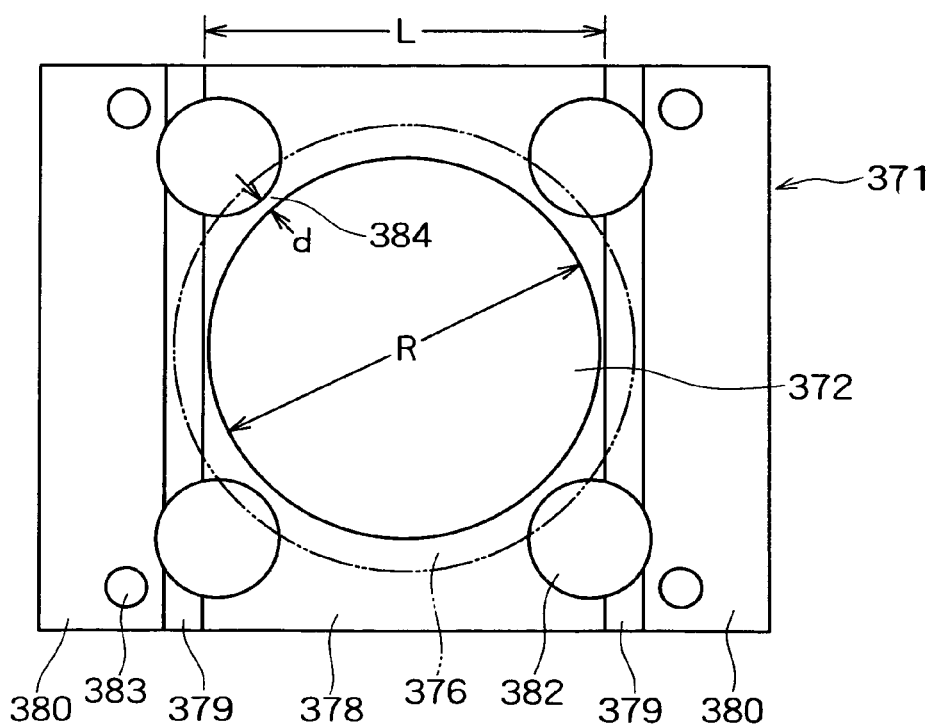
FIG. 35 is a plan view of a flange used in the above connection member.
Figure 36:
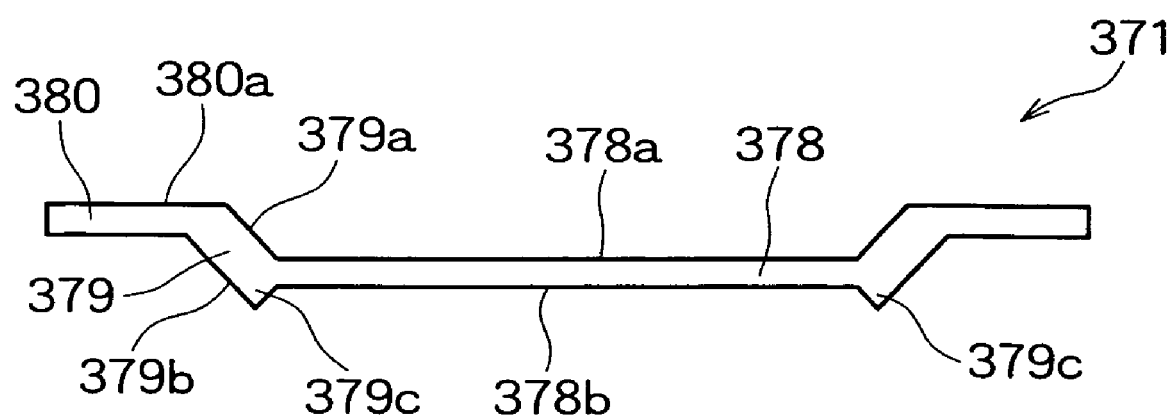
FIG. 36 is a cross sectional view of the above flange in a plane perpendicular to the extrusion direction.

A connection member 375 illustrated in FIG. 34 comprises a sheet flange 371 and a tubular axial member 374 to which end the flange 371 is joined. With reference to FIGS. 35 and 36, the flange 371 is made of an aluminum alloy extrudate and is formed by cutting the extrudate in a plane perpendicular to the extrusion direction. The flange 371 comprises a center part 378, an intermediate portion 379 around the center part 378, and a side portion 380 outside the intermediate portion 379. The intermediate portion 379 has a larger thickness than that of the center part 378 and the side portion 380 in a cross section perpendicular to the extrusion direction. The intermediate portion 379 is inclined so as to connect the center part 378 and the side portion 380. The center part 378 has a step height with respect to the side portions 380. Namely, the front face 378a of the center part 378 is positioned to the rear of the front faces 380a of the side portions 380. The front face 379a of the intermediate portion 379 intersects with the front face 378a of the center part 378 at an obtuse angle. The rear face 379b of the intermediate portion 379 has an angular projection 379c protruding rearward from the rear face 378b of the center part 378. The inner surface of the projection 379c intersects with the rear face 378b at an obtuse angle. The center part 378 of the flange 371 has a round through hole 372. The through hole 372 has a diameter R somewhat smaller than the width L of the center part 378. As the through hole 372 is punched in the center part 378 having a small thickness, a low pressing capability will do in the punching. In addition, working holes 382 are arranged around the through hole 372 at four points so as to range over the center part 378, the intermediate portion 379 and the side portion 380, and bolt openings 383 are arranged in the side portion 380.

The connection member 375 is produced so that an untreated pipe 373 having a circular cross section is expanded not throughout its length but only in the vicinity of the flange 371, as in the connection member 325. With reference to FIG. 34, the resulting axial member 374 has an axial flange 376 to the front of the flange 371 and a protrusion 377 to the rear of the flange 371, but it keeps its original diameter as in the untreated pipe in a region to the rear of the protrusion 377. With reference to the axial flange 376 illustrated by a virtual line in FIGS. 34 and 35, the rear face of the axial flange 376 is, in a major part thereof, in contact with the front face 378a of the center part 378 of the flange 371 and is, in part in a circumferential direction mainly in a direction perpendicular to the extrusion direction, in contact with the front face 379a of the intermediate portion 379. The upper end 377a of the protrusion 377 is in contact with the inner surface of the projection 379c. The rear region 377b of the protrusion 377 which is free from the restriction by the projection 379c expands and protrudes outside in a radial direction in accordance with the intensity of expansive force induced by the repulsive force of a magnetic field.

In the connection member 375, the axial member 374 is pressed into intimate contact with the inner surface of the flange 371 around the through hole 372.

With reference to the sectional view of FIG. 34, right and left ends 378c of the center part 378 having a small thickness remain at both sides of the through hole 372, and this makes axial member 374 be well engaged and come into intimate contact therewith more satisfactorily. To the front of the ends 378c, the axial flange 376 is in contact with the front face 379a of the intermediate portion 379 of the flange 371, and to the rear thereof, the upper end 377a of the protrusion 377 is in contact with the inner surface of the projection 379c. Thus, the intermediate portion 379 of the flange 371 is pinched between the axial flange 376 and the upper end 377a of the protrusion 377. This enables very secure joining between the flange 371 and the axial member 374 and particularly prevents disconnection of them in an axial direction. The axial flange 376 spreads at a varying angle along a circumferential direction, namely, it spreads partially at right angle but partially at an angle below 90 degrees. This prevents the rotation of the axial member 374. In addition, applied energy in electromagnetic forming is saved, since part of the axial flange 376 spreads at an angle below 90 degrees.

If the distance d between the through hole 372 and the working hole 382 in a region 384 is set small, the region 384 deforms outward in a radial direction due to expansive force of the axial member 372 during electromagnetic forming, and the axial member 374 enters the resulting depression. This deformation prevents the rotation of the axial member 374.

Figure 37A:
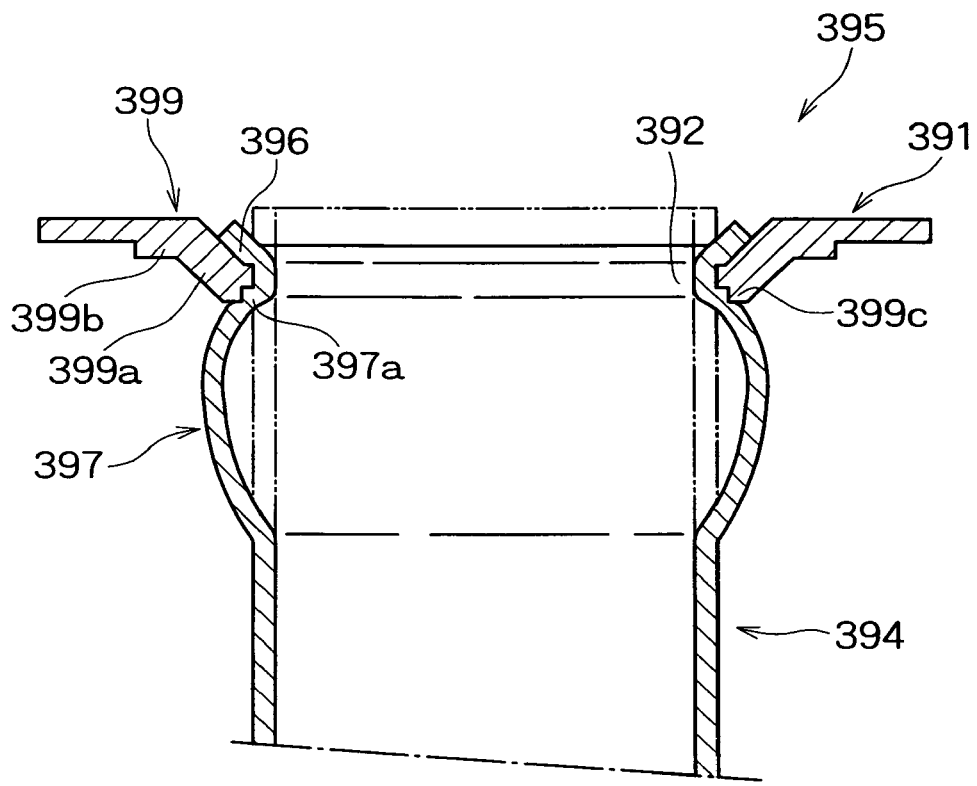
FIG. 37 comprises a cross sectional view FIG. 37(a) and a partially enlarged view FIG. 37(b) thereof, respectively, of another connection member according to the present invention in a plane perpendicular to the extrusion direction and passing through the center of a through hole of a flange.

A connection member 395 illustrated in FIG. 37(a) comprises a sheet flange 391 and a tubular axial member 394 to which end the flange 391 is joined. The flange 391 is made of an aluminum alloy extrudate and has, as its cross sectional structure, a thick intermediate portion 399 that comprises an inclined first intermediate portion 399a, a horizontal second intermediate portion 399b, and a substantially trapezoidal projection 399c to the rear thereof. The other configuration is substantially the same as in the connection member 375. The flange 391 is further effectively prevented from distortion and deformation during electromagnetic forming. This is because, the thick intermediate portion 399 has a large width (the width in a horizontal direction in FIG. 37(a)) and ranges to the outside of a portion against which a spread axial flange 396 hits, namely to the horizontal portion (the second intermediate portion 399b) FIG. 37(a) also illustrates an untreated pipe 393 having a circular cross section.

Figure 37B:
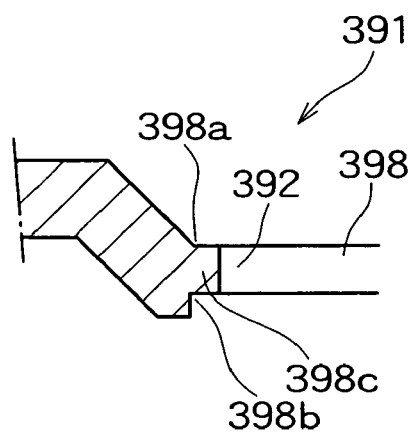

The flange 391 can be well engaged with and come into intimate contact with the expanded axial member 394 more satisfactorily, since the flange 391 has remaining thin ends 398c of the center part 398 at both sides of a through hole 392, as in the flange 371. The upper end 397a of the protrusion 397 is in contact with the projection 399c so that the intermediate portion 399 of the flange 391 is pinched between the axial flange 396 and the upper end 397a of the protrusion 397. This enables very secure joining between the flange 391 and the axial member 394. The corners between the center part 398 and the intermediate portion 399 in the flange 391 (front corner 398a and rear corner 398b) are preferably rounded as illustrated in FIG. 37(b), since shearing force will act thereon.

Other different configurations which the connection members, flanges, and axial members according to the present invention may have will be illustrated with reference to FIGS. 38 to 41.

Figure 38:
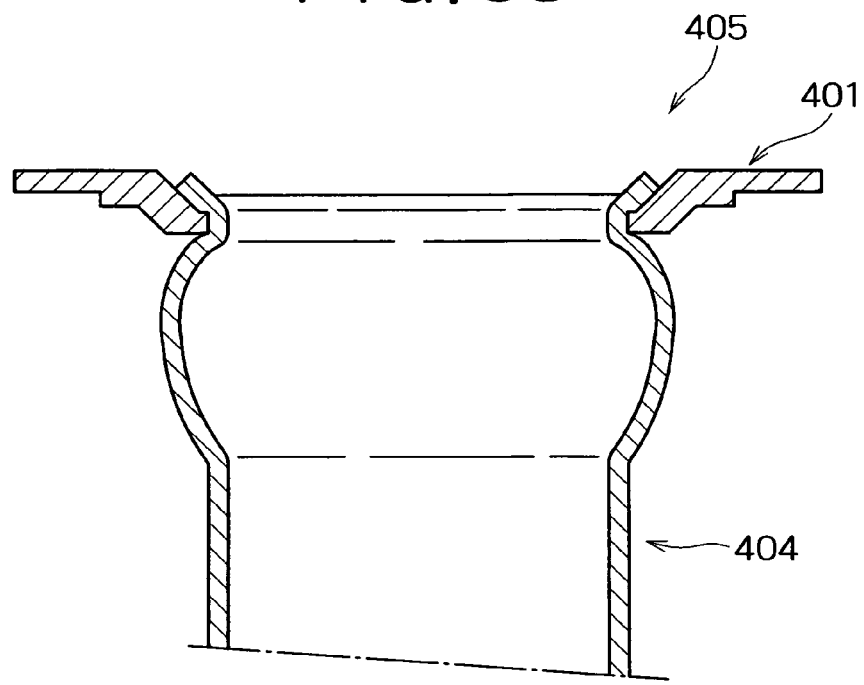
FIG. 38 is a cross sectional view of another connection member according to the present invention in a plane perpendicular to the extrusion direction and passing through the center of a through hole of a flange.

A connection member 405 illustrated in FIG. 38 comprises a sheet flange 401 made of an aluminum alloy extrudate, and a tubular axial member 404 to which end the flange 401 is joined. The connection member 405 has substantially the same configuration as the connection member 395, except that the flange 401 has in its cross section no projection corresponding to the projection 399c of the flange 391.

Figure 39:
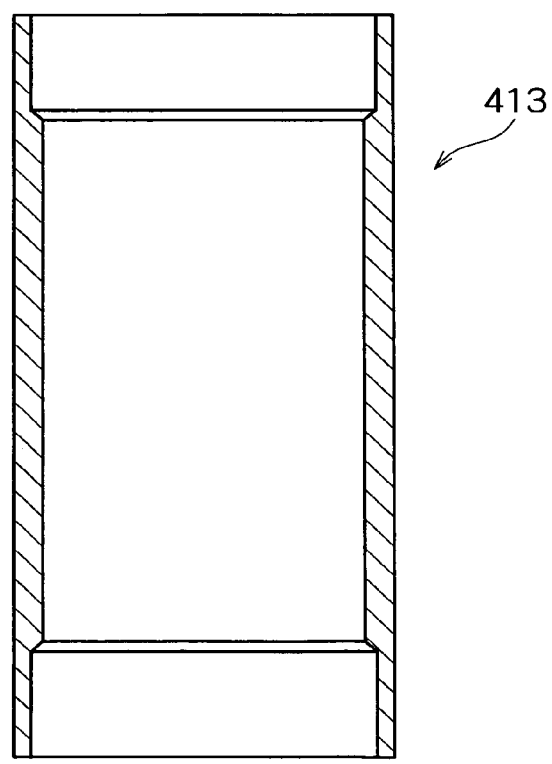
FIG. 39 is a cross sectional view of another untreated pipe for use in the present invention.

An untreated pipe 413 illustrated in FIG. 39 is used as an axial member of a connection member. Both ends of the untreated pipe 413 which will constitute axial flanges are thinned by cutting. The untreated pipe 413 enables easy spreading and molding of axial flanges by electromagnetic forming.

Figure 40:
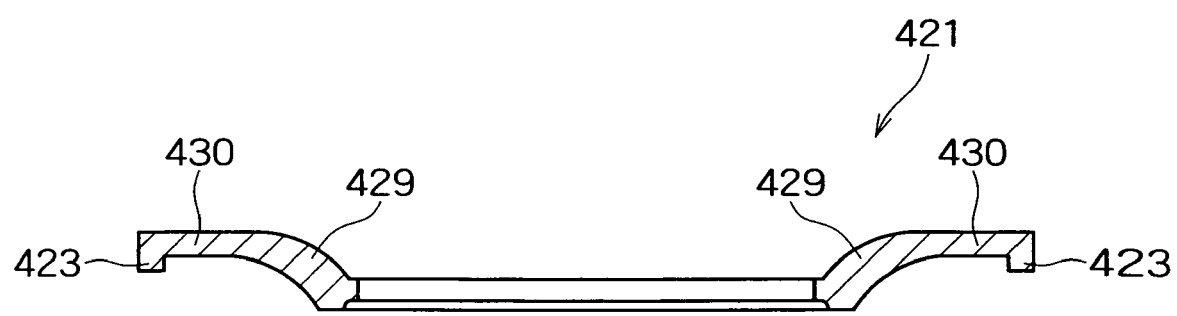
FIG. 40 is a cross sectional view of another flange for use in the present invention in a plane perpendicular to the extrusion direction.

A flange 421 illustrated in FIG. 40 is made of an aluminum alloy extrudate and has a rib 423 at an end of a thin side portion 430. The rib 425 prevents the flange 421 from distortion upon electromagnetic forming. The flange 421 has a gradually decreasing thickness in the thick intermediate portion 429 toward the outside.

Figure 41:
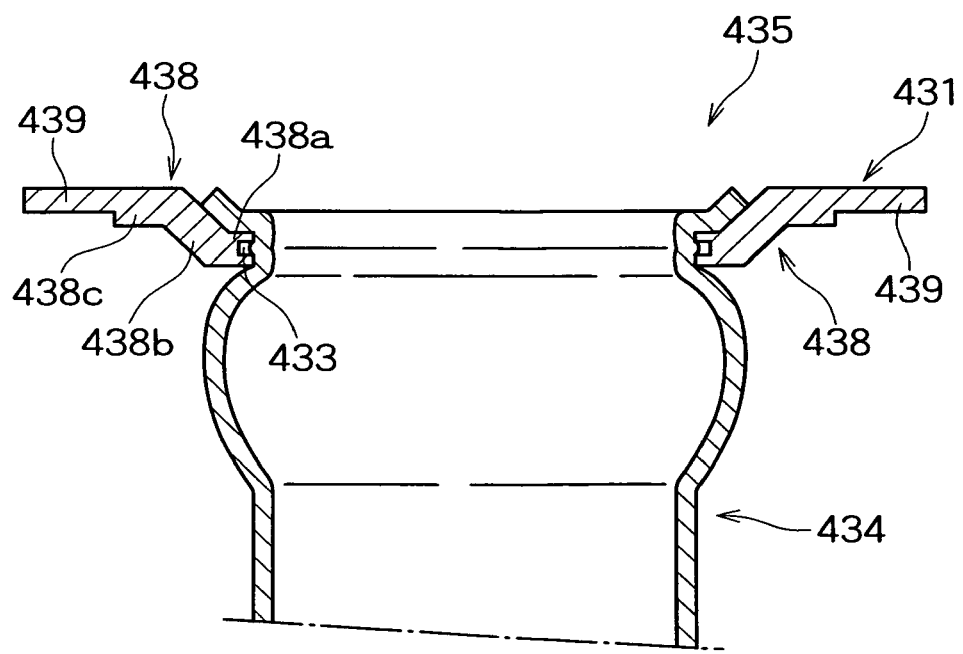
FIG. 41 is a cross sectional view of another connection member according to the present invention in a plane perpendicular to the extrusion direction and passing through the center of a through hole of a flange.

A connection member 435 illustrated in FIG. 41 comprises a sheet flange 431 and a tubular axial member 434 having a circular cross section to which end the flange 431 is joined. The flange 431 is made of an aluminum alloy extrudate and comprises a thick center part 438 and thin side portions 439. The center part 438 comprises a first center part 438a, an inclined second center part 438b, and a third center part 438c. With reference to the cross section illustrated in FIG. 41, the first center part 438a has a groove 433 in its inner surface. Upon electromagnetic forming, the axial member 434 expands outward in a radial direction and fits into the groove 433. Thus, the axial member 434 and the flange 431 are in intimate contact with each other further securely.

Connection members according to the present invention will be illustrated in more detail with reference to FIGS. 42 to 50.

Figure 42:
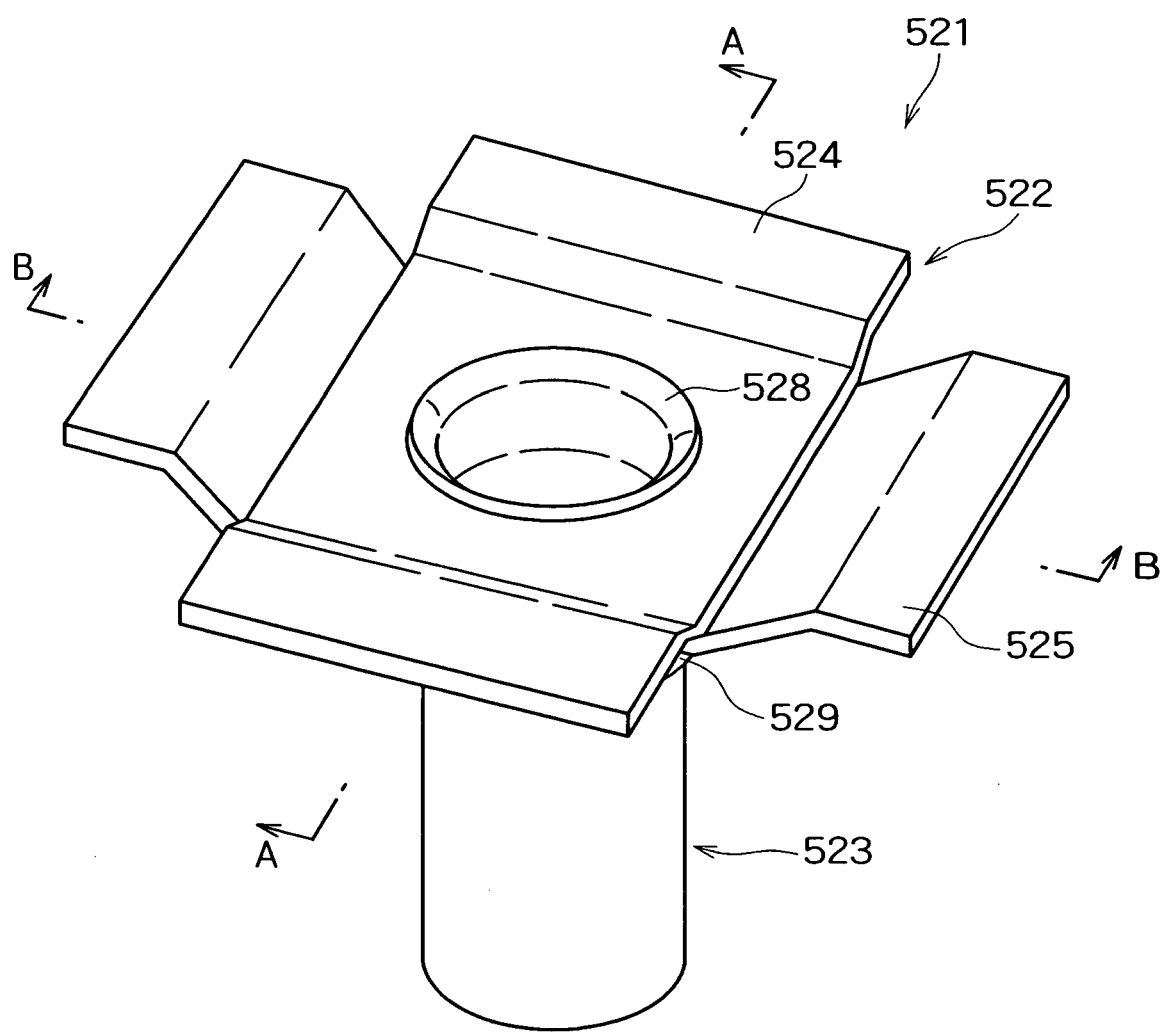
FIG. 42 is a perspective view of an axial member with flange according to the present invention.
Figure 43:
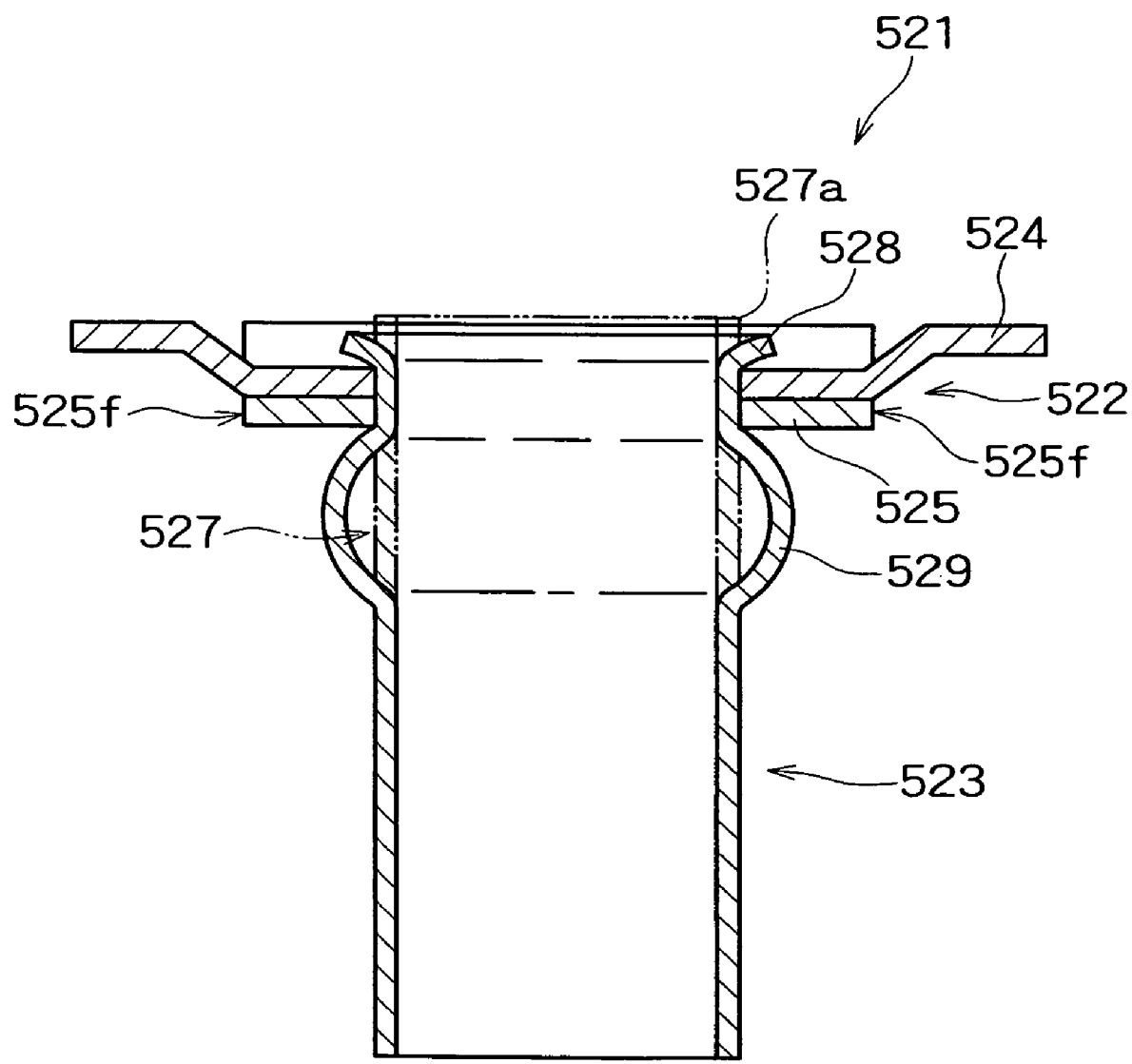
FIG. 43 is a cross sectional view taken along line A-A in FIG. 42.
Figure 44:
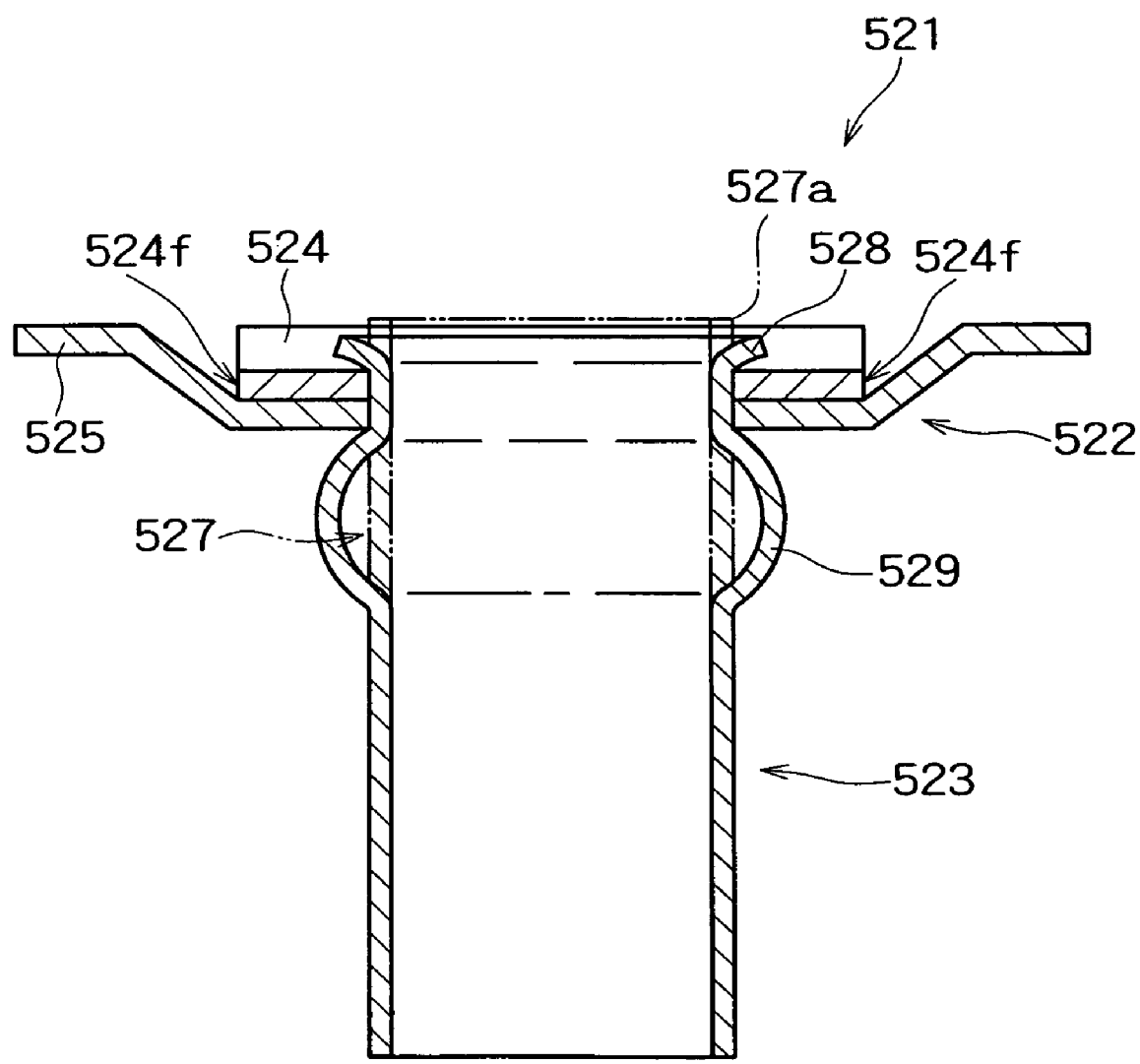
FIG. 44 is a cross sectional view taken along line B-B in FIG. 42.
Figure 45A:
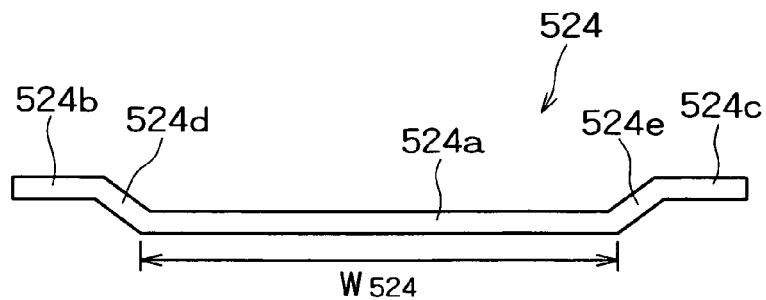
FIG. 45 comprises end views FIG. 45(a) and FIG. 45(b) of a sheet member, and a perspective view FIG. 45(c) of a flange member, for use in the axial member with flange illustrated in FIG. 42.
Figure 45B:
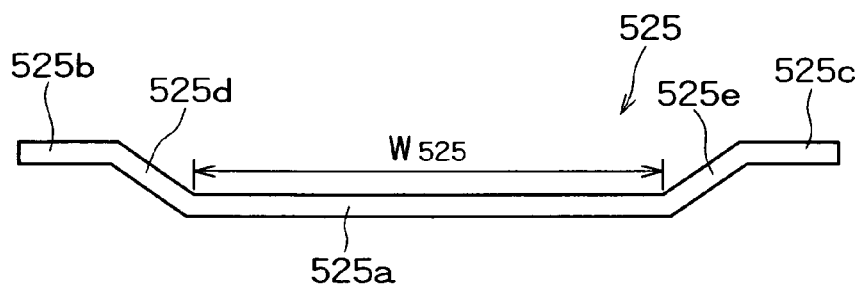
Figure 45C:
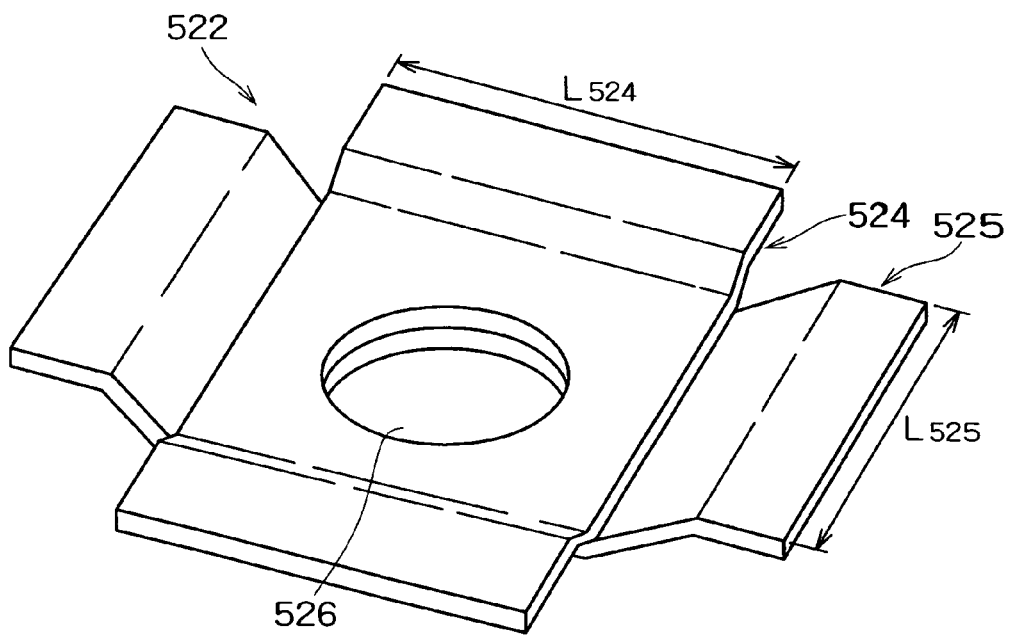

An axial member with flange 521 illustrated in FIG. 42 to FIG. 44 comprises a sheet flange member 522 and a tubular axial member 523 to which end the flange member 522 is joined. The flange member 522 comprises two sheet members 524 and 525 overlaid with each other and has a round hole 526 penetrating in a thickness direction at a center part thereof, as illustrated in FIG. 45. Each of the sheet members 524 and 525 is made of an aluminum alloy extrudate and is formed by cutting the extrudate in a plane perpendicular to the extrusion direction to a predetermined length.

With reference to FIGS. 43 and 45, the front sheet member 524 has a uniform thickness as a whole and comprises an inner portion 524a, outer portions 524b and 524c at both ends, and intermediate portions 524d and 524e connecting these portions. The outer portions 524b and 524c are in parallel with, but have a step height with the inner portion 524a. Thus, the outer portions 524b and 524c are positioned to the front of the inner portion 524a. With reference to FIGS. 44 and 45, the rear sheet member 525 has a uniform thickness as a whole and comprises an inner portion 525a, outer portions 525b and 525c at both ends thereof, and intermediate portions 525d and 525e connecting these portions. The outer portions 525b and 525c are in parallel with, but have a step height with the inner portion 525a. Thus, the outer portions 525b and 525c are positioned to the front of the inner portion 525a. The step height between the outer portions 524b and 524c and the inner portion 524a in the sheet member 524 is set smaller than the step height between the outer portions 525b and 525c and the inner portion 525a in the sheet member 525.

In the flange member 522, the sheet member 524 is overlaid upon sheet member 525 in their inner portion 524a and 525a so that the extrusion directions intersect with each other perpendicularly, as illustrated in FIG. 45. The sheet member 524 has been cut so that the length L24 in the extrusion direction is equal to the width (front width) W525 of the inner portion 525a of the sheet member 525. Likewise, the sheet member 525 has been cut so that the length L525 in the extrusion direction is equal to the width (rear width) W524 of the inner portion 524a of the sheet member 524. In the flange member 522 illustrated in FIG. 45, the sheet members 524 and 525 are overlaid with each other so that the front faces of the outer portions 524b, 524c, 525b and 525c are positioned in one plane. The front faces serve as a mounting face to be in contact with a mating face (plane) of a counter member. When the axial member with flange 521 is used as a bumper stay, the counter member is a bumper reinforcement.

The axial member 523 is made of an aluminum alloy extrudate having a circular cross section and is formed by cutting an untreated pipe (extrudate) in a plane perpendicular to the extrusion direction to a predetermined length.

With reference to FIGS. 43 and 44, the axial member with flange 521 is produced in the following manner. The sheet members 524 and 525 are overlaid with each other to form the flange member 522. Next, an untreated pipe 527 is inserted into the hole 526 of the flange member 522 so that the front end of the untreated pipe 527 protrudes frontward from the hole 526. The flange member 522 and the untreated pipe 527 are positioned by a device (not shown). Next, an electromagnetic forming coil (not shown) is placed in the untreated pipe 527 and electromagnetic forming is carried out. Thus, with reference to FIGS. 42 to 44, the untreated pipe 527 inside the hole 526 expands and comes into intimate contact with the inner periphery of the flange member 522 around the hole 526. A protruding portion 527a of the untreated pipe 527 protruding frontward from the hole 526 spreads outward in a radial direction to form a flared portion 528. The untreated pipe 527 to the rear of the hole 526 bulges outward in a radial direction in accordance with the intensity of expansive force induced by the repulsive force of a magnetic field, to thereby form a protrusion 529.

In the axial member with flange 521, the expanded axial member 523 (the untreated pipe after molding is referred to as "axial member 523") is in intimate and secure contact with the inner periphery of the hole 526, and the flange member 522 around the hole 526 is pinched between the flared portion 528 and the protrusion 529 in a vertical direction (from the front of the sheet member 524 and from the rear of the sheet member 525). This enables secure joining between the flange member 522 and the axial member 523.

In addition, the sheet member 524 has an increased rigidity at cutting planes 524f and 524f. This is because the flange member 522 comprises the two sheet members 524 and 525 overlaid and intersecting with each other; the cutting planes 524f and 524f of the sheet member 524 lie over the sheet member 525; and thereby a low rigidity of the sheet member 524 at the cutting planes 524f and 524f are complemented (reinforced) by the rigidity of the sheet member 525. Likewise, the sheet member 525 has an improved rigidity at cutting planes 525f and 525f as being complemented (reinforced) by the rigidity of the sheet member 524. This reduces or avoids distortion of the axial member with flange 521 upon electromagnetic forming and also reduces or avoids distortion of the flange member 521 due to a load applied by a counter member, when the axial member with flange 521 is mounted to the counter member.

In the flange member 522, the cutting planes 524f and 524f of the sheet member 524 are positioned at a rigid end (at the corner formed with the intermediate portions 525d and 525e) in the inner portion 525a of the sheet member 525 and are in parallel with the extrusion direction of the sheet member 525. Likewise, the cutting planes 525f and 525f of the sheet member 525 are positioned at a rigid end in the inner portion 524a of the sheet member 524 (at the corner formed with the intermediate portions 524d and 524e) and are in parallel with the extrusion direction of the sheet member 524. Consequently, the sheet members 524 and 525 highly make up in their rigidity for each other. Distortion is highly effectively prevented, since the rigidity is substantially uniformly improved along the cutting planes 524f and 524f in the sheet member 524, and along the cutting planes 525f and 525f in the sheet member 525.

The flange member 522 enables easy positioning of the sheet member 524 with respect to the sheet member 525. This is because the sheet member 524 can be positioned with respect to the sheet member 525 only by making the cutting planes 524f and 524f of the sheet member 524 coincide with the lower end (corner) of the inclined faces of the intermediate portions 525d and 525e in the sheet member 525. In the flange member 522 illustrated herein, the length L24 in the extrusion direction of the sheet member 524 is set equal to the width (front width) W525 of the inner portion 525a of the sheet member 525 for the convenience of positioning. In such sheet members 524 and 525, the length L524 may be set smaller than the width W525. Likewise, the length L525 may be set larger than or smaller than the width W524.

Figure 46:
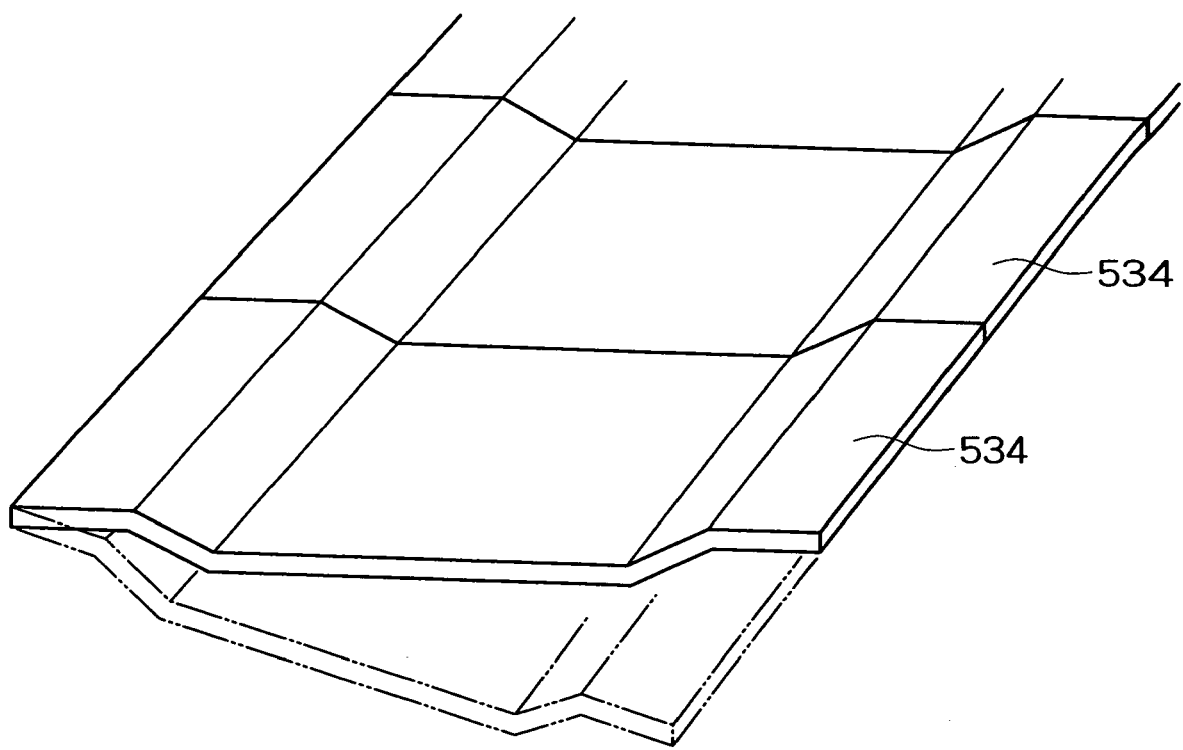
FIG. 46 is a perspective view illustrating a sheet member as another embodiment according to the present invention, and a method of cutting the sheet member.
Figure 47:
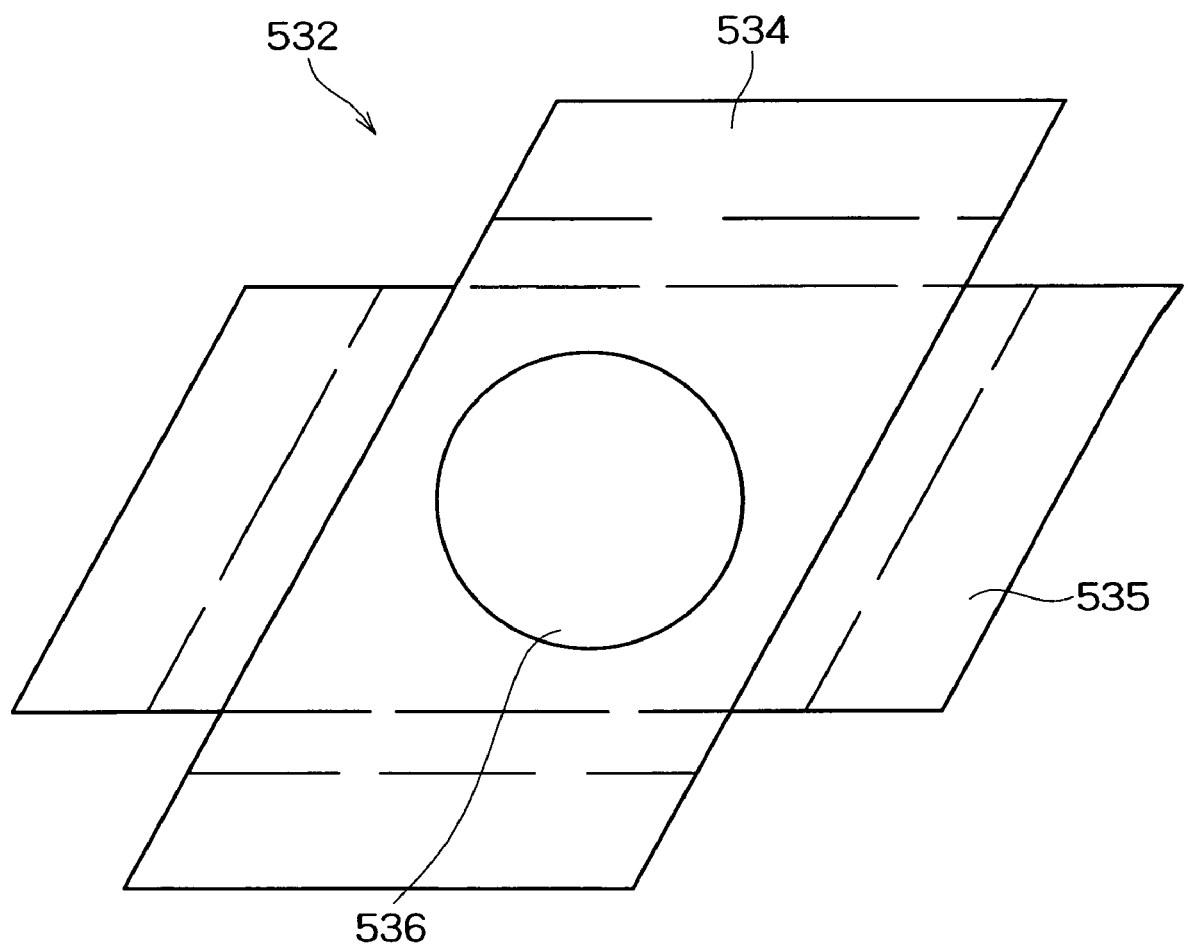
FIG. 47 is a plan view of a flange member using the sheet member just mentioned above.

A flange member 532 illustrated in FIGS. 46 and 47 comprises two sheet members 534 and 535 which are overlaid with each other and have a round hole 536 at the center thereof, which hole 536 penetrates in a thickness direction. With reference to FIG. 46, the sheet member 534 is made of an aluminum alloy extrudate having the same cross sectional shape as the sheet member 524 and is formed by cutting the extrudate in a plane inclined to a plane perpendicular to the extrusion direction to a predetermined length. In FIG. 46, the case where an extrudate is cut in a plane perpendicular to the extrusion direction is indicated by a virtual line. Likewise, the sheet member 535 is made of an aluminum alloy extrudate having the same cross sectional shape as the sheet member 525 and is formed by cutting the extrudate in a plane inclined to a plane perpendicular to the extrusion direction to a predetermined length.

The flange member 532 as illustrated in FIG. 47 is formed by overlaying the sheet member 534 on the sheet member 535 in their inner portions so that their extrusion directions intersect with each other. The intersecting angle between the two sheet members 534 and 535 is not square (90 degrees), in contrast to the flange member 522. However, the flange member 532 is so configured that the both cutting planes of the sheet member 534 are in parallel with the extrusion direction of the sheet member 535 and that the both cutting planes of the sheet member 535 are in parallel with the extrusion direction of the sheet member 534, as in the flange member 522. Although not illustrated in detail, the flange member 532 has a similar configuration to that of the flange member 522 in that the cutting planes of the sheet member 534 are positioned at a rigid end (at the corner formed with the intermediate portion) of the inner portion in the sheet member 535 and that the cutting planes of the sheet member 535 are positioned at a rigid end (at the corner formed with the intermediate portion) of the inner portion in the sheet member 534.

An axial member with flange (not shown) produced by using the flange member 532 will exhibit similar operation and advantages to the axial member with flange 521.

Figure 48A:
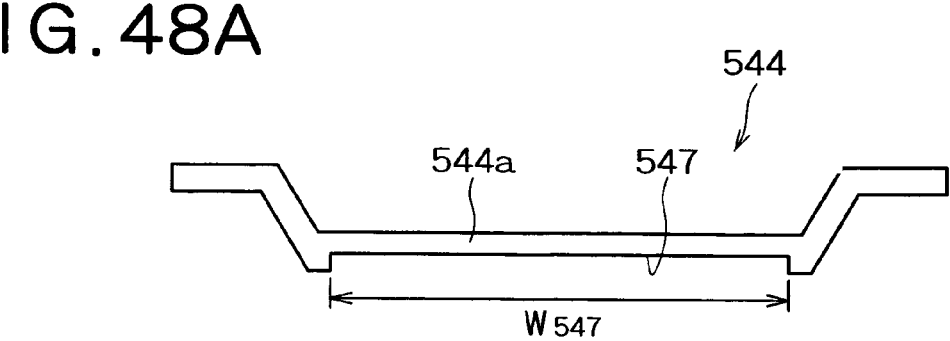
FIG. 48 comprises end views FIG. 48(a) and FIG. 48(b) of a sheet member, and a perspective view FIG. 48(c) of a flange member, for use in an axial member with flange according to another embodiment of the present invention.
Figure 48B:
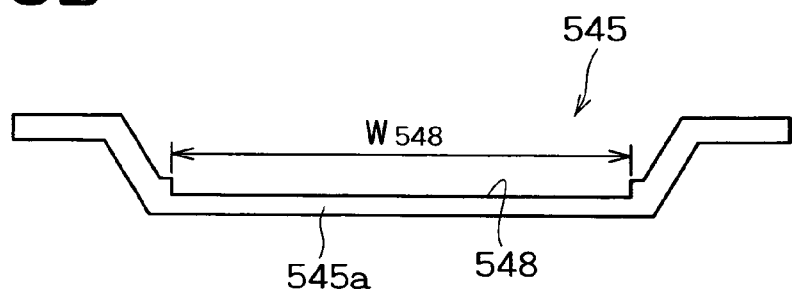
Figure 48C:
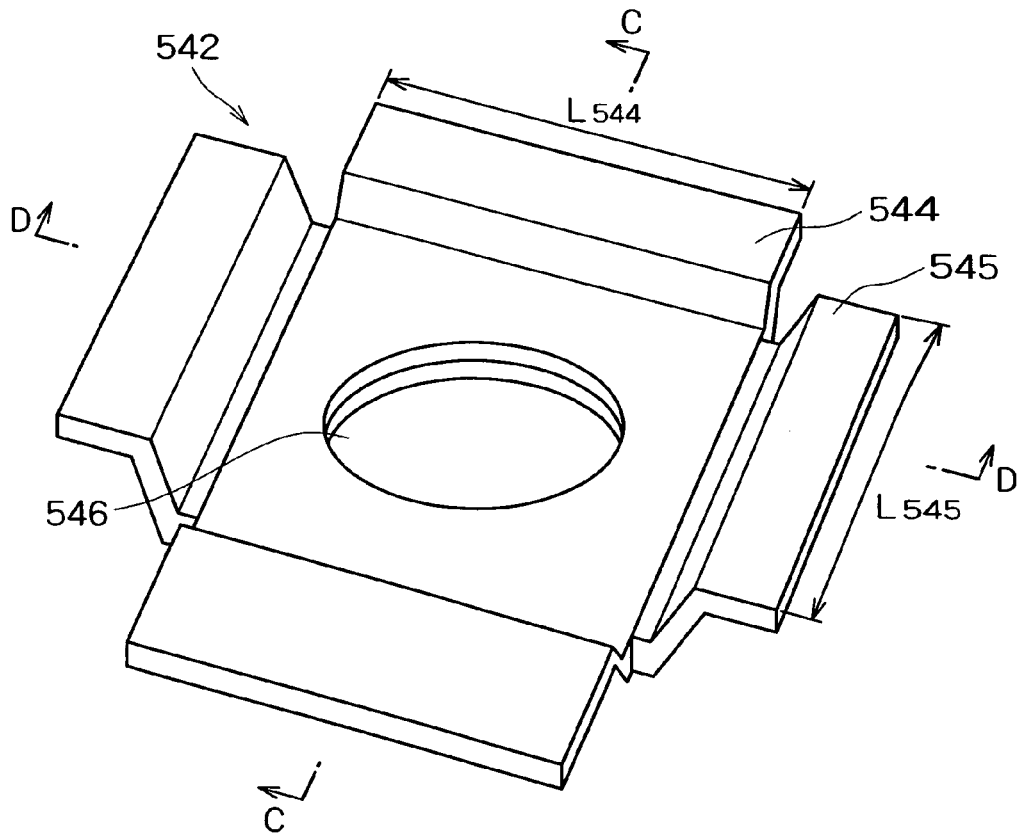
Figure 49A:
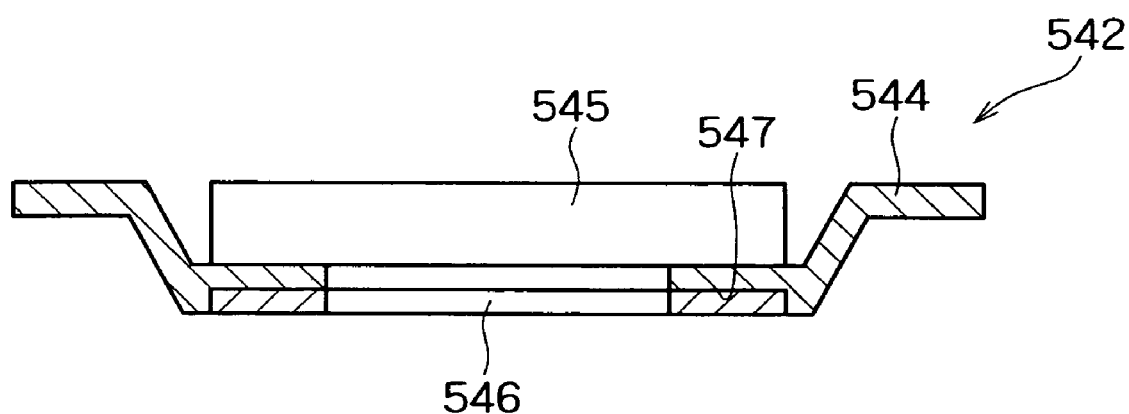
FIG. 49 comprises a cross sectional view FIG. 49(a) taken along line C-C and a cross sectional view FIG. 49(b) taken along line D-D in FIG. 48(c).
Figure 49B:
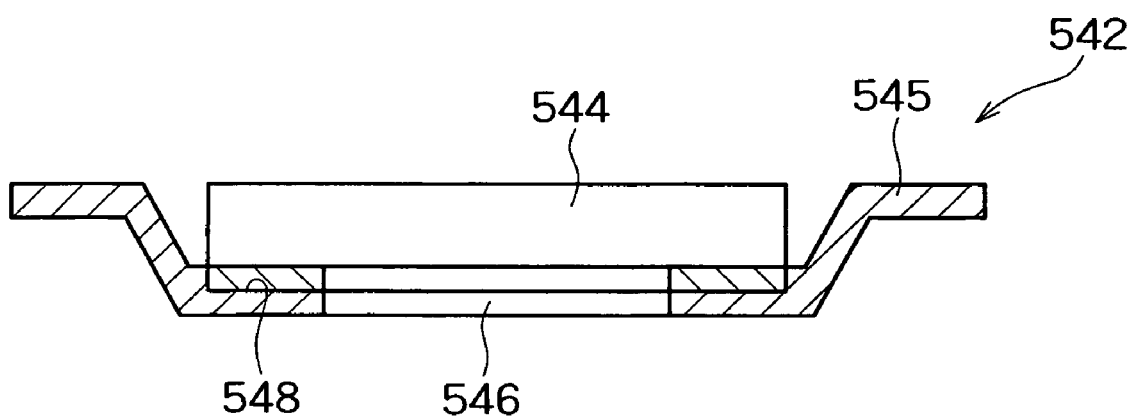

A flange member 542 illustrated in FIGS. 48 and 49 comprises two sheet members 544 and 545 which are overlaid with each other and each have a round hole 546 at the center penetrating in a thickness direction. The sheet member 544 is made of an aluminum alloy extrudate and is formed by cutting the extrudate in a plane perpendicular to the extrusion direction to a predetermined length (L544). The sheet member 544 has basically the same cross sectional structure as the sheet member 524 and comprises an inner portion 544a, outer portions 544b and 544c, and intermediate portions 544d and 544e. The sheet member 545 is made of an aluminum alloy extrudate and is formed by cutting the extrudate in a plane perpendicular to the extrusion direction to a predetermined length (L545). The sheet member 545 has basically the same cross sectional structure as the sheet member 525 and comprises an inner portion 545a, outer portions 545b and 545c, and intermediate portions 545d and 545e. With reference to FIGS. 48(a) and 48(b), the sheet member 544 has a groove 547 with a width W547 in the rear face of the inner portion 544a ; and the sheet member 545 has a groove 548 with a width W548 in the front face of the inner portion 545a.

The length L544 of the sheet member 544 is substantially equal to the width W548 of the groove 548, and the length L545 of the sheet member 545 is substantially equal to the width W547 of the groove 547. Consequently, the two grooves 547 and 548 will engage with each other when the sheet members 544 and 545 are overlaid other so that their extrusion directions intersect with each other at the right angle.

The sheet members 544 and 545 in the flange member 542 each have a smaller thickness than that of the other region in a region corresponding to the grooves 547 and 548, namely, in a region where the two members are overlaid in the inner portions 544a and 545a. As a result of overlaying the two members, however, the region as a whole has a thickness similar to that of the other regions. The flange members 522 and 532 each have, in an overlaying region, a thickness two times larger than that of a single sheet member not overlaid and have a high rigidity corresponding to the thickness in the region. When a flange member does not need such a high rigidity, it may have a small thickness in a region where the sheet members are overlaid so as to reduce its weight as in the flange member 542, as long as a necessary rigidity is obtained.

The flange member 542 enables easy positioning between the two sheet members 544 and 545, since the sheet members 544 and 545 have the grooves 547 and 548 in the inner portions 544a and 545a.

Figure 50A:
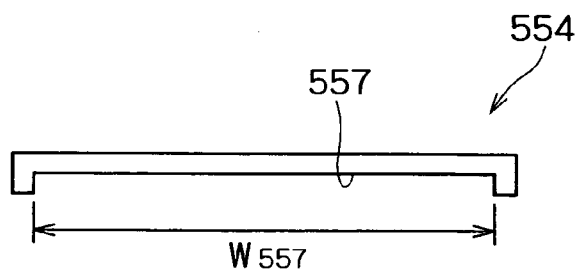
FIG. 50 comprises end views FIG. 50(a) and FIG. 50(b) of a sheet member, and a perspective view FIG. 50(c) of a flange member, for use in an axial member with flange according to yet another embodiment of the present invention.
Figure 50B:
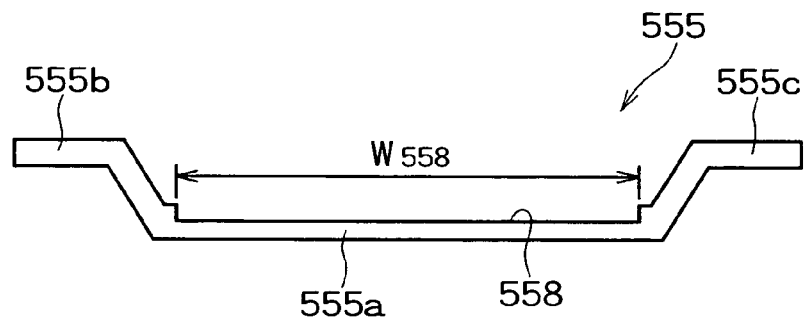
Figure 50C:
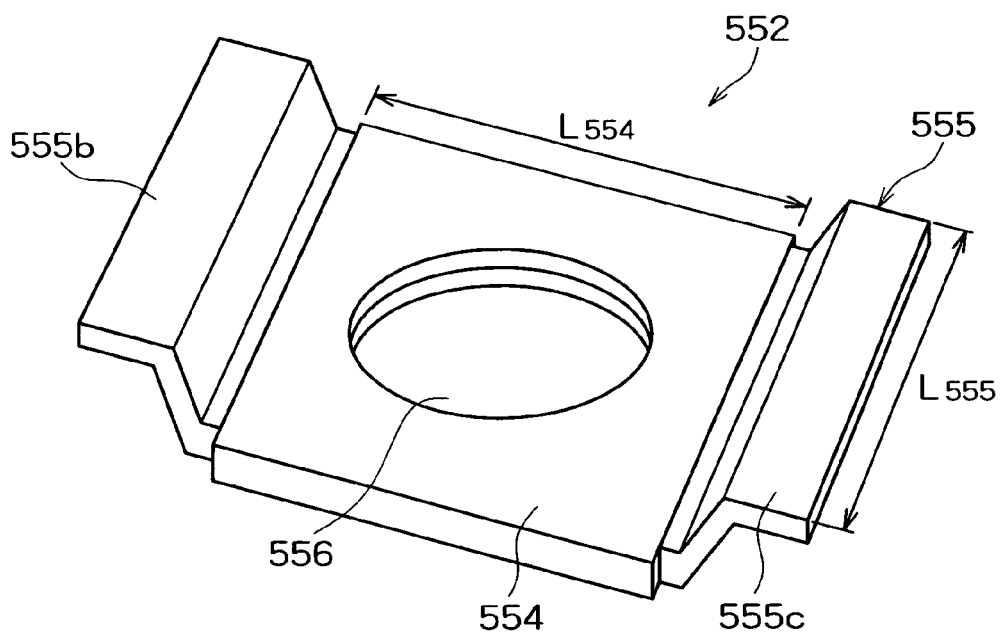

A flange member 552 illustrated in FIG. 50 comprises two sheet members 554 and 555 which are overlaid with each other and each have a round hole 556 at the center penetrating in a thickness direction. The sheet member 554 resembles the sheet member 544 in having a groove 557 in the rear but differs therefrom in having neither outer portions nor intermediate portions and having only a portion corresponding to the inner portion 544a of the sheet member 544. The sheet member 555 has the same configuration as the sheet member 545. More specifically, the sheet member 555 has a groove 558 in the front of an inner portion 555a; the sheet member 554 has a length L554 substantially equal to the width W558 of the groove 558; the sheet member 555 has a length L555 substantially equal to the width W557 of the groove 557; and the two grooves 557 and 558 engage with each other.

An axial member with flange (not shown) produced by using the flange member 552 exhibits similar operation and advantages to those of the axial member with flange produced by using the flange member 542, except for having only two portions (outer portions 555b and 555c) to serve as a mounting face in the front face instead of four portions (four outer portions).

Connection members according to the present invention will be illustrated in more detail with reference to FIGS. 51 to 64 by taking bumper stays as an example.

Figure 51:
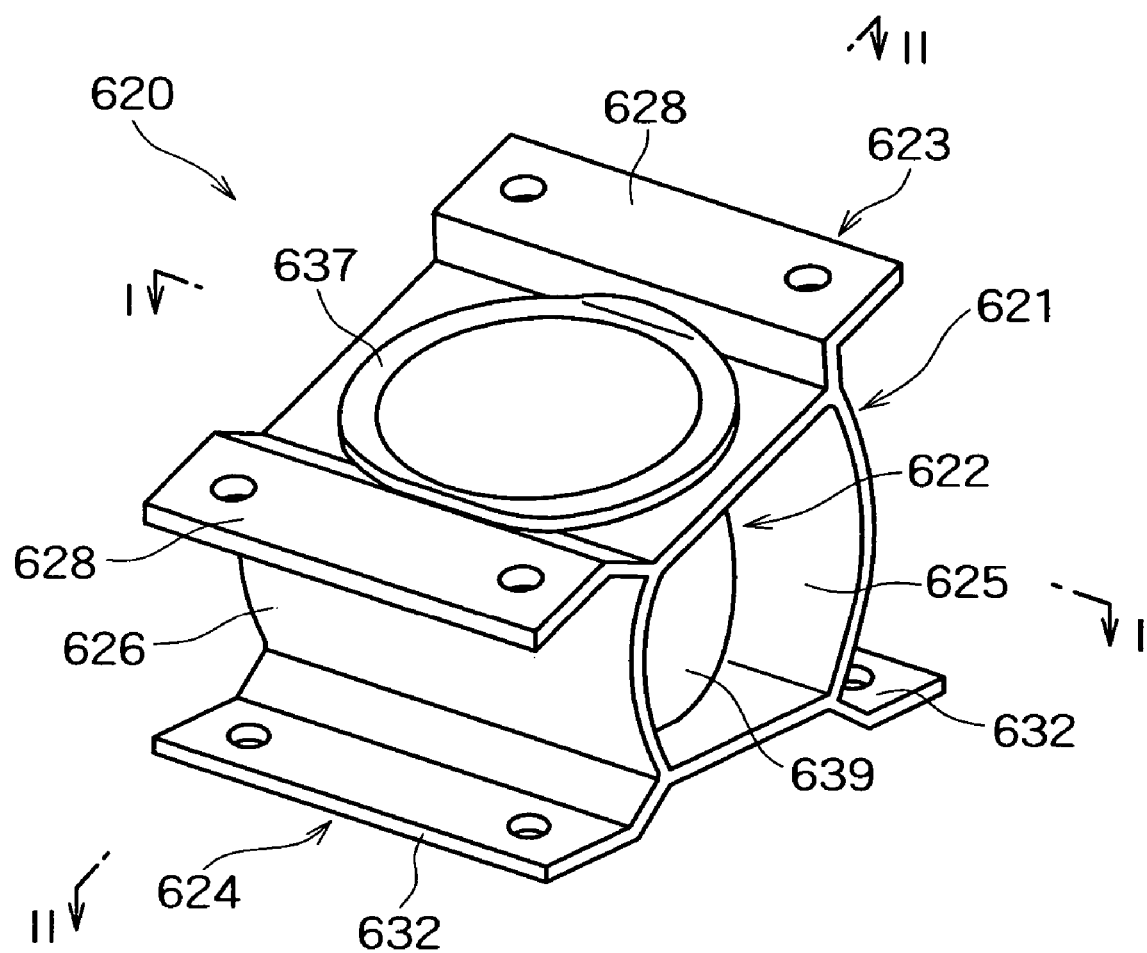
FIG. 51 is a perspective view of a bumper stay according to the present invention.

A bumper stay 620 shown in FIG. 51 is to be mounted to an inclined mating face at the end of a bumper reinforcement and comprises a hollow member 621 and an axial member 622, each of which is made of an aluminum alloy extrudate.

Figure 52:
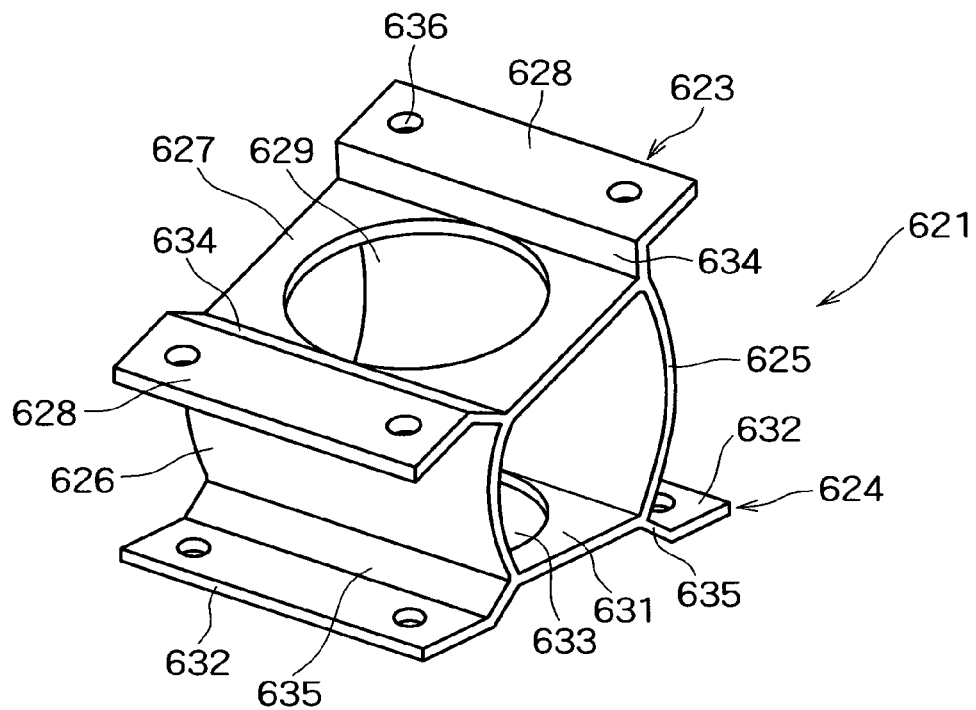
FIG. 52 is a perspective view of a hollow member constituting the bumper stay just mentioned above.

As clearly illustrated in FIG. 52, the hollow member 621 comprises a sheet first flange 623, a sheet second flange 624 and pair of ribs 625 and 626 connecting these flanges. The first flange 623 has steps, in which its center part 627 is positioned to the rear of mounting sections 628 to be in contact with the bumper reinforcement. The center part 627 has a hole 629 into which the axial member 622 is mounted. Likewise, the second flange 624 has steps, in which a center part 631 is positioned to the rear of a mounting sections 632 to be in contact with a side member. The center part 631 has a hole 633 into which the axial member 622 is to be mounted. The holes 629 and 633 each have a round shape when viewed from a direction perpendicular to the center part 631 and have a diameter substantially equal to the width of the center parts 627 and 631. In this connection, the hole 629 has a somewhat elliptic shape when viewed from a direction perpendicular to the center part 627. The ribs 625 and 626 connect the center parts 627 and 631 of the first and second flanges and the vicinities at corners of ramps 634 and 635 and curve outward. FIG. 52 illustrates bolt holes 636 for fixing.

Figure 54:
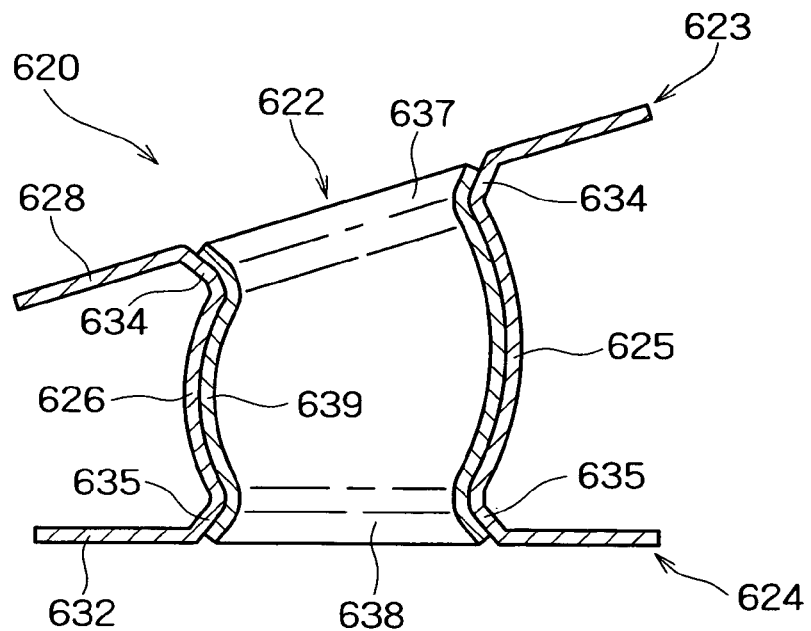
FIG. 54 is a cross sectional view taken along line I-I in FIG. 51.
Figure 55:
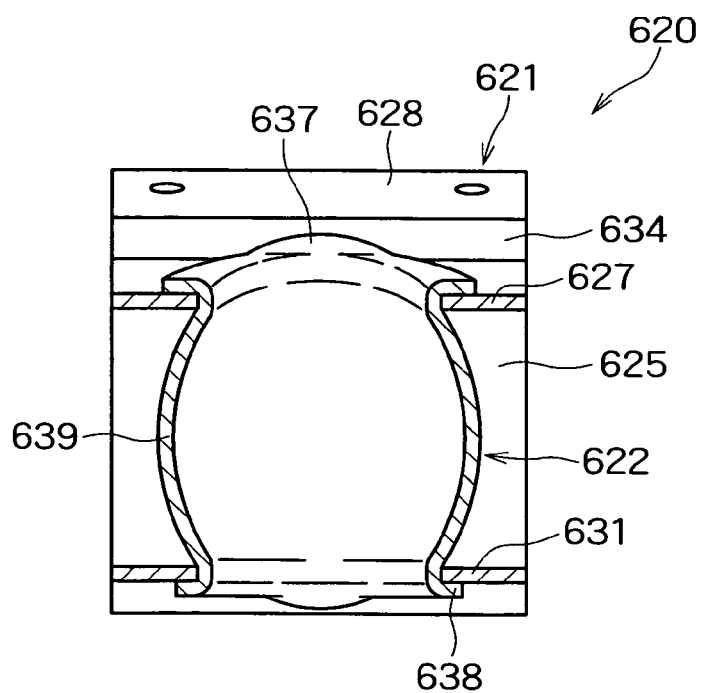
FIG. 55 is a cross sectional view taken along line II-II in FIG. 51.

With reference to FIGS. 54 and 55, the axial member 22 is placed into the holes 629 and 633 at both ends, expands as a result of electromagnetic forming and comes into intimate contact with the inner peripheries of the holes 629 and 633. In addition, portions of the axial member 22 protruding frontward from the holes 629 and 633 flare in a radial direction to form flared portions 637 and 638, and a portion of the axial member 22 between the first and second flanges 623 and 624 expands as a result of electromagnetic forming and protrude outward in a radial direction to form a protrusion 639. The flared portions 637 and 638 are in contact with the ramps 634 and 635 partially in a circumferential direction and are in contact with the center parts 627 and 631 in the other region. The tips of the axial member 622 are positioned to the rear of the mounting sections 628 and 632 in the first and second flanges 623 and 624. The protrusion 639 hits against the ribs 625 and 626 and is in intimate contact with them in part of the circumferential direction near to the ribs 625 and 626 (FIG. 54) and freely deforms (protrudes) in the other region in accordance with working force formed during electromagnetic forming. Thus, the axial member 622 is, at both ends, in intimate contact with the inner peripheries of the first and second flanges 623 and 624 around the holes 629 and 633 and is thereby fixed to the first and second flanges 623 and 624 of the hollow member 621. The center parts 627 and 631 are pinched by the flared portion 637 and 638 and the protrusion 639.

Figure 53:
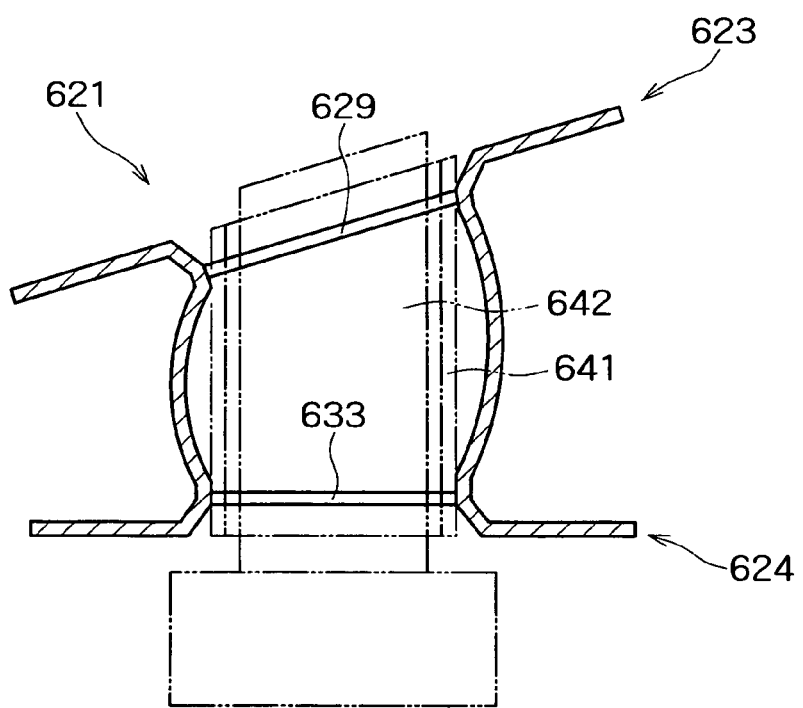
FIG. 53 is a cross sectional view illustrating a production method of the bumper stay.

A production method of the bumper stay 620 is shown in FIG. 53. An axial material 641 having a circular cross section is inserted, at its both ends, into the holes 629 and 633 in the first and second flanges 623 and 624 of the hollow member 621 so that tips of the axial material 641 protrude frontward (the virtual line in FIG. 53). The axial material 641 is cut at one end in a plane perpendicular to the axial direction and is cut at the other end in a plane inclined with respect to the above-mentioned plane. The axial material 641 is placed in the holes 629 and 633 so that a cutting plane at the one end is in parallel with the second flange 624 and a cutting plane at the other end is in parallel with the first flange 623. Namely, the lengths of regions protruding from the holes 629 and 633 are uniform in a circumferential direction.

The axial material 641 in this state is positioned with respect to the hollow member 621, an electromagnetic forming coil 642 is inserted into the axial material 641, an electric energy is applied and thus electromagnetic forming is carried out, and the axial material 641 is allowed to expand in a radial direction. Thus, the above-mentioned bumper stay 620 is produced.

In the bumper stay 620, the axial member 622 is, at its both ends, in intimate contact with the inner peripheries of the holes 629 and 633 and is, in part of the protrusion 639, in intimate contact with the ribs 625 and 626; and the protrusion 639 has a varying shape in a circumferential direction, namely, a region which has freely deformed protrudes more than a region which has been in intimate contact with the ribs. Consequently, the axial member 622 is prevented from rotating in the holes 629 and 633 even if a force acts to relatively rotate the axial member 622 and the hollow member 621. In addition, the first flange 623 particularly in the center part 627 having the hole 629 is inclined to a plane perpendicular to the axial direction of the axial member 622. This also prevents the rotation.

Figure 56:
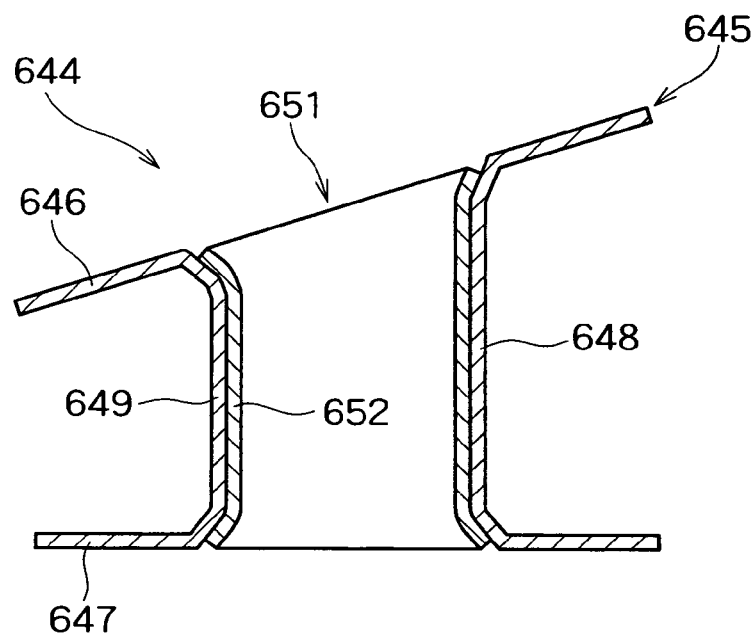
FIG. 56 is a cross sectional view of another bumper stay according to the present invention.

FIG. 56 illustrates a bumper stay 644 having another configuration. The bumper stay 644 has a hollow member 645. The hollow member 645 has the same configuration as the hollow member 621, except that ribs 648 and 649 connecting first and second flanges 646 and 647 are flat. The axial member 651 has a protrusion 652. The axial member 651 has the same configuration as the axial member 622, except that the protrusion 652 is blocked by and is in intimate contact with the ribs 648 and 649 in part of a circumferential direction near to the ribs 648 and 649 and becomes flat in this region. The other region of the protrusion 652 freely deforms (protrudes) in accordance with working force as a result of the electromagnetic forming.

In this configuration, the axial member 651 at the protrusion 652 is more intensively pressed to and becomes in more secure contact with the ribs 648 and 649.

Figure 57:
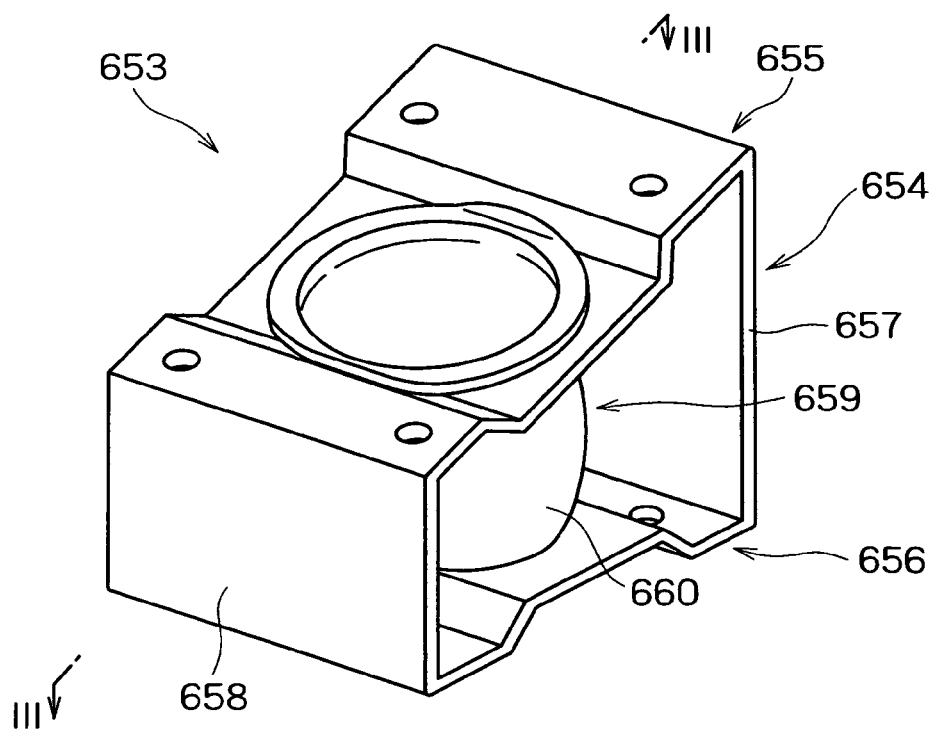
FIG. 57 is perspective view of yet another bumper stay according to the present invention.
Figure 58:
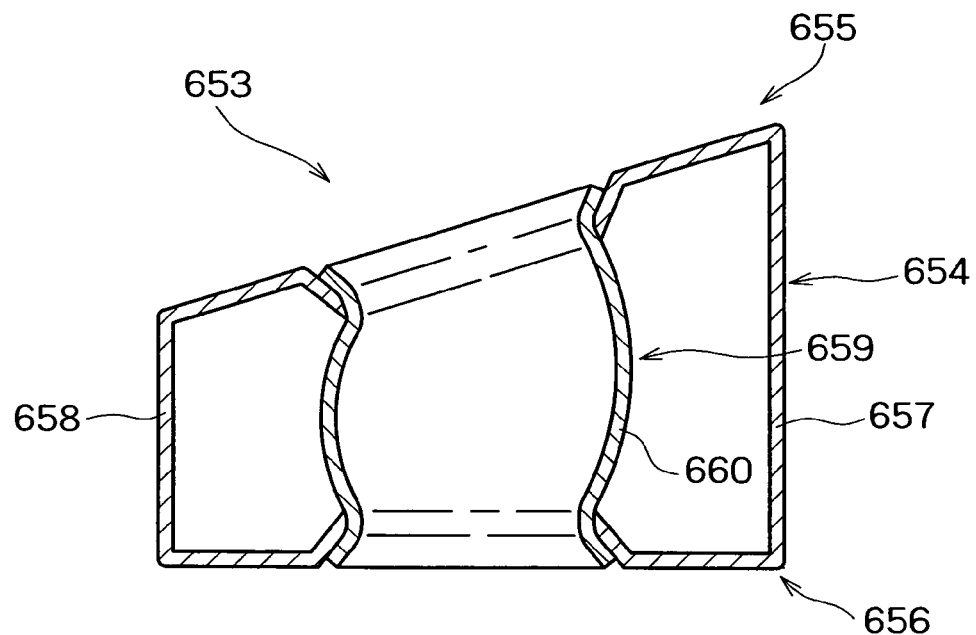
FIG. 58 is a cross sectional view taken alone line III-III in FIG. 57.

FIGS. 57 and 58 illustrate a bumper stay 653 having another configuration. The bumper stay 653 comprises a hollow member 654 and an axial member 659. The hollow member 654 has the same configuration as the hollow member 621, except that ribs 657 and 658 connecting first and second flanges 655 and 656 are arranged at both ends of the first and second flanges 655 and 656 and are flat. The axial member 659 has the same configuration as the axial member 622, except that the axial member 659 is arranged away from the ribs 657 and 658, and a protrusion 660 of the axial member 659 is not in intimate contact with the ribs 657 and 658 and freely deforms (protrudes) in its whole circumference in accordance with working force as a result of electromagnetic forming.

This configuration increases stability under a load, since the distance between the ribs 657 and 658 is wide. In contrast, the first and second flanges 655 and 656 are susceptible to distortion when the axial member 659 instantaneously expands upon electromagnetic forming to yield a force to widen the inner peripheries of holes (holes 629 and 633 of the hollow member 621) in a radial direction. This is because the axial member 659 is arranged at a wide distance from the ribs 657 and 658. In this connection, the hollow member 621 serves to prevent the distortion of the first and second flanges 623 and 624 upon electromagnetic forming, since the mounting sections 628 and 632 of the first and second flanges 623 and 624 are positioned outside the ribs 625 and 626, namely, the ribs 625 and 626 are positioned in the vicinity of the holes 629 and 633, and the ribs 625 and 626 serve as a support against the distortion. In addition, the bumper stay 620 is easy to mount to a bumper reinforcement and a side member, since the mounting sections 628 and 632 are positioned outside the ribs 625 and 626.

Figure 59:
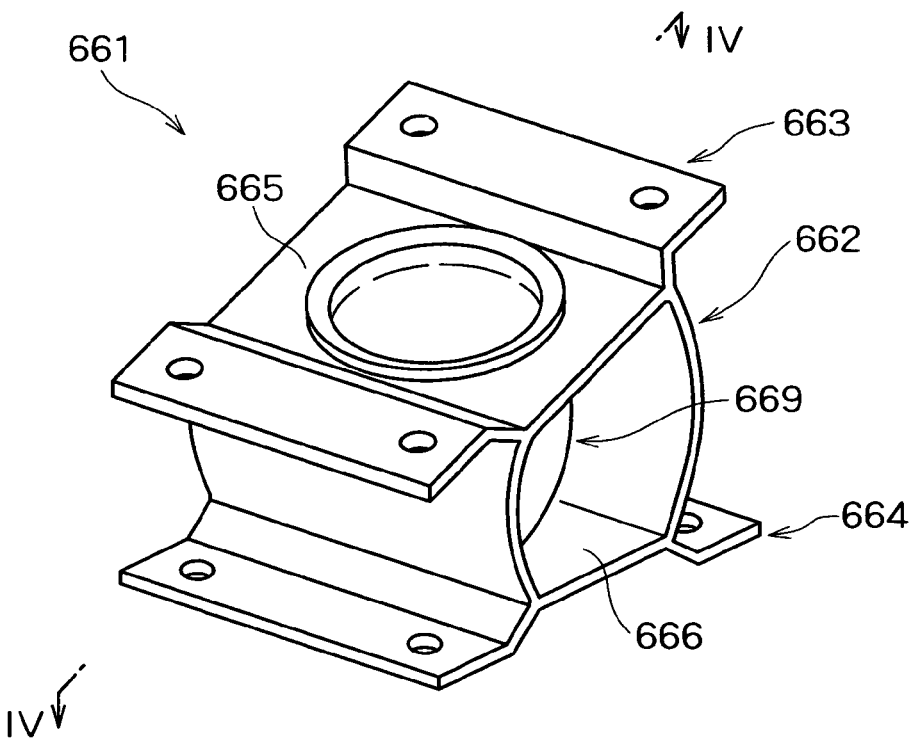
FIG. 59 is a perspective view of another bumper stay according to the present invention.
Figure 60:
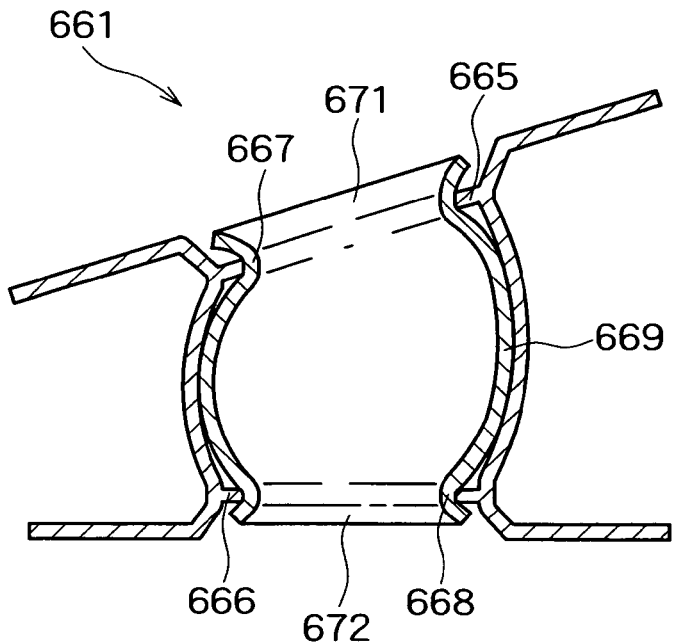
FIG. 60 is a cross sectional view taken along line IV-IV in FIG. 59.

FIGS. 59 and 60 illustrate a bumper stay 661 having another configuration. The bumper stay 661 comprises a hollow member 662 and an axial member 669. It has substantially the same configuration as above, except that holes 667 and 668 arranged in center parts 665 and 666 of first and second flanges 663 and 664 have diameters being not equal to but smaller than the widths of the center parts 665 and 666, and that portions of the axial member 669 protruding frontward from the hole 667 and 668 and spreading in a radial direction in the form of a flange (flared portions 671 and 672) are not in contact with the center parts 665 and 666 in its whole circumference.

This configuration has substantially no disadvantages caused by the flared portions 671 and 672 of the axial member 669 being not in contact with the center parts 665 and 666 of the first and second flanges 663 and 664. In contrast, the configuration yields an advantage in production in that such a small electromagnetic forming force as not make the flared portions 671 and 672 come in contact with the center parts 665 and 666 will do. This reduces the force to widen the inner peripheries of the holes 667 and 668 in a radial direction, which force is induced by the expanding axial member 669 upon electromagnetic forming and thereby prevents distortion of the first and second flanges 663 and 664. The configuration also prolongs the lives of the electromagnetic forming coil, control devices, and other facilities, since there is not need of applying an excessively high electric energy to the electromagnetic forming coil.

Figure 61:
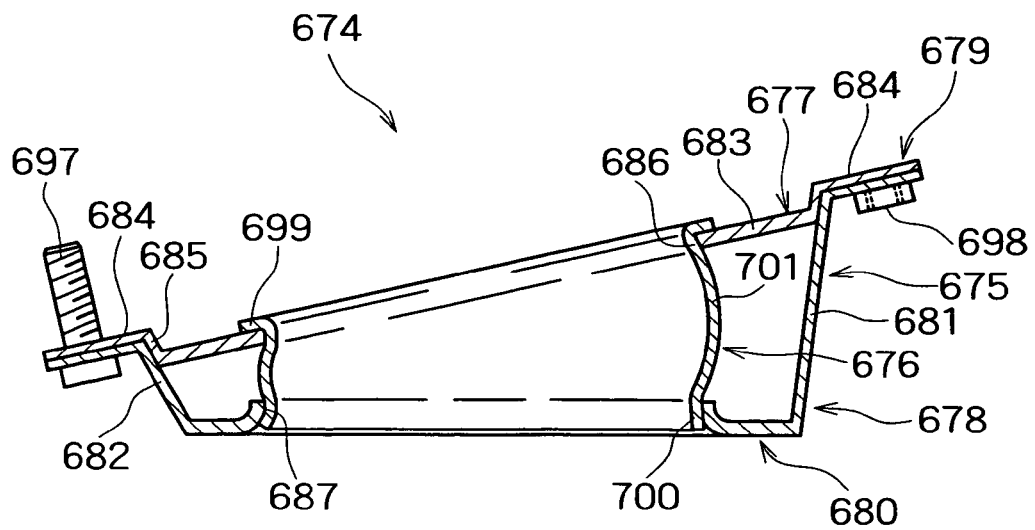
FIG. 61 is a perspective view of another bumper stay according to the present invention.

FIG. 61 illustrates a bumper stay 674 having yet another configuration. The bumper stay 674 is also to be mounted to an inclined mating face at the end of a bumper reinforcement and comprises a hollow member 675 and an axial member 676.

The hollow member 675 comprises two sheet members 677 and 678 each of which is made of an aluminum alloy extrudate (FIGS. 62 and 63) and comprises a sheet first flange 679, a sheet second flange 680 and pair of ribs 681 and 682 connecting these flanges. The first flange 679 has steps and comprises a center part 683, a mounting section 684 to be in contact with a bumper reinforcement, and a ramp 685 connecting the center part 683 and the mounting section 684. The center part 683 is recessed with respect to (located to the rear of) the mounting section 684. The center part 683 has a hole 686 into which an axial member 676 is to be mounted. The second flange 680 has no steps and serves, as a whole, as a mounting section to be in contact with a side member. The second flange 680 has a burring hole 687 substantially in the center thereof, into which the axial member 676 is to be mounted. The holes 686 and 687 each have a circular shape when viewed from a direction perpendicular to the second flange 680. The hole 686 has a somewhat elliptic shape when viewed from a direction perpendicular to the center part 683.

Figure 62:
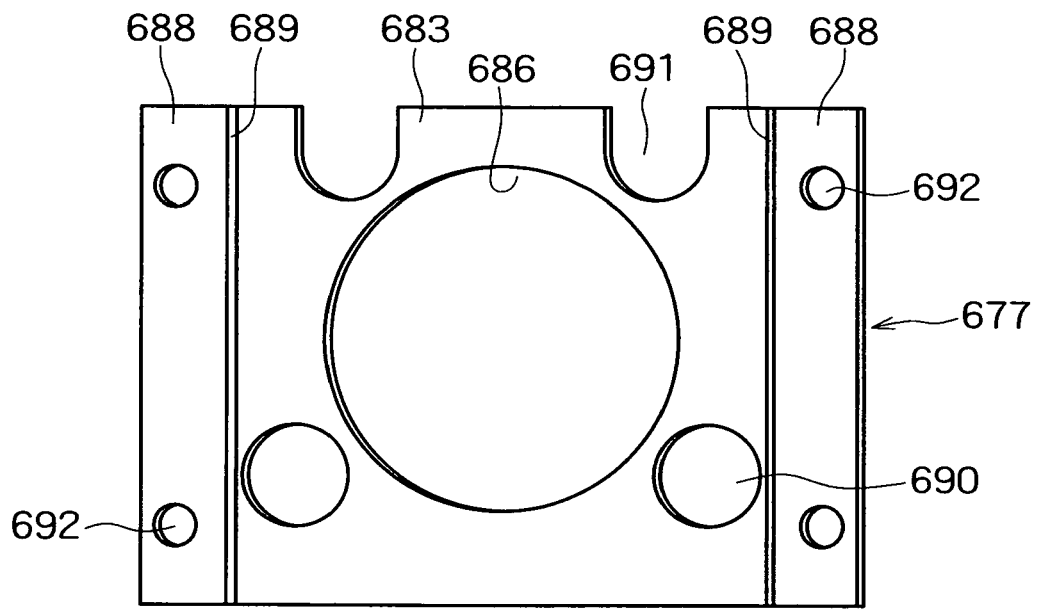
FIG. 62 is a plan view of one of members constituting a hollow member of the bumper stay just mentioned above.
Figure 63:
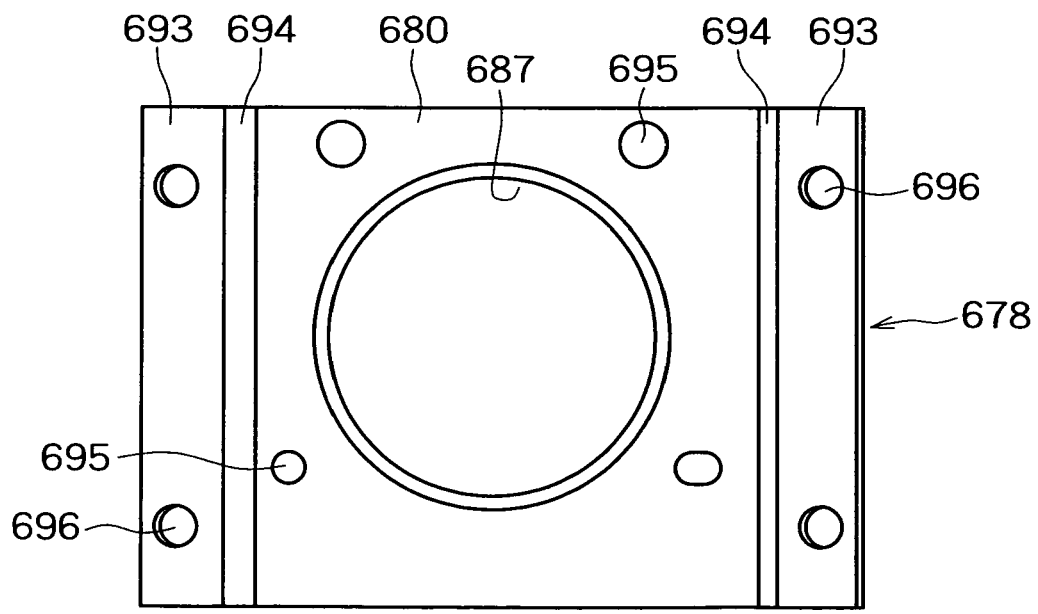
FIG. 63 is a plan view of the other of members constituting a hollow member of the bumper stay just mentioned above.

With reference to FIG. 62, one member 677 for constituting the hollow member 675 is a sheet member having steps and comprises outer portions 688, the center part 683, and ramps 689 connecting the outer portions 688 and the center part 683. The center part 683 is recessed with respect to the outer portions 688 and has the hole 686. The center part 683 also has working holes 690 and working notches 691. The outer portions 688 have bolt holes 692 for mounting the bumper reinforcement. The other member 678 for constituting the hollow member 675 comprises outer portions 693, ramps 694, and the second flange 680. The second flange 680 has the burring hole 687 and bolt holes 695 for mounting the side member. The outer portions 693 have bolt holes 696.

When the members 677 and 678 are combined to form the hollow member 675, the outer portions 688 and the outer portions 693 are overlaid with each other to thereby form the mounting section 684; the ramps 689 are overlaid with upper ends of the ramps 694 to constitute the ramps 685; and the ramps 694 of the member 678 constitute the rib 681, 682. The working holes 690 and the working notches 691 are positioned at points corresponding to the bolt holes 695 for mounting the side member. Thus, a tool can be inserted to carry out bolting. The bolt holes 692 lie over the bolt holes 696, and at these points stud bolts 697 are pounded or self piercing and clinching nuts 698 are fixed, as illustrated in FIG. 61.

With reference to FIG. 61, the axial member 676 at both ends is inserted into the holes 686 and 687, expands as a result of electromagnetic forming, comes into intimate contact with the inner peripheries of the first and second flanges 679 and 680 around the holes 686 and 687. In addition, a portion of the axial member 676 being near to the first flange 679 and protruding frontward from the hole 686 spreads outward in a radial direction in the form of a flange to form a flared portion 699 and comes into contact with the center part 683 in its whole circumference. The end of the axial member 676 near to the second flange 680 comes into intimate contact with the inner periphery of the second flange 680 around the burring hole 687 and spreads outward in a radial direction along the burring hole 687 to form a flared portion 700.

In addition, a portion of the axial member 676 between the first and second flanges 679 and 680 protrudes outward in a radial direction to form a protrusion 701 as a result of expansion by electromagnetic forming. Thus, the axial member 676 is in intimate contact with the inner peripheries of the first and second flanges 679 and 680 around the holes 686 and 687 at both ends and is fixed to the first and second flanges 679 and 680 so that the flared portions 699 and 700, and the protrusion 701 pinch the center part 683 of the first flange 679 and the second flange 680. The first flange 679 has steps, and the flared portion 700 near to the second flange 680 having no steps does not protrude frontward from the burring hole 687.

Consequently, the tips of the axial member 676 are positioned to the rear of the mounting sections of the first and second flanges 679 and 680 (the mounting section 684 and the second flange 680 itself).

Figure 64:
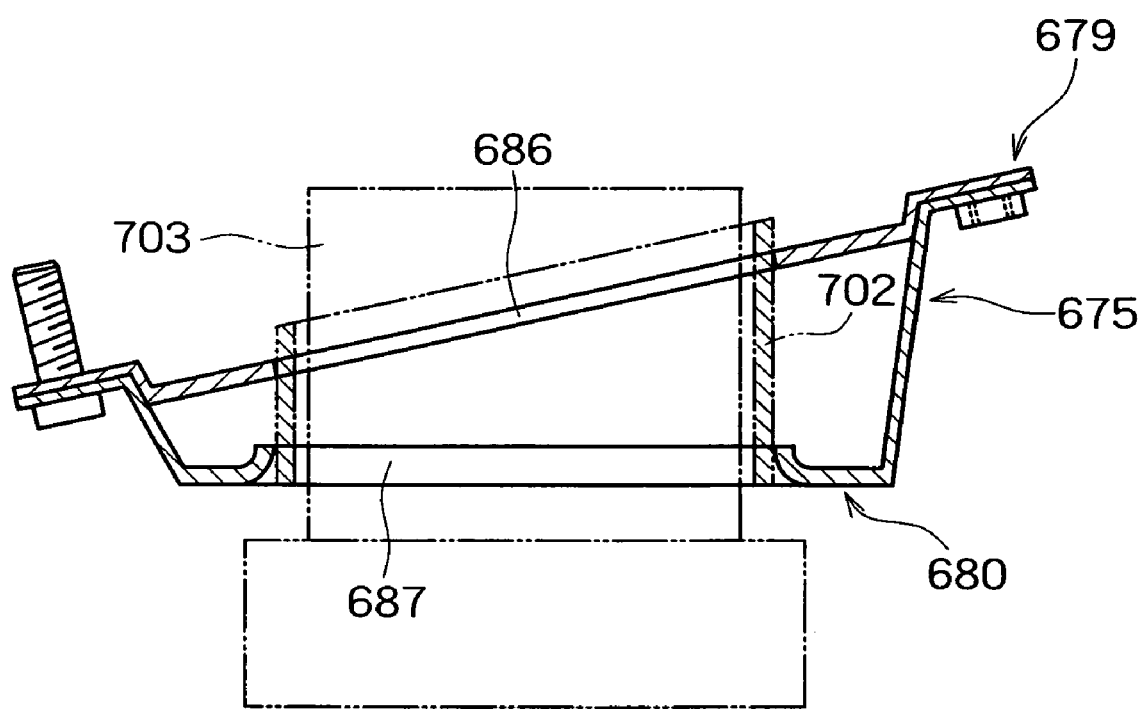
FIG. 64 is a cross sectional view illustrating a production method of the above bumper stay.

A method for producing the bumper stay 674 by fixing the axial member 676 to the hollow member 675 is illustrated in FIG. 64. An axial material 702 is, at both ends, inserted into the hole 686 and the burring hole 687 in the first and second flanges 679 and 680 of the hollow member 675, and a tip of the axial material 702 near to the first flange 679 is protruded frontward (the virtual line in FIG. 64). The axial material 702 is made of an aluminum alloy extrudate having a circular cross section. One end thereof is cut in a plane perpendicular to the axial direction, and the other end is cut along a plane inclined with respect to the above-mentioned plane. The axial material 702 is placed in the holes 686 and 687 so that the cutting plane of the one end is in parallel with the second flange 680, and the cutting plane of the other end is in parallel with the first flange 679, namely, the portion protruding from the hole 679 has a uniform length in a circumferential direction.

The axial material 702 in this state is positioned with respect to the hollow member 675, an electromagnetic forming coil 703 is inserted into the axial material 702, an electric energy is applied to carry out electromagnetic forming to thereby expand the axial material 702 in a radial direction. Thus, the above-mentioned bumper stay 674 is produced.

The hollow member 675 in the bumper stay 674 comprises the two sheet members 677 and 678. This enables easier carrying out of drilling than in a monolithic hollow member such as the hollow member 621. Drilling is carried out so that the resulting hole has an axis perpendicular to the flange both in the first flange and the second flange. In the case of a hollow member, the drilling requires extra time and effort such as positioning of a jig inside the hollow part. In particular, when the hole 629 in the first flange 623 and the hole 633 in the second flange 624 have different axes as in the hollow member 621, the two holes cannot be opened in one process. In contrast, the members 677 and 678 of the hollow member 675 are sheet-like open section members and are easily drilled. In addition, such open section members can be easily extruded and the resulting sheets can be molded by pressing.

Other connection members according to the present invention will be illustrated in detail with reference to FIGS. 65 to 78 by taking bumper stays as an example.

Figure 65:
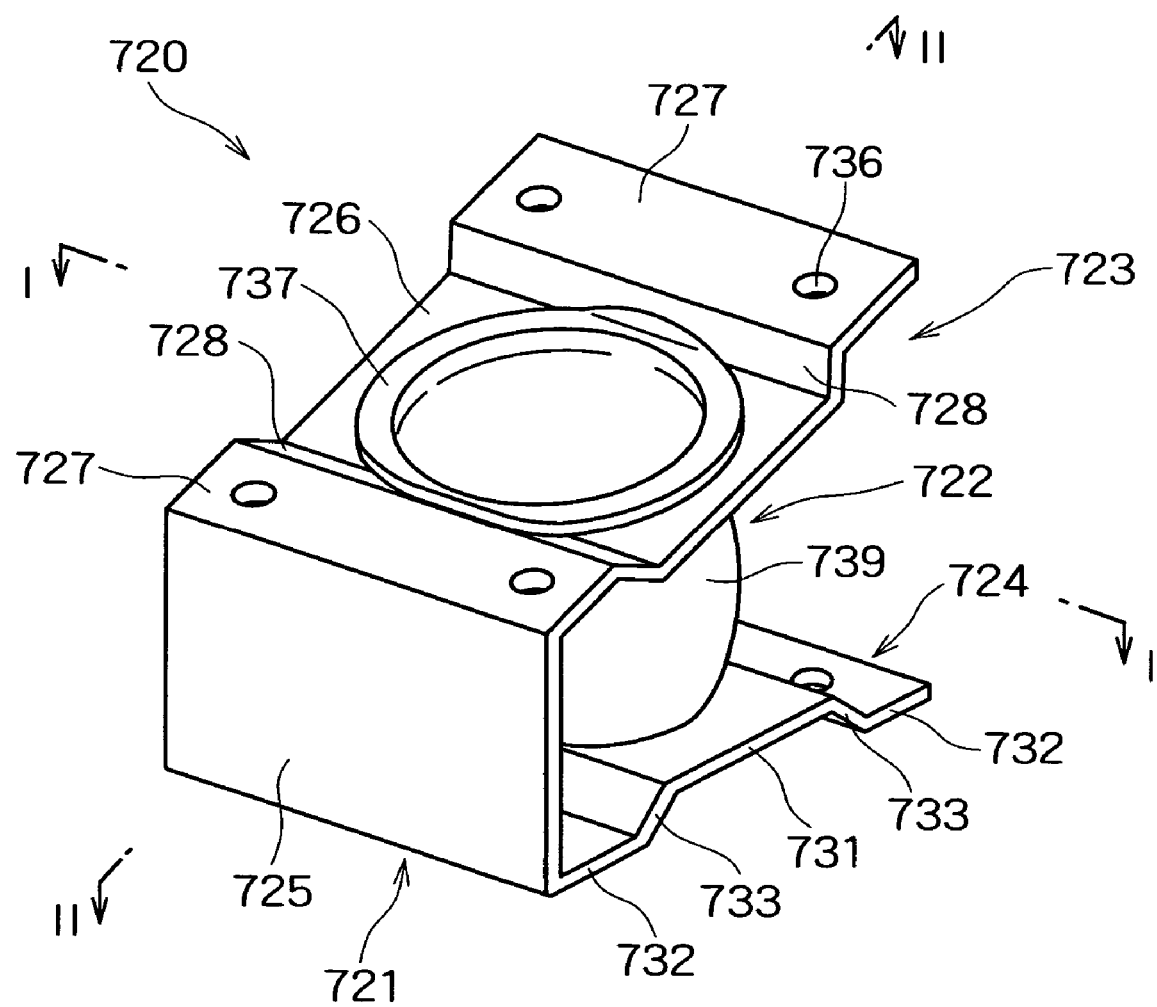
FIG. 65 is a perspective view of a bumper stay according to the present invention.

A bumper stay 720 shown in FIG. 65 is to be mounted to an inclined mating section at the end of a bumper reinforcement and comprise a flange member 721 and an axial member 722 each of which is made of an aluminum alloy extrudate.

Figure 66:
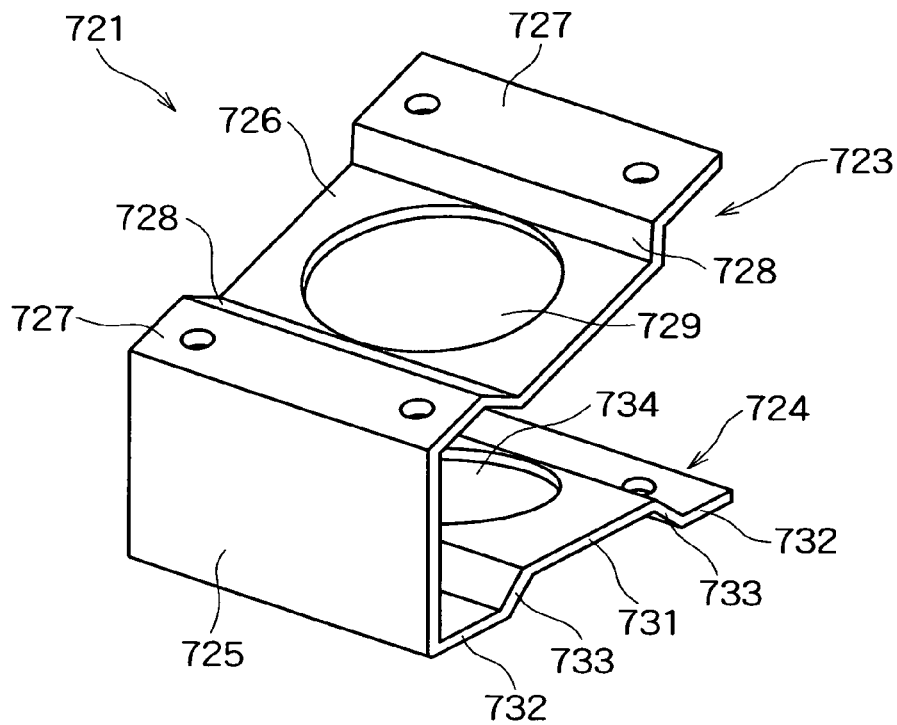
FIG. 66 is a perspective view of a flange member constituting the bumper stay just mentioned above.

As is clearly illustrated in FIG. 66, the flange member 721 comprises a sheet first flange 723, a sheet second flange 724, and a rib 725. The first flange 723 and the second flange 724 are inclined to each other and are connected by the rib 725. The first flange 723 has steps and comprises a center part 726, mounting sections 727 to be in contact with a bumper reinforcement, and ramps 728. The center part 726 is recessed with respect to the mounting sections 727. The flat center part 726 and the flat mounting sections 727 are in parallel with each other and are connected by the ramps 728. The center part 727 has a hole 729 for mounting the axial member 722. The second flange 724 also has steps and comprises a center part 731, mounting sections 732 to be in contact with a bumper reinforcement, and ramps 733. The center part 731 is recessed with respect to the mounting sections 732. The flat center part 731 and the flat mounting sections 732 are in parallel with each other and are connected by the ramps 733. The center part 731 has a hole 734 for mounting the axial member 722. The holes 729 and 734 each have a circular shape when viewed from a direction perpendicular to the center part 731 and have a diameter equal to the widths of the center parts 726 and 731. In this connection, the hole 729 has a somewhat elliptic shape when viewed from a direction perpendicular to the center part 726. The rib 725 connects narrower ends of the first and second flanges 723 and 724 and is perpendicular to the center part 731 of the second flange 724. FIG. 66 also illustrates fixing bolt holes 736.

Figure 68:
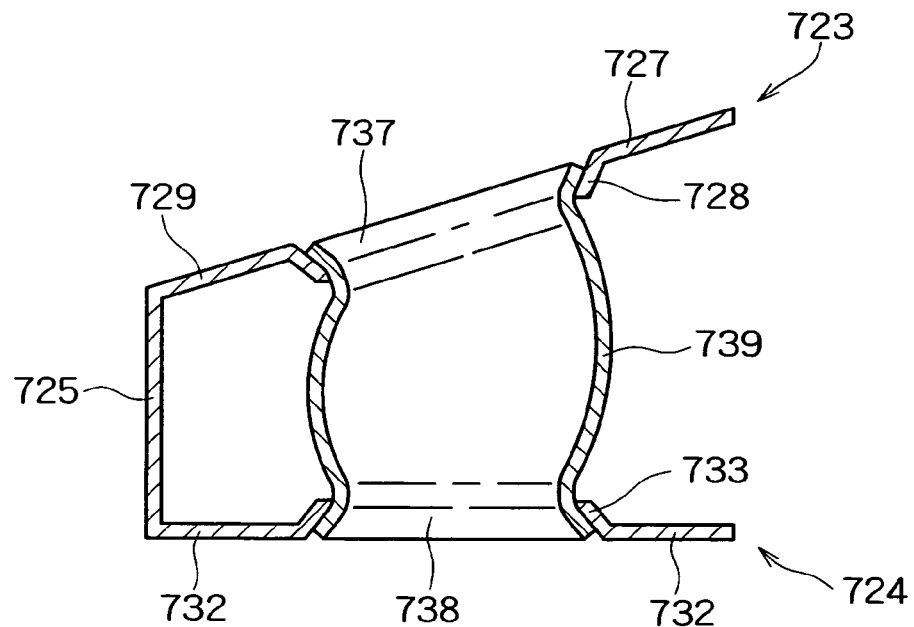
FIG. 68 is a cross sectional view taken along line I-I in FIG. 65.
Figure 69:
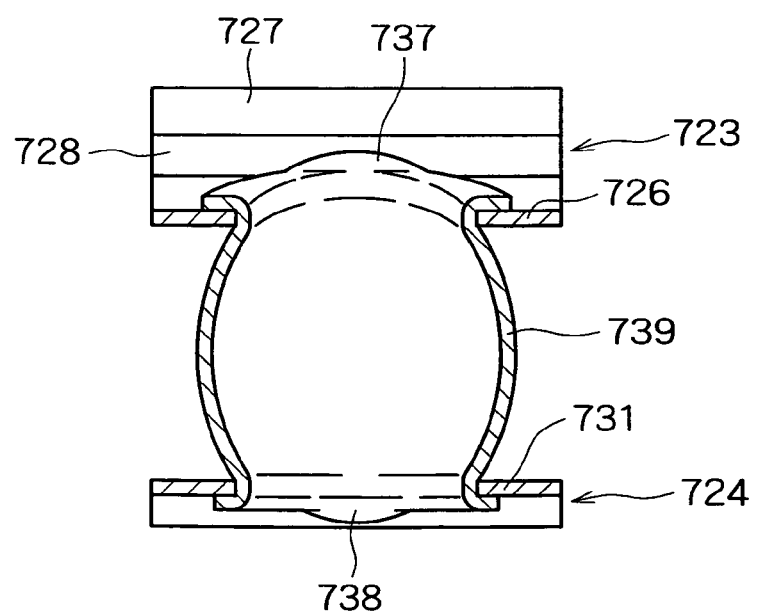
FIG. 69 is a cross sectional view taken along line II-II in FIG. 65.

With reference to FIGS. 68 and 69, the axial member 722 is, at both ends, inserted into the holes 729 and 734, expands as a result of electromagnetic forming to come into intimate contact with the inner peripheries of the first and second flanges 723 and 724 around the holes 729 and 734. In addition, a portion of the axial member 722 protruding frontward from the holes 729 and 734 spreads in the form of a flange in a radial direction to form flared portions 737 and 738, and a portion of the axial member 722 between the first and second flanges 723 and 724 expands as a result of electromagnetic forming and thereby protrudes in a radial direction to form a protrusion 739. The flared portions 737 and 738 are, in part in a circumferential direction, in contact with the ramps 728 and 733 and are in contact with the center parts 726 and 731 in the other region. The tips of the axial member 722 are positioned to the rear (inside) of the mounting sections 727 and 732 of the first and second flanges 723 and 724. The protrusion 739 freely deforms (protrudes) in accordance with working force as a result of electromagnetic forming. Thus, the axial member 722 is in intimate contact with the inner peripheries of the first and second flanges 723 and 724 around the holes 729 and 734 at both ends and is fixed to the first and second flanges 723 and 724 of the flange member 721, in which the flared portions 737 and 738, and the protrusion 739 pinch the center parts 726 and 731.

Figure 67:
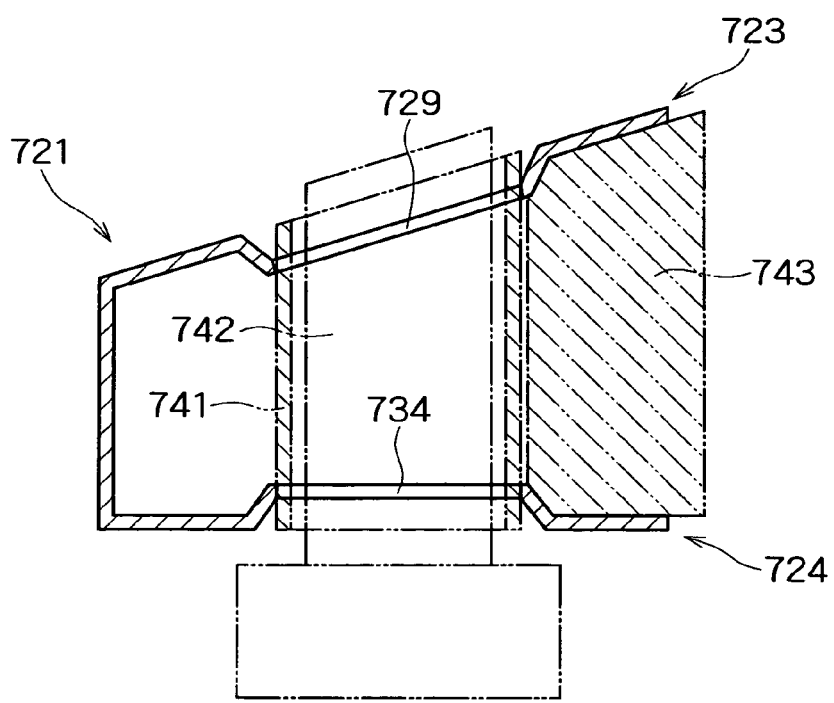
FIG. 67 is a cross sectional view illustrating a production method of the bumper stay just mentioned above.

A production method of the bumper stay 720 is illustrated in FIG. 67. Initially, an axial material 741 having a circular cross section is inserted into the holes 729 and 734 in the first and second flanges 723 and 724 of the flange member 721 at both ends so that the tips of the axial material 741 protrude frontward from the holes (the virtual line in FIG. 67). The axial material 741 is cut at one end in a plane perpendicular to the axial direction and is cut at the other end in a plane inclined with respect to the above-mentioned plane. The axial material 741 is placed in the holes 729 and 734 so that a cutting plane at one end is in parallel with the center part 731 of the second flange 724, and a cutting plane at the other end is in parallel with the center part 726 of the first flange 723.

Namely, the axial material 741 protrudes from the holes 729 and 734 with uniform lengths in a circumferential direction.

The axial material 741 in this state is positioned with respect to the flange member 721, and an electromagnetic forming coil 742 is inserted into the axial material 741. A jig 743 for preventing deformation is then inserted into the open side of the flange member 721, an electric energy is applied and electromagnetic forming is carried out to thereby expand the axial material 741 in a radial direction. Thus, the above-mentioned bumper stay 720 is produced.

In the resulting bumper stay 720, the center parts 726 and 731 of the first and second flanges 723 and 724 are recessed from the mounting sections 727 and 732, and thereby the tips (flared portions 737 and 738) of the axial member 722 can be positioned to the rear (inside) of the front faces of the mounting sections 727 and 732, even though they protrude frontward from the holes 729 and 734. Consequently, the tips of the axial member 722 protruding frontward from the holes 729 and 734 do not obstruct the mounting of the mounting sections 727 and 732 to other members (the bumper reinforcement and the side member).

In the bumper stay 720, the rib 725 of the flange member 721 serves to support a load applied upon collision, together with the axial member 722. The rib 725 is resistant to buckling (collapse) upon collision because of the reinforcement by the axial member 722 and thereby serves to support the load satisfactorily. The bumper stay 720 also highly absorbs energy by the action of accordion-fold deformation of the axial member 722.

The bumper stay 720 uses the flange member 721 comprising the first and second flanges 723 and 724 connected by the rib 725. This uniquely determines the positional relationship between the first and second flanges 723 and 724 and thereby enables easy positioning between the axial member 722 and the first and second flanges 723 and 724 upon electromagnetic forming. In addition, the jig 743 for preventing deformation can be easily inserted into the flange member upon electromagnetic forming, since the rib 725 connects the narrower ends of the first and second flanges 723 and 724.

In the bumper stay 720, the axial member 722 is in intimate contact with the inner peripheries of the first and second flanges 723 and 724 around the holes 729 and 734 at both ends; the flared portions 737 and 738 are in contact with the ramps 728 and 733 partly in a circumferential direction; and the first flange 723 particularly in the center part 726 having the hole 729 is inclined with respect to a plane perpendicular to the axial direction of the axial member 722. These prevent the axial member 722 from rotating in the holes 729 and 734 even if a force acts to relatively rotate the axial member 722 and the flange member 721 (the flanges 723 and 724).

Figure 70:
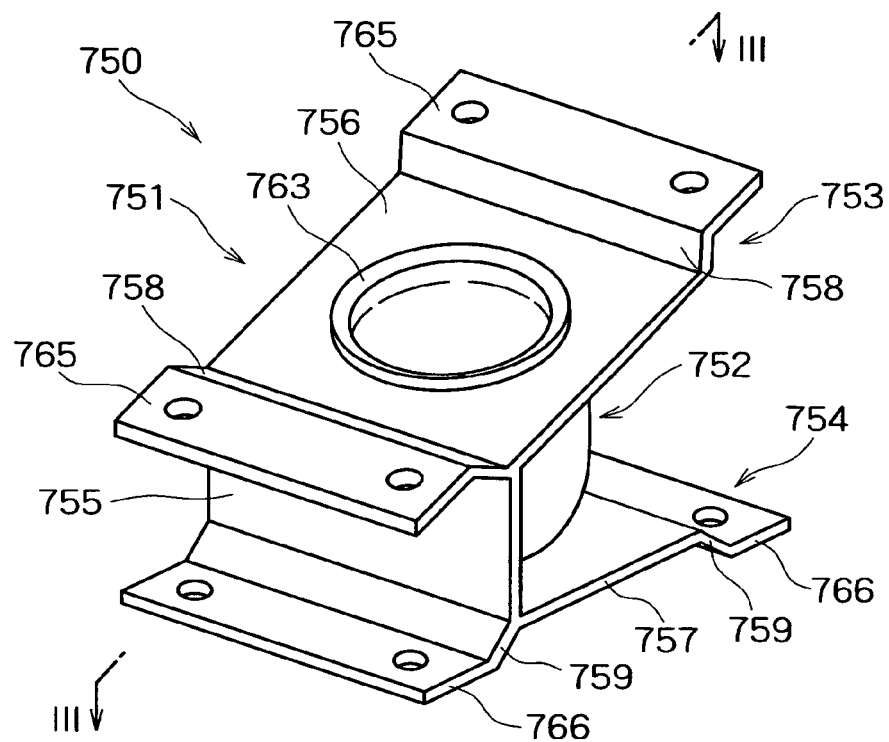
FIG. 70 is a cross sectional view of another bumper stay according to the present invention.
Figure 71:
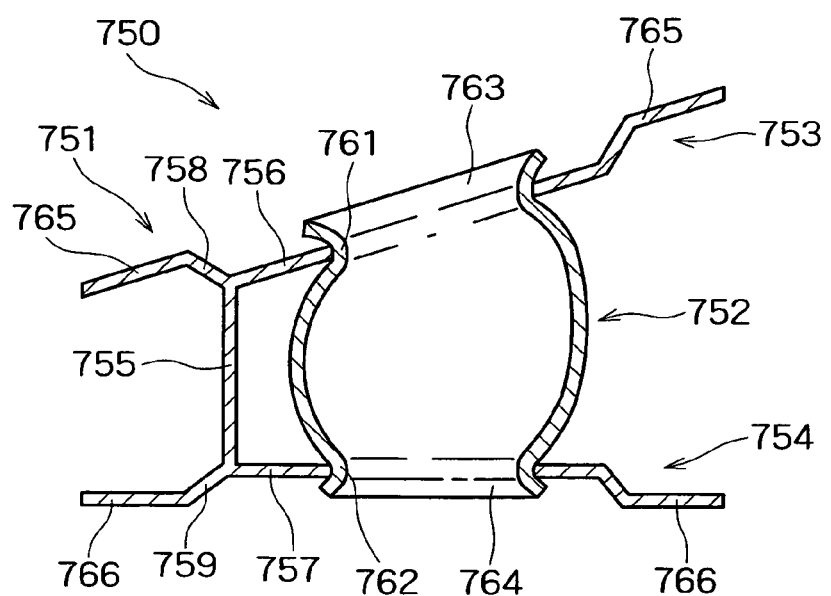
FIG. 71 is a cross sectional view taken along line III-III in FIG. 70.

FIGS. 70 and 71 illustrate a bumper stay 750 having another configuration. The bumper stay 750 has substantially the same configuration as the bumper stay 720, except that a rib 755 for connecting first and second flanges 753 and 754 of a flange member 751 connects the vicinities at the corners of center parts 756 and 757 and ramps 758 and 759; that holes 761 and 762 arranged in the center parts 756 and 757 of the first and second flanges 753 and 754 have diameters not equal to but smaller than the widths of the center parts 756 and 757; and that portions of the axial member 752 protruding frontward from the holes 761 and 762 and spreading as a flange (flared portion 763 and 764) are not in contact with the center parts 756 and 757 in its whole circumference.

The bumper stay 750 is resistant to distortion of the first and second flanges 756 and 757 as being supported by the rib 755 when the axial member 752 instantaneously expands to yield force to widen the inner peripheries of the holes 761 and 762 outward in a radial direction upon electromagnetic forming. This is because the rib 755 of the flange member 751 is positioned in the vicinity of the holes 761 and 762. In addition, the bumper stay 750 can be easily mounted to a bumper reinforcement and a side member, since the mounting sections 765 and 766 of the flange member 751 is positioned outside the rib 755.

The bumper stay 750 has substantially no disadvantages caused by the flared portions 763 and 764 of the axial member 752 being not in contact with the center parts 756 and 757 of the first and second flanges 752 and 753. In contrast, this configuration yields an advantage in production in that such a low electromagnetic forming force as not make the flared portions 763 and 764 come in contact with the center parts 756 and 757 will do. This reduces the force to widen the inner peripheries of the holes 761 and 762 in a radial direction, which force is induced by the expanding axial member 752 upon electromagnetic forming. Thus distortion of the first and second flanges 752 and 753 is prevented. The configuration also prolongs the lives of the electromagnetic forming coil, control devices, and other facilities, since there is no need of applying an excessively high electric energy to the electromagnetic forming coil.

Figure 72:
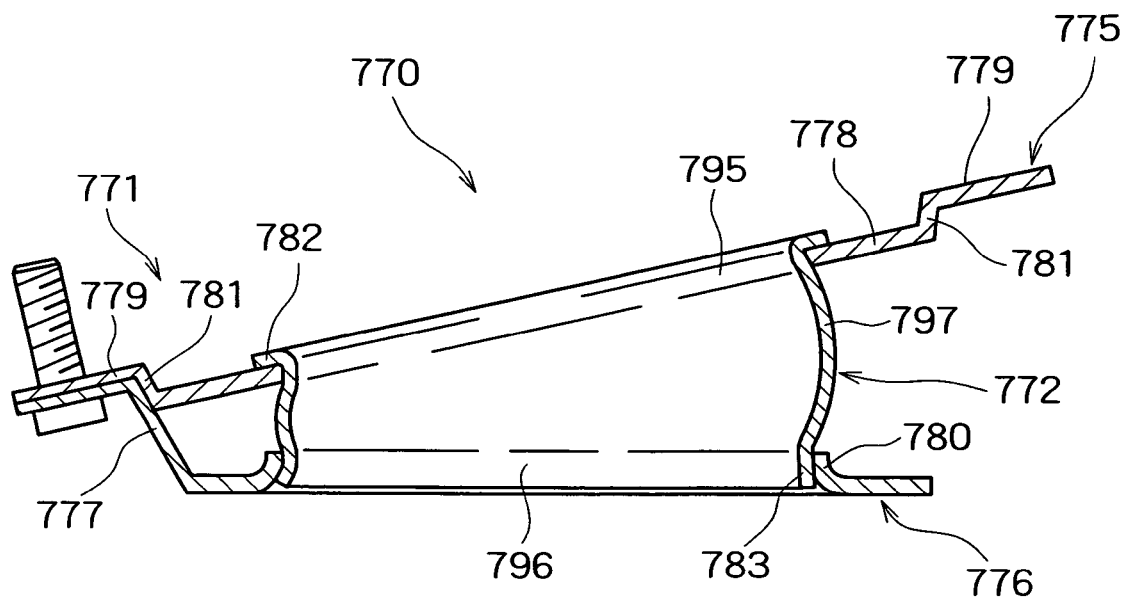
FIG. 72 is a perspective view of yet another bumper stay according to the present invention.

FIG. 72 illustrates a bumper stay 770 having yet another configuration. The bumper stay 770 is also to be mounted to an inclined mating section at the end of a bumper reinforcement and comprises a flange member 771 and an axial member 772.

The flange member 771 includes a combination of two sheet members 773 and 774 (FIGS. 73 and 74) each of which is made of an aluminum alloy extrudate and comprises a sheet first flange 775, a sheet second flange 776, and a rib 777 connecting these flanges. The first flange 775 has steps and includes a center part 778 and mounting sections 779 to be in contact with a bumper reinforcement. The center part 778 is recessed from the mounting sections 779. The flat center part 778 and the flat mounting sections 779 outside thereof are in parallel with each other and are connected by ramps 781. The center part 778 has a hole 782 for mounting the axial member 772. The second flange 776 has no steps and serves, as a whole, a mounting section to be in contact with a side member. The second flange 776 has a burring hole 783 for mounting the axial member 772 substantially in the center thereof and has a hole flange 780 around the burring hole 783. The holes 782 and 783 each have a circular shape when viewed from a direction perpendicular to the second flange 776. The hole 782 has a somewhat elliptic shape when viewed from a direction perpendicular to the center part 778.

Figure 73:
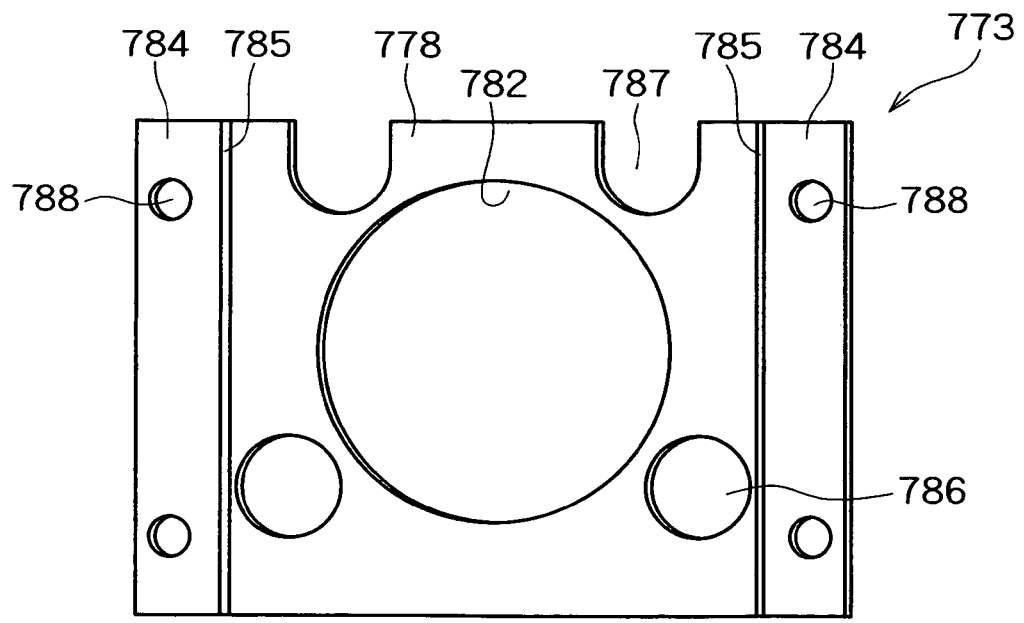
FIG. 73 is a plan view of one of members constituting a flange member of the bumper stay just mentioned above.
Figure 74:
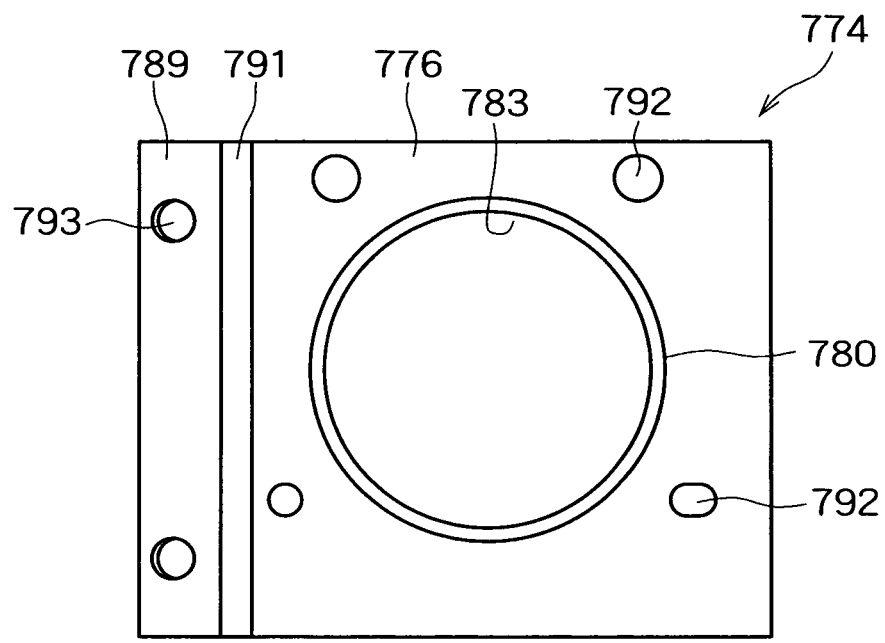
FIG. 74 is a plan view of the other of members constituting a flange member of the bumper stay just mentioned above.

With reference to FIG. 73, one member 773 for constituting the flange member 771 is a sheet member having steps and comprises outer portions 784, ramps 785, and the center part 778. The center part 778 is recessed with respect to the outer portions 784 and is connected thereto via the ramps 785. The center part 778 has the hole 782 and also has working holes 786 and working notches 787. As illustrated in FIG. 74, the outer portions 784 have bolt holes 788 for mounting a bumper reinforcement. The other member 774 for constituting the flange member 772 comprises an outer portion 789 at one end, a ramp 791 and the second flange 776. The second flange 776 has the burring hole 783 and also has bolt holes 792 for mounting a side member, and the outer portion 789 has bolt holes 793.

When the members 773 and 774 are combined to constitute the flange member 771, the outer portion 784 and the outer portion 789 are overlaid with each other to constitute the mounting section 779 (the left mounting section 779 in FIG. 72); the ramp 785 and the upper end of the riser or ramp 791 are overlaid with each other to constitute the ramp 781 (the left ramp 781 in FIG. 72); and the ramp 791 of the member 774 constitutes the rib 777. The working holes 786 and the working notches 787 are positioned at points corresponding to the bolt holes 792 for mounting the side member. Thus, a tool can be easily inserted to carry out bolting. The bolt holes 788 lie over the bolt holes 793, and at these points stud bolts 794 are pounded as illustrated in FIG. 72.

With reference to FIG. 72, the axial member 772 is inserted, at both ends, into the holes 782 and 783, expands as a result of electromagnetic forming and comes into intimate contact with the inner peripheries of the first and second flanges 775 and 776 around the holes 782 and 783. A portion of the axial member 772 near to the first flange 775 and protruding frontward from the hole 782 spreads in a radial direction in the form of a flange to form a flared portion 795 and comes into contact with the center part 778 in its whole circumference. The end of the axial member 772 near to the second flange 776 is in intimate contact with the inner periphery of the burring hole 783, spreads outward in a radial direction along the burring hole 783 to form a flared portion 796. In addition, a portion of the axial member 772 between the first and second flanges 775 and 776 protrudes outward in a radial direction as a result of expansion by electromagnetic forming, to form a protrusion 797. The axial member 772 is, at both ends, in intimate contact with the inner peripheries and is fixed to the first and second flanges 775 and 776 around the holes 782 and 783, in which the flared portions 795 and 796, and the protrusion 797 pinch the center part 778 of the first flange 775 and the second flange 776. The first flange 775 has steps, and the flared portion 796 near to the second flange 776 having no steps does not protrude frontward from the burring hole 783. Consequently, the tips of the axial member 772 are positioned to the rear (inside) of the mounting sections of the first and second flanges 775 and 776 (the mounting section 779 and the second flange 776 itself).

Figure 75:
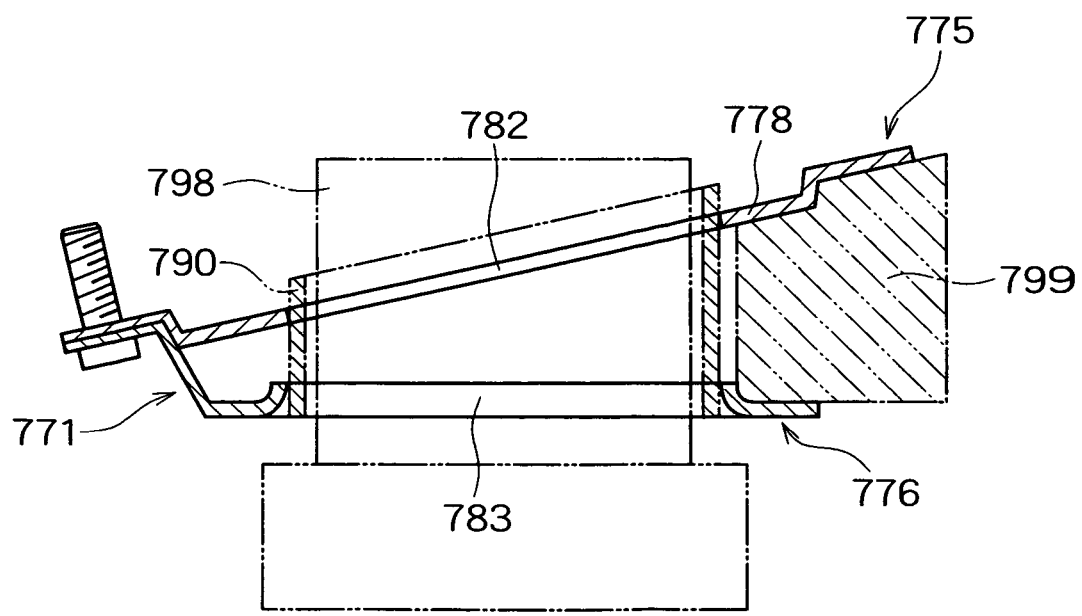
FIG. 75 is a cross sectional view illustrating a production method of the bumper stay just mentioned above.

A method for fixing the axial member 772 to the flange member 771 and thereby producing the bumper stay 770 is shown in FIG. 75. Initially, an axial material 790 is inserted into the hole 782 and the burring hole 783 formed in the first and second flanges 775 and 776 of the flange member 771, and a tip thereof near to the first flange 775 is protruded frontward from the hole (the virtual line in FIG. 75). The axial material 790 is made of an aluminum alloy extrudate having a circular cross section, is cut at one end in a plane perpendicular to the axial direction, and is cut at the other end in a plane inclined with respect to the above-mentioned plane. The axial material 790 is placed in the holes 782 and 783 so that a cutting plane at the one end is in parallel with the second flange 776, and a cutting plane at the other end is in parallel with the center part 778 of the first flange 775, namely, the portion protruding from the hole 782 has a uniform length in a circumferential direction.

The axial material 790 in this state is positioned with respect to the flange member 771, an electromagnetic forming coil 798 is inserted into the axial material 790, and a jig 799 for preventing deformation is inserted into the open side of the flange member 771. Then, an electric energy is applied and electromagnetic forming is carried out to thereby expand the axial material 790 in a radial direction. Thus, the above-mentioned bumper stay 770 is produced.

The flange member 771 in the bumper stay 770 comprises two sheet members 773 and 774. This enables easier carrying out of drilling than in a monolithic flange member such as the flange member 721. Drilling is carried out so that the resulting hole has an axis perpendicular to the flange, both in the first flange and the second flange. In the case of a monolithic flange member, the drilling requires extra time and effort such as positioning of a jig between the two flanges. In particular, when the hole 729 of the first flange 723 and the hole 734 of the second flange 724 have different axes as in the hollow member 721, the two holes cannot be opened in one process. In contrast, the members 773 and 774 in the flange member 771 are sheet-like open section members and are easily drilled. In addition, such open section members can be easily extruded and the resulting sheets can be molded by pressing.

Figure 76:
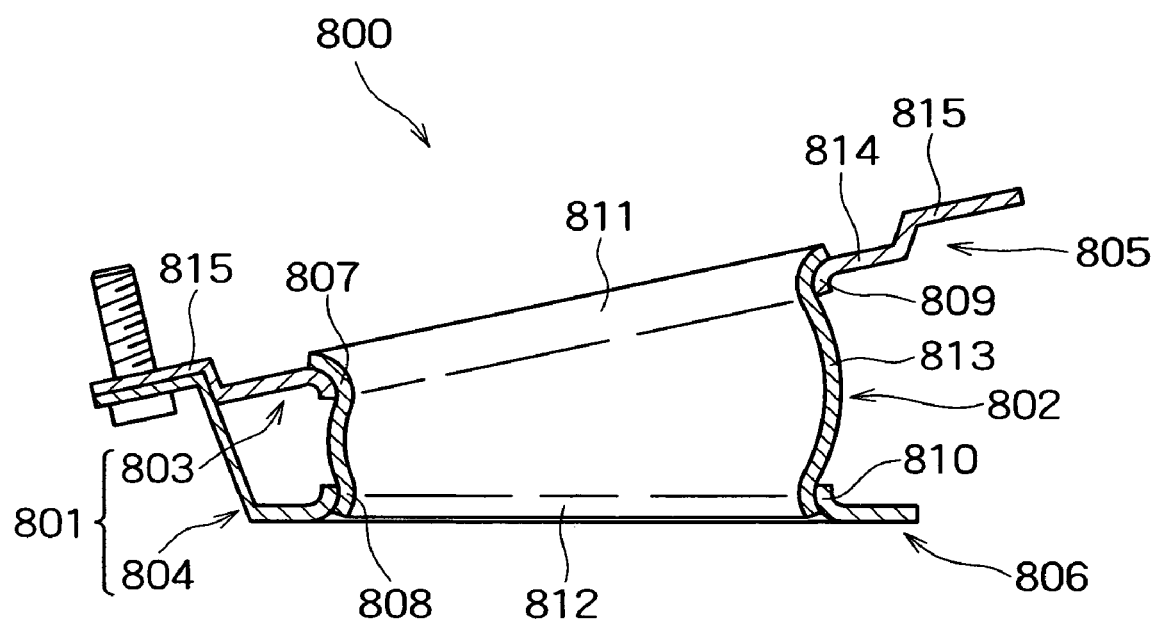
FIG. 76 is a cross sectional view of still another bumper stay according to the present invention.

FIG. 76 illustrates a bumper stay 800 having another configuration. The bumper stay 800 is also to be mounted to an inclined mating section at the end of a bumper reinforcement and comprises a flange member 801 and an axial member 802. The flange member 801 comprises two members 803 and 804, as in the flange member 771. The bumper stay 800 differs from the bumper stay 770 in that holes arranged in first and second flanges 805 and 806 are burring holes 807 and 808 which have been burred from the front. Hole flanges 809 and 810 are arranged around the burring holes 807 and 808, respectively.

The axial member 802 is at both ends inserted into the burring holes 807 and 808, expands as a result of electromagnetic forming and comes into intimate contact with the inner peripheries of the burring holes 807 and 808 and spreads in a radial direction along the burring holes 807 and 808 to form flared portions 811 and 812. In addition, a portion of the axial member 802 between the first and second flanges 805 and 806 protrudes outward in a radial direction as a result of expansion by electromagnetic forming, to form a protrusion 813. A tip of the axial member 802 near to the first flange 805 protrudes frontward (outward) from the burring hole 807 but is recessed (positioned inside) with respect to the mounting section 815. This is because the first flange 805 has steps, and the center part 814 bearing the burring hole 807 is recessed with respect to the mounting section 815 to be in contact with a bumper reinforcement. A tip of the axial member 802 near to the second flange 804 having no steps does not protrude frontward (outward) from the burring hole 806, as in the flared portion 796 in the bumper stay 770.

Figure 77A:
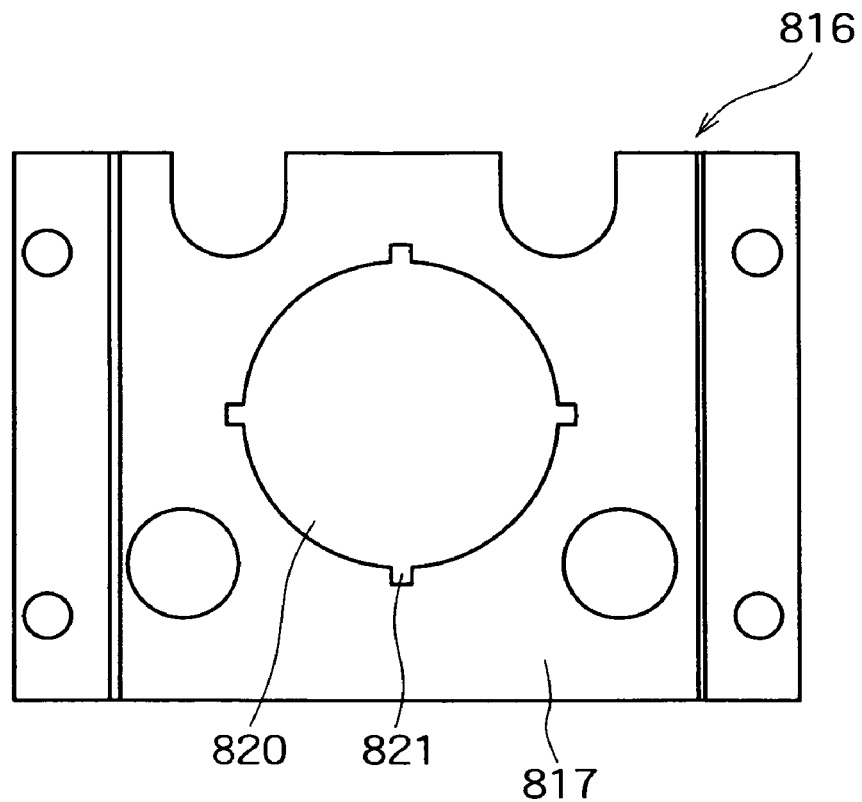
FIG. 77 comprises a plan view FIG. 77(a) before burring and a side view FIG. 77(b) after burring, respectively, of another embodiment of the member constituting the flange member of the bumper stay illustrated in FIG. 76.
Figure 77B:
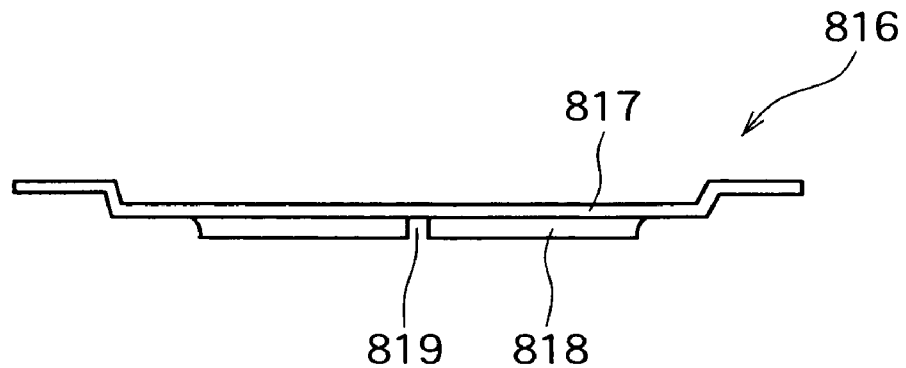

FIG. 77(b) illustrates a member 816 as a modification of the member 803 in the bumper stay 800. The member 816 has a burring hole in a center part 817, and a hole flange 818 around the burring hole. The hole flange 818 has plural vertical slits 819. With reference to FIG. 77(a), the hole flange having the slits 819 is formed by forming slits 821 in a radial direction in the periphery of a pilot hole 820 in a center part 817 of the member 816 and burring the pilot hole 820. The presence of the slits 819 enables more secure fixing of the axial member 802 and the burring hole and more secure prevention of rotation of the axial member 802 with respect to the burring hole, since the molded axial member 802 (FIG. 76) protrudes and fits into the slits 819 when an axial material is inserted into the burring hole and is expanded by electromagnetic forming.

Figure 78:
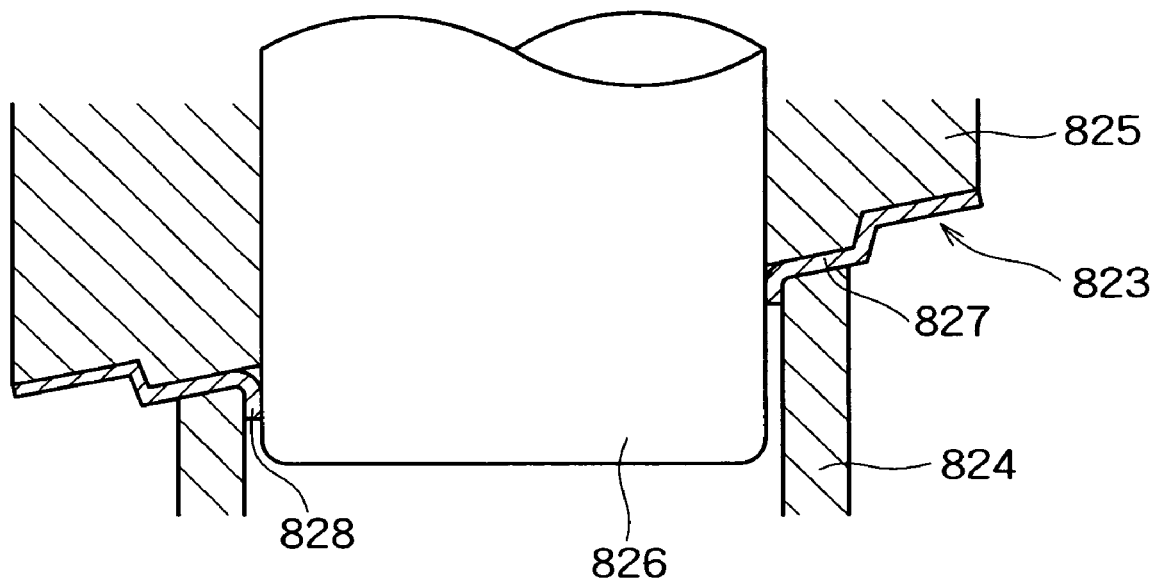
FIG. 78 is a cross sectional view of another embodiment of the member constituting the flange member of the bumper stay illustrated in FIG. 76.
Figure 79A:
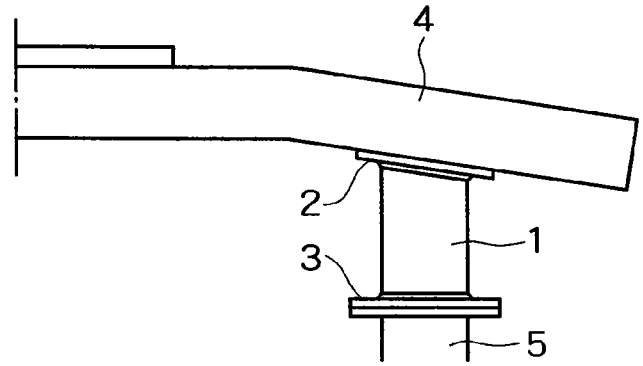
FIG. 79 comprises plan views illustrating various bumper stays and the mounting thereof.
Figure 79B:
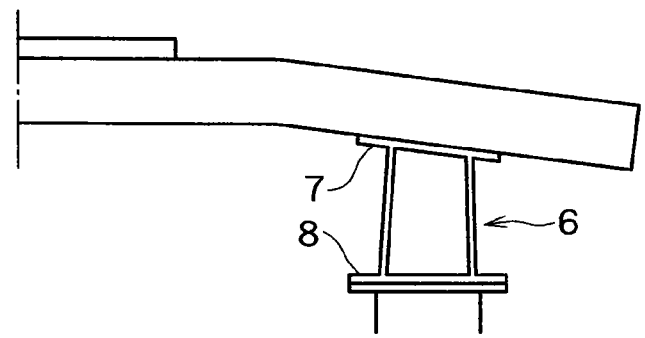
Figure 79C:
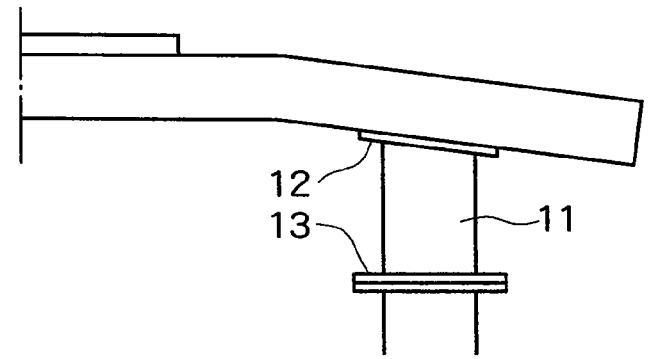
Figure 80:
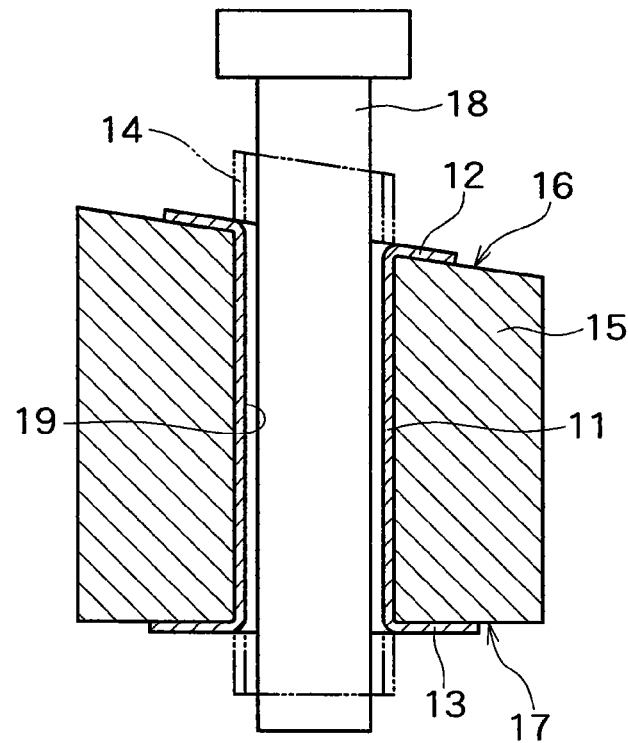
FIG. 80 is a cross sectional view illustrating a production method of the bumper stay illustrated in FIG. 79(c) by electromagnetic forming.
Figure 81:
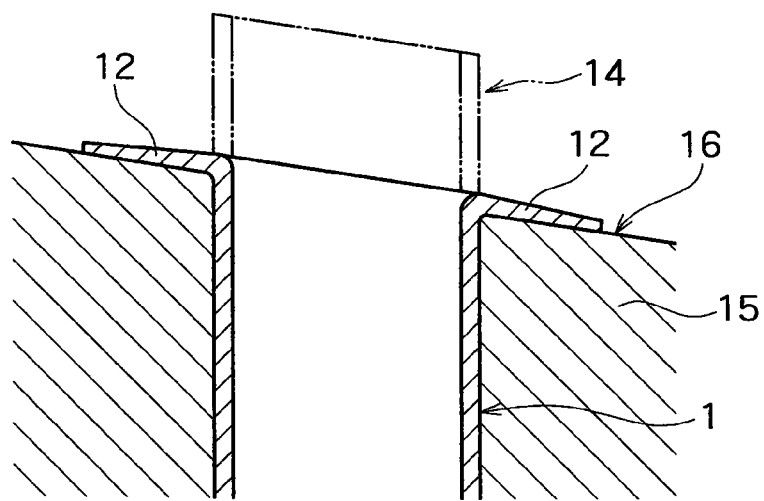
FIG. 81 is an enlarged cross sectional view of the flange of the bumper stay just mentioned above.
Figure 82:
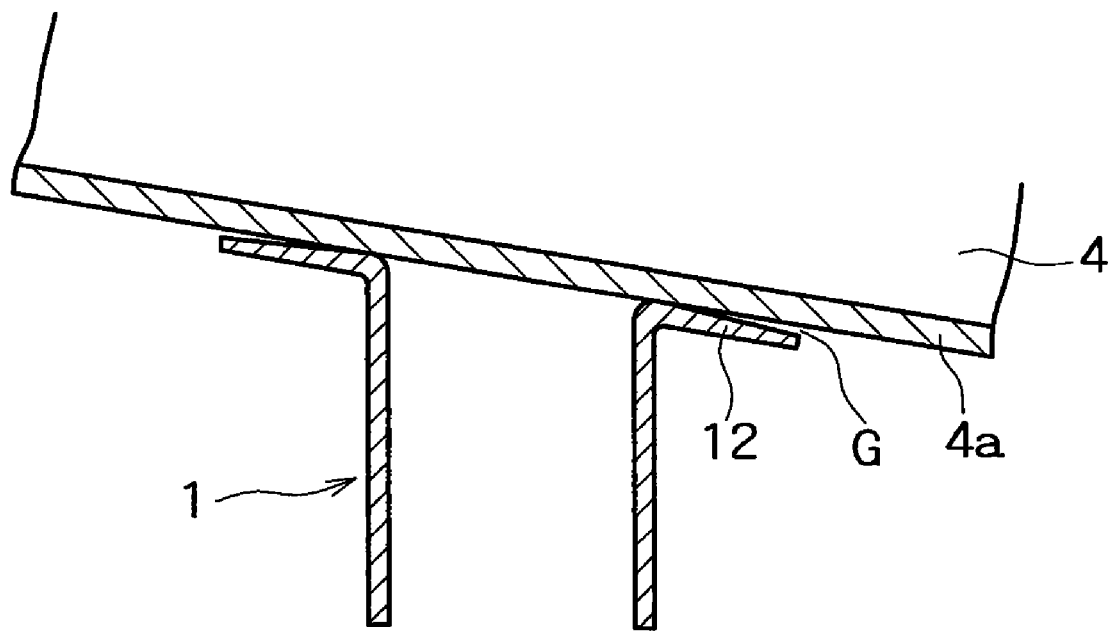
FIG. 82 is a cross sectional view illustrating the mounting of the bumper stay to a bumper reinforcement.
Figure 83:
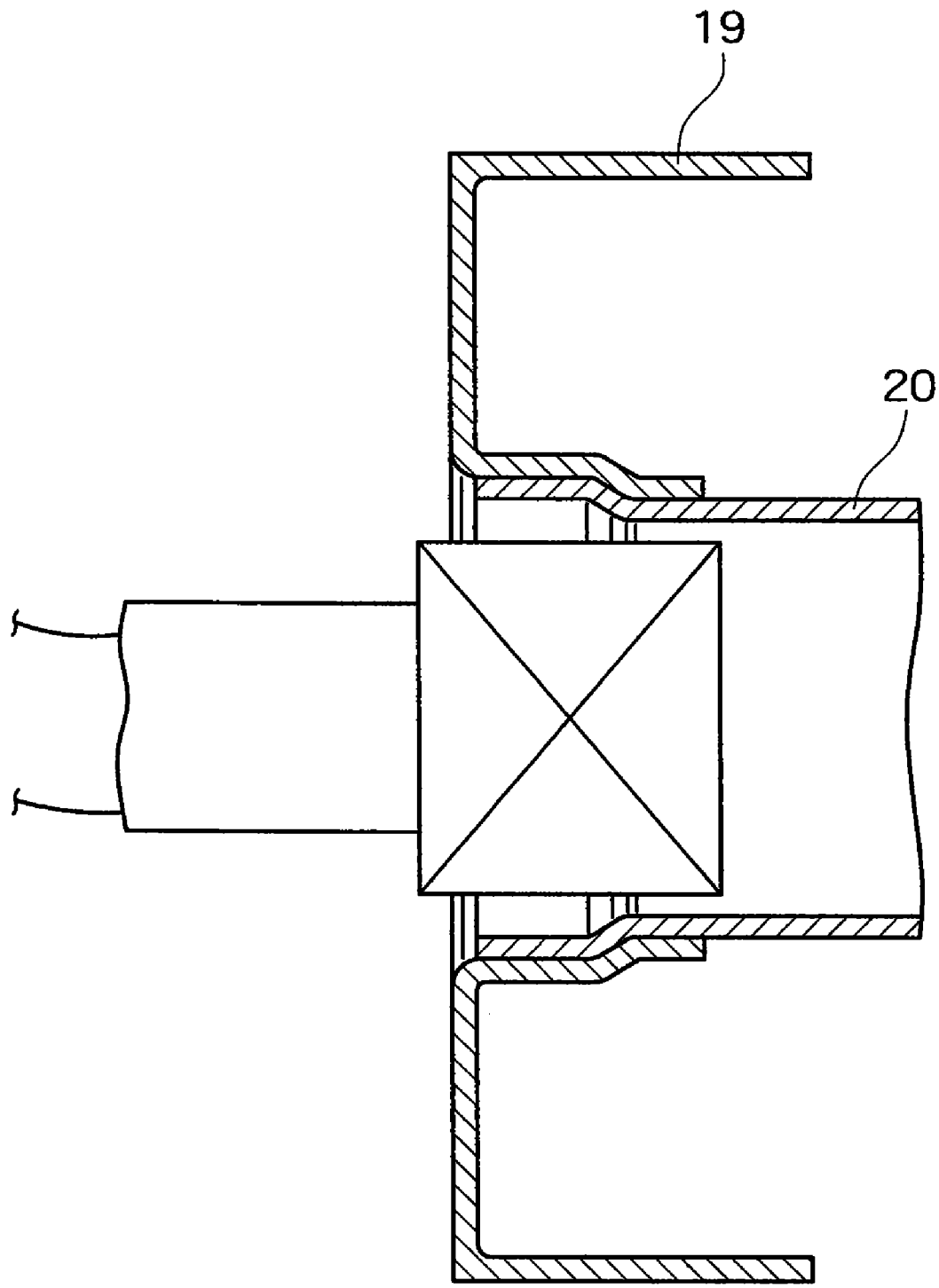
FIG. 83 is a cross sectional view of an example of conventional electromagnetic expansion.

FIG. 78 illustrates a member 823 as a modification of the member 803 in the bumper stay 800, and a method for processing a burring hole of the member 823. In the member 803, burring is carried out in a direction perpendicular to the plane of the center part 778, and the axis of the hole flange 809 is perpendicular to the plane of the center part 778. In contrast, the member 823 after forming a pilot hole is placed in a die 824 as being inclined, and is pressed by a sheet presser 825, and a punch 826 is pressed into the pilot hole, as illustrated in FIG. 78. The burring is therefore carried out in an oblique direction with respect to the plane of the center part 827, and the resulting hole flange 828 formed around the burring hole has a center axis inclined with respect to the plane of the center part 827. The inclination is set so that it agrees with the inclination of axial member (and the axial material) with respect to the first flange (center part 826), namely, so that the axis of the hole flange 827 is in parallel with the axis of the axial member (and the axial material). The axes of the hole flange 828 and the axial material point the same direction, and thereby the axial material can be precisely fit into the burring hole upon electromagnetic forming.

The present invention has been specifically illustrated mainly by taking bumper stays as an example. The axial members with flange according to the present invention, however, can also be generally applied to other axial members with flange to be mounted to a counter member, such as a reinforcement for instrument panel, a cross member, a channel side-rail, a tower bar, an attached pipe for instrument panel (a pipe one end of which is mounted to a instrument panel reinforcement and serves to support the instrument panel or a duct), a pillar, a seat frame, an intake manifold, a muffler, a propeller axial section and a steering column of motor vehicles such as passenger cars and trucks, a swinging arm for two-wheel vehicles including bicycles, as well as a seat frame for aircraft, a frame for chair, and joints for various applications.

Whether a flange member is joined to both ends or to one end of an axial member may be arbitrarily selected according to the usage of a target tubular member with flange.

What is claimed is:

1. A connection member comprising:
   first and second flange members each having a mounting face to be in contact with a mating face of another member, the first and second flange members being arranged at a distance from each other;
   a hollow member comprising a pair of ribs connecting the first and second flange members; and
   an axial member comprising a tubular aluminum alloy material and having both ends fixed to the first and second flange members, respectively,
   wherein the first and second flange members each have a hole between the pair of ribs, the two ends of the axial member are inserted into the holes and are expanded by electromagnetic forming so as to be in intimate contact with the inner peripheries of the holes, respectively,
   wherein the holes arranged in the flange members are burred from a front side thereof, and the ends of the axial member spread outward in a radial direction along inner peripheries of the holes,
   wherein the mounting face of at least one of the flange members is in contact with a mating face of a vehicle bumper reinforcement.

2. The connection member according to claim 1, wherein a portion of the axial member between the first and second flange members protrudes outward in a radial direction as a result of the expansion by electromagnetic forming.

3. The connection member according to claim 1, wherein a portion of the axial member between the first and second flange members protrudes outward in a radial direction as a result of the expansion by electromagnetic forming and is in intimate contact with the ribs.

4. The connection member according to claim 1, wherein the tips of the axial member are located in plane with or to the inside of the mounting faces of the flange members.

5. The connection member according to claim 1, wherein the flange members have different levels, and the hole is positioned to the rear of the mounting faces.

6. The connection member according to claim 1, wherein the hollow member comprises a plurality of open section members.

7. The connection member according to claim 1, wherein the mounting face of the first flange member and/or the second flange member is located outside the pair of ribs.

8. The connection member according to claim 1, wherein the connection member is a bumper stay, the hollow member comprises an aluminum alloy having a substantially uniform cross sectional shape in a plane perpendicular to the vertical direction of a car body, the bumper reinforcement is fixed to the mounting face of the first flange member, and a side member is fixed to the mounting face of the second flange member.

* * * * *